United States Patent
Salem

(10) Patent No.: US 10,110,130 B2
(45) Date of Patent: Oct. 23, 2018

(54) RECURSIVE DC-DC CONVERTER

(71) Applicant: Loai Galal Bahgat Salem, Giza (EG)

(72) Inventor: Loai Galal Bahgat Salem, Giza (EG)

(*) Notice: Subject to any disclaimer, the term of this patent is extended or adjusted under 35 U.S.C. 154(b) by 1312 days.

(21) Appl. No.: 13/964,107

(22) Filed: Aug. 12, 2013

(65) Prior Publication Data
US 2014/0043010 A1 Feb. 13, 2014

Related U.S. Application Data

(60) Provisional application No. 61/720,406, filed on Oct. 31, 2012.

(51) Int. Cl.
*H02M 3/158* (2006.01)
*H02M 3/07* (2006.01)
*H02M 7/483* (2007.01)

(52) U.S. Cl.
CPC ........... *H02M 3/1584* (2013.01); *H02M 3/07* (2013.01); *H02M 2007/4835* (2013.01)

(58) Field of Classification Search
CPC . H02M 2001/0083; H02M 2001/2001; H02M 2001/009; H02M 3/06; H02M 3/307; H02M 2003/072; H02M 3/158; H02M 3/335; H02M 3/07; H02M 3/1584
USPC ........... 363/16, 17, 21.02, 21.04, 44, 69, 60; 323/282, 284, 311, 312
See application file for complete search history.

(56) References Cited

U.S. PATENT DOCUMENTS

| | | | | |
|---|---|---|---|---|
| 4,982,120 A | * | 1/1991 | Longwell | H01L 27/0218 327/382 |
| 5,917,722 A | * | 6/1999 | Singh | H02M 7/538 363/132 |
| 7,696,735 B2 | * | 4/2010 | Oraw | H02M 3/07 323/282 |
| 7,886,431 B2 | * | 2/2011 | Weir | H01L 23/66 29/831 |
| 8,089,788 B2 | | 1/2012 | Jain | |
| 8,212,537 B2 | * | 7/2012 | Carpenter | H02M 3/158 323/222 |
| 8,212,541 B2 | | 7/2012 | Perreault | |
| 8,259,476 B2 | | 9/2012 | Ben-Yaakov | |
| 8,384,467 B1 | | 2/2013 | O'keeffe | |

(Continued)

OTHER PUBLICATIONS

Suyoung Bang, "A fully integrated successive-approximation switched-capacitor DC-DC converter with 31mV output voltage resolution," Solid-State Circuits Conference Digest of Technical Papers (ISSCC), 2013 IEEE International , vol., No., pp. 370,371, Feb. 17-21, 2013.

*Primary Examiner* — Rajnikant Patel
(74) *Attorney, Agent, or Firm* — Knobbe, Martens, Olson & Bear, LLP

(57) ABSTRACT

In general, in one aspect, a direct-current to direct-current (DC-DC) converter that receive one or more of input voltages and generates one or more of output voltages. The DC-DC converter is capable of operating at one of a plurality of voltage conversion ratios and selection of the one of a plurality of voltage conversion ratios is based on an input voltage received, the DC-DC converter may include a plurality of capacitors, a plurality of inductors, and a plurality of switches which create a plurality of switched cells connected in cascade, in a stack, or in cascade and in a stack, wherein each switched cell is capable of operating in one of a plurality of modes.

20 Claims, 31 Drawing Sheets

(56) References Cited

U.S. PATENT DOCUMENTS

| | | | | |
|---|---|---|---|---|
| 8,542,509 B2 * | 9/2013 | Sagneri | ................ | H02M 3/158 363/69 |
| 8,867,295 B2 * | 10/2014 | Mera | .................. | G11C 11/4074 365/149 |
| 2002/0070721 A1 * | 6/2002 | Ostrom | ..................... | G05F 1/56 323/284 |

* cited by examiner

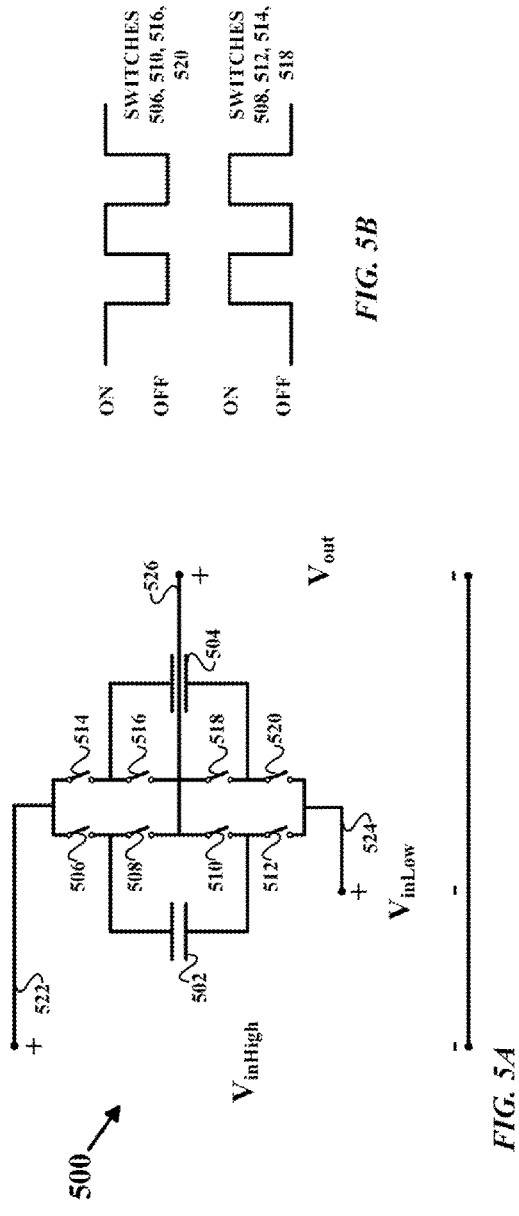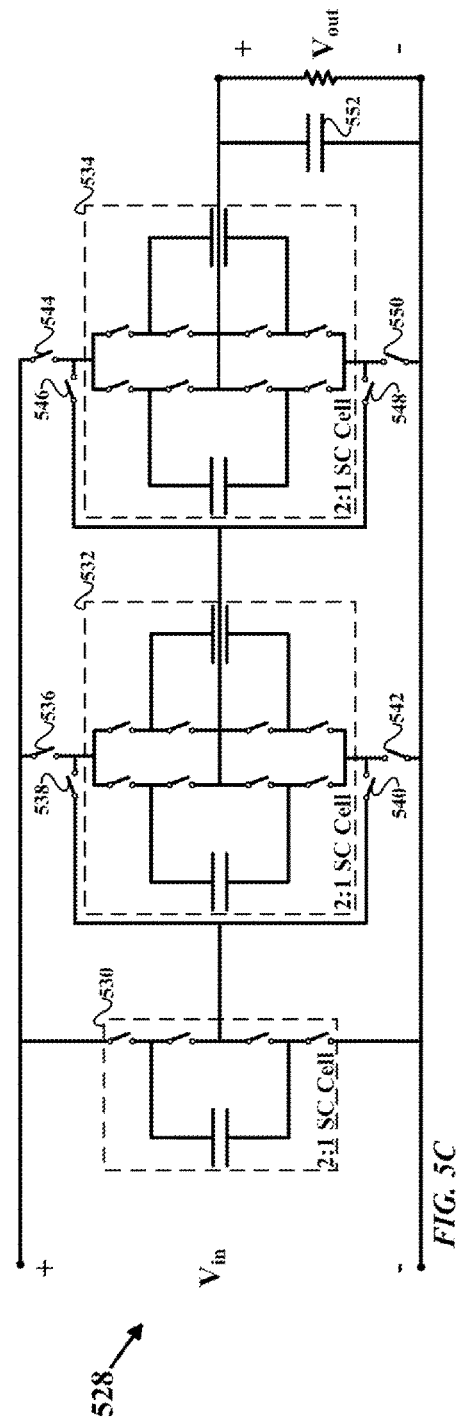
FIG. 5A
FIG. 5B
FIG. 5C

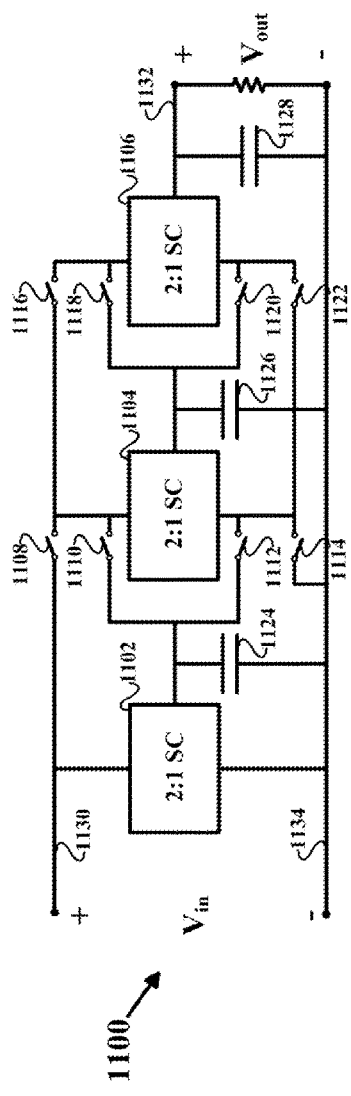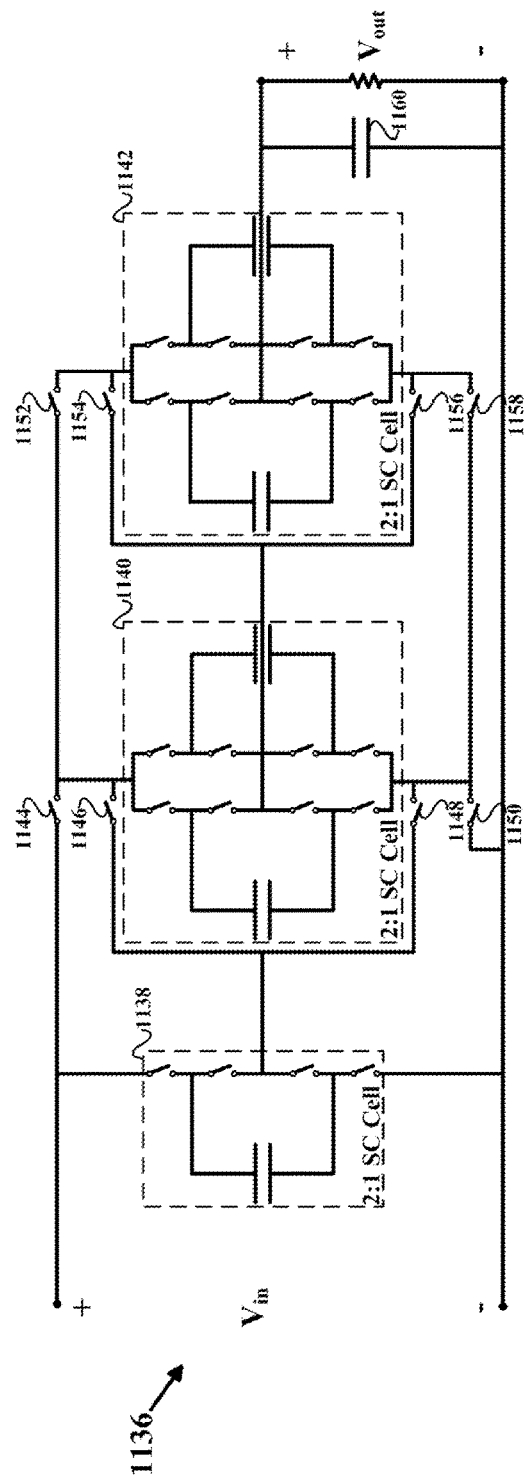
*FIG. 11A*
*FIG. 11B*

FIG. 20A

| 1/64 | 1/48 | 1/36 | 1/32 | 1/27 | 1/24 | 3/64 |
|------|------|------|------|------|------|------|
| 1/18 | 1/16 | 2/27 | 1/12 | 3/32 | 7/64 | 1/9 |
| 1/8 | 5/36 | 9/64 | 7/48 | 4/27 | 5/32 | 1/6 |
| 5/27 | 3/16 | 7/36 | 13/64 | 5/24 | 7/32 | 2/9 |
| 11/48 | 15/64 | 1/4 | 7/27 | 13/48 | 5/18 | 9/32 |
| 7/24 | 8/27 | 19/64 | 11/36 | 5/16 | 21/64 | 1/3 |
| 11/32 | 10/27 | 3/8 | 7/18 | 25/64 | 13/32 | 11/27 |
| 5/12 | 27/64 | 7/16 | 4/9 | 11/24 | 15/32 | 13/27 |
|  |  |  | 1/2 |  |  |  |
| 14/27 | 17/32 | 13/24 | 5/9 | 9/16 | 37/64 | 7/12 |
| 16/27 | 19/32 | 39/64 | 11/18 | 5/8 | 17/27 | 21/32 |
| 2/3 | 43/64 | 11/16 | 25/36 | 45/64 | 19/27 | 17/24 |
| 23/32 | 13/18 | 35/48 | 20/27 | 3/4 | 49/64 | 37/48 |
| 7/9 | 25/32 | 19/24 | 51/64 | 29/36 | 13/16 | 22/27 |
| 5/6 | 27/32 | 23/27 | 41/48 | 55/64 | 31/36 | 7/8 |
| 8/9 | 57/64 | 29/32 | 11/12 | 25/27 | 15/16 | 17/18 |
| 61/64 | 23/24 | 26/27 | 31/32 | 35/36 | 47/48 | 63/64 |

FIG. 20B

| 1/16 | 1/12 | 1/9 | 1/8 | 1/6 | 3/16 |
|------|------|-----|-----|-----|------|
| 2/9 | 1/4 | 1/3 | 3/8 | 7/16 | 4/9 |
|  | 9/16 | 1/2 |  |  |  |
| 5/9 |  | 5/8 | 2/3 | 3/4 | 7/9 |
| 13/16 | 5/6 | 7/8 | 8/9 | 11/12 | 15/16 |

RECURSIVE DC-DC CONVERTER

CROSS REFERENCE TO RELATED APPLICATIONS

This application claims priority to Egyptian Patent Application No. 2012/1398, filed Aug. 12, 2012 by the present inventor. Besides, this application claims priority to U.S. Provisional Patent Application No. 61720406, filed Oct. 31, 2012 by the present inventor.

BACKGROUND

Direct-current to direct-current (DC-DC) converters can be implemented using inductors or capacitors as the energy storage devices. Switched inductor (SL) DC-DC converters use a chopper circuit to generate a square voltage signal from the input battery DC voltage. An output inductive filter is used to extract the DC component of the square signal. Thus, the voltage conversion ratio from the input battery to the supplied circuit can be continuously controlled through the duty cycle of the square voltage signal. On the other hand, switched capacitor (SC) DC-DC converters utilize different topologies of capacitors to provide discrete voltage conversion ratios.

As opposed to SL voltage converters, SC voltage converters suffer from fixed voltage conversion ratio, m:n, from the input to the output terminals. Indeed, SC converters can only deliver output voltages with high efficiency at discrete ratios of the input voltage. In order to obtain continuous voltage regulation under line and load variations, the SC equivalent output resistance is modulated, through the switching frequency, and hence the SC is essentially operated as a linear regulator. Therefore, the SC efficiency degrades severely as the desired output level deviates from the SC unloaded voltage level.

The intuitive method to solve such problem in SC DC-DC converters is to change the unloaded conversion ratio, m:n, to obtain the desired output voltage, where the voltage drop across the converter's output resistance is minimized. However, large number of conversion ratios substantially increases the number of components and eventually the converter's complexity. Therefore, the conversion ratio is only changed when the output falls substantially below the unloaded conversion ratio, m:n, such that the linear regulation through the output resistance is limited and efficiency is kept within a reasonable range.

BRIEF DESCRIPTION OF THE DRAWINGS

The features and advantages of the various embodiments will become apparent from the following detailed description in which:

FIG. 5A illustrates an example switched capacitor circuit providing the average of two input voltages;

FIG. 5B illustrates an example timing diagram of the operation of the switch pairs for the switched capacitor circuit to provide the average of two input voltages;

FIG. 5C illustrates an example switched capacitor circuit that may be utilized to provide binary $2^3$: m transformation modes (e.g., 1/8, 1/4, 3/8, 1/2, 5/8, 3/4, 7/8, 1) by utilizing three switched capacitor circuits connected together;

FIG. 11A illustrates an example switched capacitor circuit that may be utilized to provide binary $2^3$: m transformation modes (e.g., 1/8, 1/4, 3/8, 1/2, 5/8, 3/4, 7/8, 1) by utilizing three switched capacitor circuits connected together in cascade;

FIG. 11B illustrates an example switched capacitor circuit that may be utilized to provide binary $2^3$: m transformation modes (e.g., 1/8, 1/4, 3/8, 1/2, 5/8, 3/4, 7/8, 1) by utilizing three switched capacitor circuits connected together;

FIG. 20A illustrates the voltage conversion ratios that may be produced by the circuit of FIG. 19B;

FIG. 20B illustrates the voltage conversion ratios that may be produced by the circuit of FIG. 19B;

DETAILED DESCRIPTION

Switched circuits can be utilized as step down/step up power converters. The switched capacitor circuits provide a lossless (or substantially lossless) voltage conversion at a ratio that is characteristic of circuit topology. A resistive mechanism can be used to regulate its output voltage at a level lower than the converted level. The regulation mechanism is resistive similar to a linear regulator where voltage regulation is achieved by dissipating the excess power (lossy). Embodiments are shown and described below in greater detail.

Figure 1A:
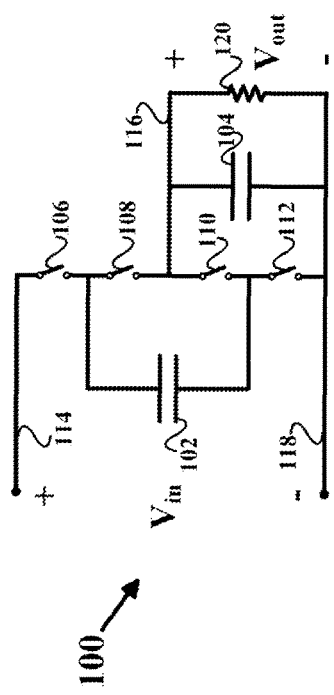
FIG. 1A illustrates an example switched capacitor circuit providing a 2:1 transformation (voltage conversion ratio) of an input voltage.

FIG. 1A illustrates an example switched capacitor circuit 100 providing a 2:1 transformation (voltage conversion ratio) of an input voltage (provides output that is 1/2 of input). The circuit 100 may include two capacitors 102, 104, four switches 106, 108, 110, 112, an input port 114 to receive an input voltage ($V_{in}$), an output port 116 to produce an output voltage ($V_{out}$), and a ground port 118 to provide a common level for the input voltage $V_{in}$, and the output voltage $V_{out}$. The switches may be one or more transistors. The switches 106, 108, 110, 112 are connected in series. The input voltage ($V_{in}$) is provided across the four series connected switches 106, 108, 110, 112. The capacitor 102 (flying capacitor) is connected between: the input port 114 and the output port 116, or the output port 116 and the ground port 118, based on the operation of the switches 106, 108, 110, 112. When the switches 106, 110 are closed and the switches 108, 112 are open the capacitor 102 is connected between the input port 114 and the output port 116 and when switches 108, 112 are closed and the switches 106, 110 are open the capacitor 102 is connected between the output port 116 and the ground port 118. The pairs of switches 106/110, 108/112 are switched on and off alternatively at a constant frequency.

Figure 1C:
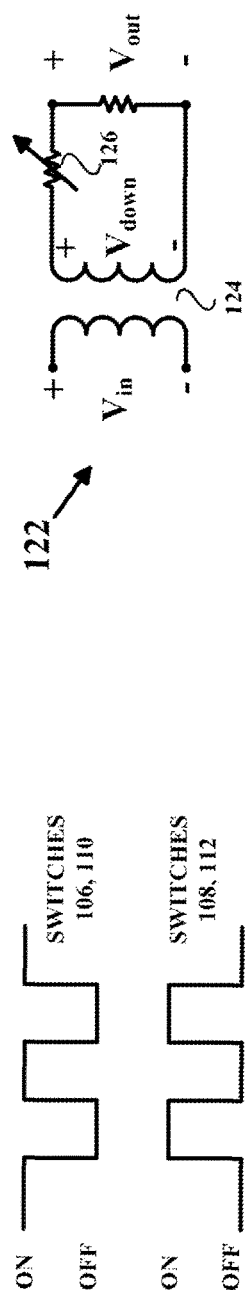
FIG. 1C illustrates an example equivalent circuit of the switched capacitor of FIG. 1.
Figure 1B:
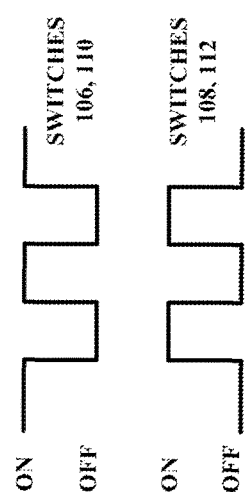
FIG. 1B illustrates an example timing diagram of the operation of the switch pairs for the switched capacitor circuit of FIG. 1A to provide a 2:1 voltage conversion ratio.

FIG. 1B illustrates an example timing diagram of the operation of the switch pairs for the switched capacitor circuit 100 to provide a 2:1 voltage conversion ratio. The switch pair 106/110 is on while the switch pair 108/112 is off and vice versa. The on duration (e.g., duty cycle) is approximately half of the cycle time for each pair of switches. It should be noted that the signals are illustrated as on and off signals for ease of illustration. These signals may equate to voltages that are applied to transistors in order to have the transistor act as an open or closed switch respectively. The voltages applied to turn a switch on may be high while the voltage applied to turn the switch off may be low or could be the opposite. The level of the high and low voltages may be dependent on the implementation.

Referring back to FIG. 1A, the output voltage ($V_{out}$) is measured across capacitor 104. This $V_{out}$ is provided across the load (e.g., microprocessor). The resistance of the load ($R_L$) 120 determines the current flowing through the load. The circuit 100 may provide a lossless (or substantially lossless) 2 to 1 voltage conversion ratio.

FIG. 1C illustrates an example equivalent circuit 122. The equivalent circuit 122 may provide closed loop voltage regulation and include a transformer 124 and a variable resistor 126. The transformer 124 may step down $V_{in}$ by a factor of 2 so that the downshifted voltage is half of $V_{in}$, $V_{down}=V_{in}/2$. The 2:1 voltage conversion ratio may be lossless (or substantially lossless). The variable resistor 126 may provide regulation of $V_{out}$ (further adjust the $V_{down}$ down by dissipating the excess power). The regulation of $V_{out}$ is lossy and accordingly affects the efficiency of the overall down-conversion.

Accordingly, the switched capacitor circuit 100 may be used for stepping up or down voltages at very high efficiencies where line regulation is not a criterion. The switched capacitor circuit 100 may be utilized as a voltage regulator (VR) for low power applications. However, the switched capacitor circuit 100 may not be suitable to generate a regulated output voltage for medium or high power applications especially with a wide range of input voltages due to the lossy regulation mechanism (resistance).

Figure 2:
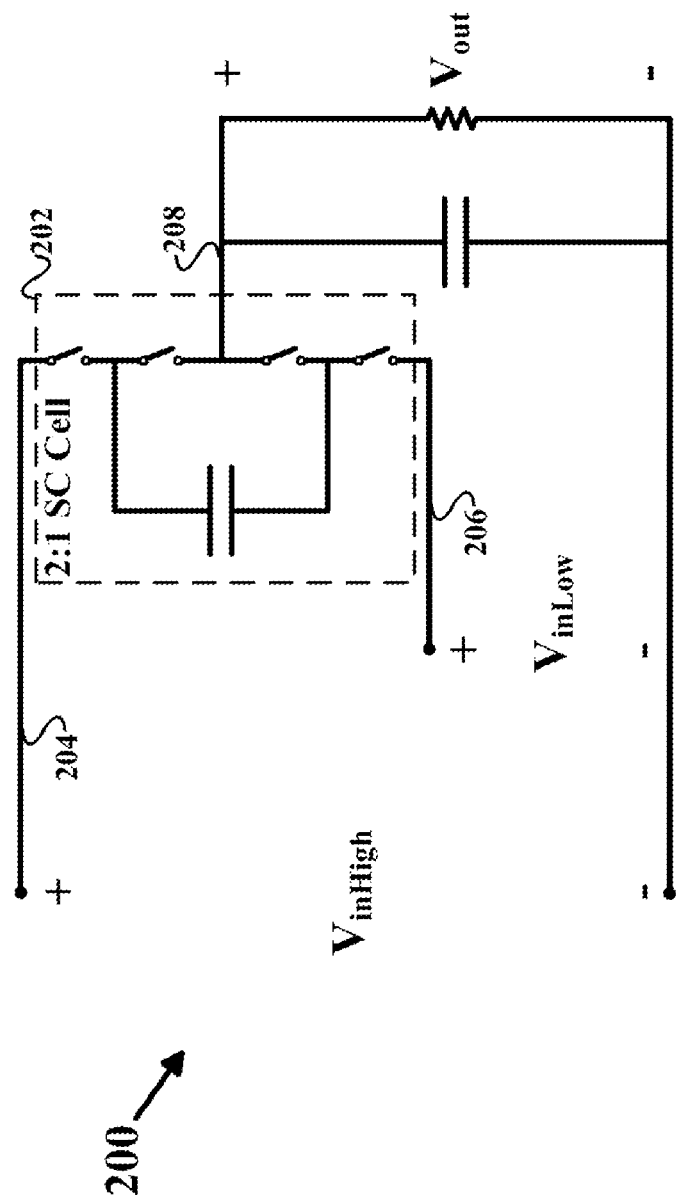
FIG. 2 illustrates an example switched capacitor circuit providing the average of two input voltages.

FIG. 2 illustrates an example switched capacitor circuit 200 providing the average of two input voltages. The switched capacitor circuit 200 may include a switched capacitor cell (2:1 SC Cell) 202 providing a 2:1 transformation (voltage conversion ratio), i.e. 100, of the difference of input voltages ($V_{inHigh}-V_{inLow}$), an input port 204 to receive an input voltage ($V_{inHigh}$), a ground port 206 to receive an input voltage ($V_{inLow}$), and an output port 208 to produce an output voltage ($V_{out}$). The switched capacitor cell (2:1 SC Cell) 202 can be operated similarly to the switched capacitor circuit 100 in FIG. 1A (switching cycles defined in FIG. 1B). The switched capacitor circuit 202 takes two inputs, $V_{inHigh}$ and $V_{inLow}$ through the input port 204 and the ground port 206, respectively, and produces at the output port 208 the output voltage ($V_{out}$) which is the average of the input voltages, $V_{out}=(V_{inHigh}+V_{inLow})/2$, or below, $V_{out}<(V_{inHigh} V_{inLow})/2$. The input port 204 and the ground port 206 may be swapped without affecting the operation of the switched capacitor circuit 200.

Multiple voltage conversion ratios may be obtained by utilizing a plurality of switched capacitor circuits (e.g., 200) connected together. The circuits can be utilized as the basic building blocks or cells with the cells being connected together through reconfiguration switches. Each added switched capacitor cell (i.e. block) may act as a magnifying lens in a telescope and hence enhances the output voltage resolution. Each switched capacitor cell (e.g., 200) takes two inputs ($V_{inHigh}$ and $V_{inLow}$) and produces an output, at its output port, dependent on the individual cell voltage conversion ratio (e.g., ($V_{inHigh}+V_{inLow})/2$ if the switched capacitor cell is of 2:1 transformation ratio, as 200). Each $V_{inHigh}$ and $V_{inLow}$ of a cell may be connected through the reconfiguration switches to: the input port or the ground port of the whole switched capacitor circuit (which comprises the plurality of switched capacitor cells), or the input port output port or ground port of another switched capacitor cell. The voltage conversion ratio (mode) of each cell may be selected separate from the other cells to provide additional voltage conversion ratios (e.g., the mode for each cell of the cells need not be the same).

Figure 3A:
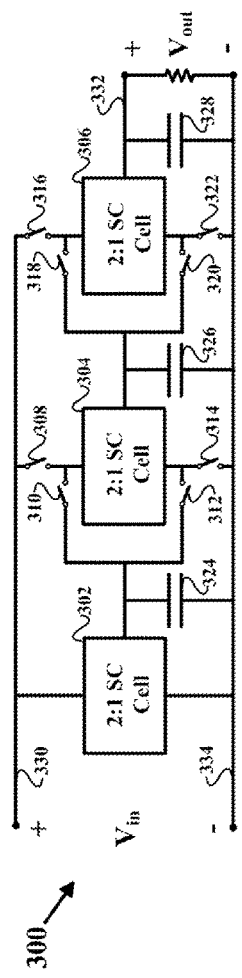
FIG. 3A illustrates an example switched capacitor circuit that may be utilized to provide several transformation modes by utilizing three switched capacitor circuits connected together.

FIG. 3A illustrates an example switched capacitor circuit 300 that may be utilized to provide several transformation modes by utilizing three switched capacitor circuits (e.g. 100, 200) connected together. The circuit 300 may include three switched capacitor cells (i.e., 2:1 SC Cell) 302, 304, 306, eight reconfiguration switches 308, 310, 312, 314, 316, 318, 320, 322, three capacitors 324, 326, 328, an input port 330 to receive an input voltage ($V_{in}$), an output port 332 to produce an output voltage ($V_{out}$), and a ground port 334. The switches may be one or more transistors. The switched capacitor cells 302, 304, 306 are connected in cascade and the input voltage ($V_{in}$) is provided across the first switched capacitor cell 302. The capacitors 324, 326, 328 are connected between the output ports of the respective switched capacitor cell 302, 304, 306 and the ground port 334 of the switched capacitor circuit 300. The capacitors 324, 326, 328 may be explicit capacitors or parasitic capacitors originating from the elements of switched capacitor circuit 300. In an embodiment, one or more of the capacitors 324, 326, 328 may be connected between the output port of the respective switched capacitor cell 302, 304, 306 and the input port 330 of the switched capacitor circuit 300. In another embodiment, one or more of the capacitors 324, 326, 328 may be connected between any two output ports of the switched capacitor cells 302, 304, 306.

Each switched capacitor cell of the cells 302, 304, 306 takes two inputs and produces, at the output port of the switched capacitor cell, an output voltage which is the average of the voltage at the input port and the ground port of the switched capacitor cell, $(V_{input\ port}+V_{ground\ port})/2$. The input port of the switched capacitor cell 304 is connected to either the input port 330 of the switched capacitor circuit 300 or the output port of the previous switched capacitor cell 302 based on the state (e.g. closed or open) of the reconfiguration switches 308, 310. The ground port of the switched capacitor cell 304 is connected to either the output port of the previous switched capacitor cell 302 or the ground port 334 of the switched capacitor circuit 300 based on the state of the reconfiguration switches 312, 314. When the switches 308, 314 are closed and the other switches 310, 312 are open the switched capacitor cell 304 is connected between the input port 330 and the ground port 334 of the switched capacitor circuit 300. When the switches 308, 312 are closed and the other switches 310, 314 are open the switched capacitor cell 304 is connected between the input port 330 of the switched capacitor circuit 300 and the output port of the previous switched capacitor cell 302. When the switches 310, 314 are closed and the other switches 308, 312 are open the switched capacitor cell 304 is connected between the output port of the previous switched capacitor cell 302 and the ground port 334 of the switched capacitor circuit 300.

The input port of the switched capacitor cell 306 is connected to either the input port 330 of the switched capacitor circuit 300 or the output port of the previous switched capacitor cell 304 based on the state of the reconfiguration switches 316, 318. The ground port of the switched capacitor cell 306 is connected to either the output port of the previous switched capacitor cell 304 or the ground port 334 of the switched capacitor circuit 300 based on the state of the reconfiguration switches 320, 322. When the switches 316, 322 are closed and the other switches 318, 320 are open the switched capacitor cell 306 is connected between the input port 330 and the ground port 334 of the switched capacitor circuit 300. When the switches 316, 320 are closed and the other switches 318, 322 are open the switched capacitor cell 306 is connected between the input port 330 of the switched capacitor circuit 300 and the output port of the previous switched capacitor cell 304. When the switches 318, 322 are closed and the other switches 316, 320 are open the switched capacitor cell 306 is connected between the output port of the previous switched capacitor cell 304 and the ground port 334 of the switched capacitor circuit 300.

The capacitors 324, 326, 328 can act as decoupling capacitors and reduce the voltage ripple at the output ports of the switched capacitor cells 302, 304, 306, respectively. The capacitors 324, 326 can be applied for the purpose of charge balance between the consecutive switched capacitor cells: 302, 304 and 304, 306. The output port 332 of switched capacitor circuit 300 provides an output voltage ($V_{out}$) which is at binary $2^3$: m transformation (voltage conversion ratio) of the input voltage $V_{in}$ (provides output that is m/$2^3$ of $V_{in}$) with $V_{in}/2^3$ voltage resolution based on the state of the reconfiguration switches 308, 310, 312, 314, 316, 318, 320, 322. The switched capacitor circuit 300 may exhibit eight (i.e. $2^3$, given three flying capacitors within the switched capacitor cells 302, 304, 306) target conversion ratios 1/8, 1/4, 3/8, 1/2, 5/8, 3/4, 7/8, 1. The voltage conversion ratio of the switched capacitor circuit 300 is changed to one of the available conversion ratios 1/8, 1/4, 3/8, 1/2, 5/8, 3/4, 7/8, 1 (modes) by controlling the state of the reconfiguration switches 308, 310, 312, 314, 316, 318, 320, 322. The output voltage ($V_{out}$) is provided to the load (e.g. microprocessor).

Figure 3B:
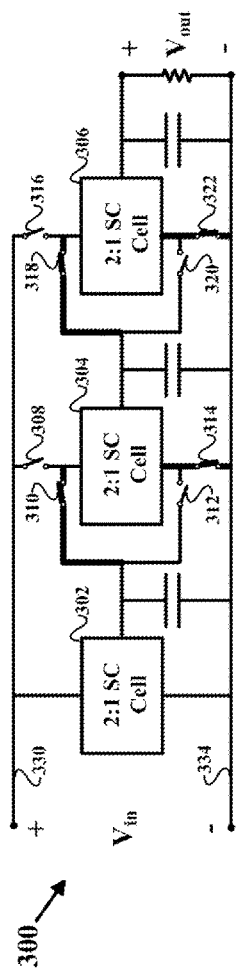
FIG. 3B illustrates the switched capacitor circuit of FIG. 3A in the 1/8 mode.

FIG. 3B illustrates the switched capacitor circuit 300 in the 1/8 mode ($V_{down}=V_{in}/8$). The switches 310, 314 are closed and the other switches 308, 312 are open, therefore the switched capacitor cell 304 is connected between the output port of the previous switched capacitor cell 302 and the ground port 334 of the switched capacitor circuit 300. In addition, the switches 318, 322 are closed and the other switches 316, 320 are open, therefore the switched capacitor cell 306 is connected between the output port of the previous switched capacitor cell 304 and the ground port 334 of the switched capacitor circuit 300.

Figure 3C:
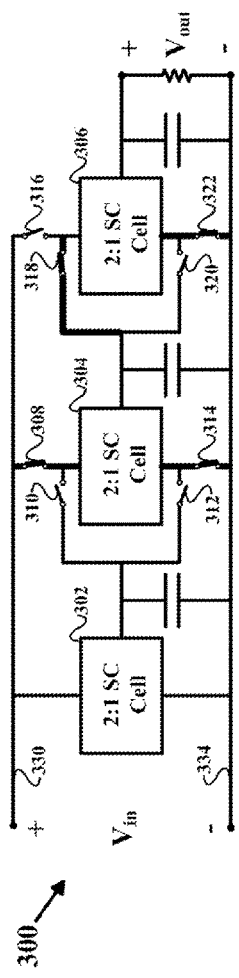
FIG. 3C illustrates the switched capacitor circuit of FIG. 3A in the 1/4 mode.

FIG. 3C illustrates the switched capacitor circuit 300 in the 1/4 mode ($V_{down}=V_{in}/4$). The switches 308, 314 are closed and the other switches 310, 312 are open, therefore the switched capacitor cell 304 is connected between the input port 330 and the ground port 334 of the switched capacitor circuit 300. In addition, the switches 318, 322 are closed and the other switches 316, 320 are open, therefore the switched capacitor cell 306 is connected between the output port of the previous switched capacitor cell 304 and the ground port 334 of the switched capacitor circuit 300.

Figure 3D:
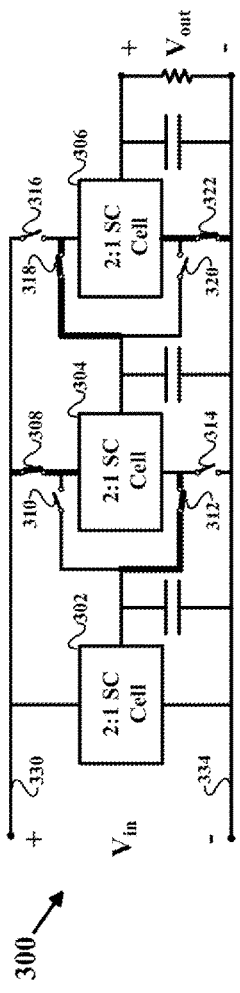
FIG. 3D illustrates the switched capacitor circuit of FIG. 3A in the 3/8 mode.

FIG. 3D illustrates the switched capacitor circuit 300 in the 3/8 mode ($V_{down}=3V_{in}/8$). The switches 308, 312 are closed and the other switches 310, 314 are open, therefore the switched capacitor cell 304 is connected between the input port 330 of the switched capacitor circuit 300 and the output port of the previous switched capacitor cell 302. In addition, the switches 318, 322 are closed and the other switches 316, 320 are open, therefore the switched capacitor cell 306 is connected between the output port of the previous switched capacitor cell 304 and the ground port 334 of the switched capacitor circuit 300.

Figure 3E:
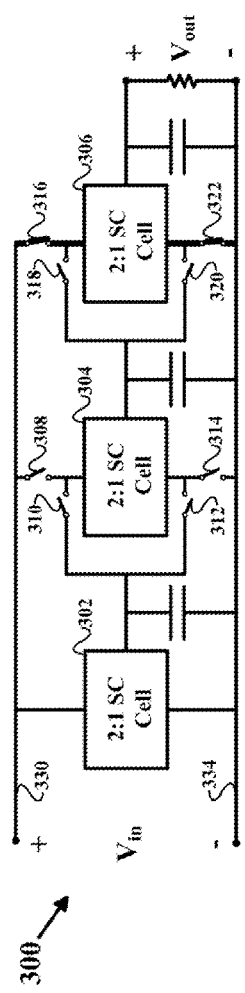
FIG. 3E illustrates the switched capacitor circuit of FIG. 3A in the 1/2 mode.

FIG. 3E illustrates the switched capacitor circuit 300 in the 1/2 mode ($V_{down}=V_{in}/2$). The switches 316, 322 are closed and the other switches 318, 320 are open, therefore the switched capacitor cell 306 is connected between the input port 330 and the ground port 334 of the switched capacitor circuit 300. The switched capacitor cell 304 may be floating where the reconfiguration switches 308, 310, 312, 314 are open, or the switched capacitor cell 304 may be in any other state depending on the reconfiguration switches 308, 310, 312, 314.

Similarly, the switched capacitor circuit 300 can be configured in the other modes (voltage conversion ratios 5/8, 3/4, 7/8) based on the state of the reconfiguration switches 308, 310, 312, 314, 316, 318, 320, 322.

Figure 3F:
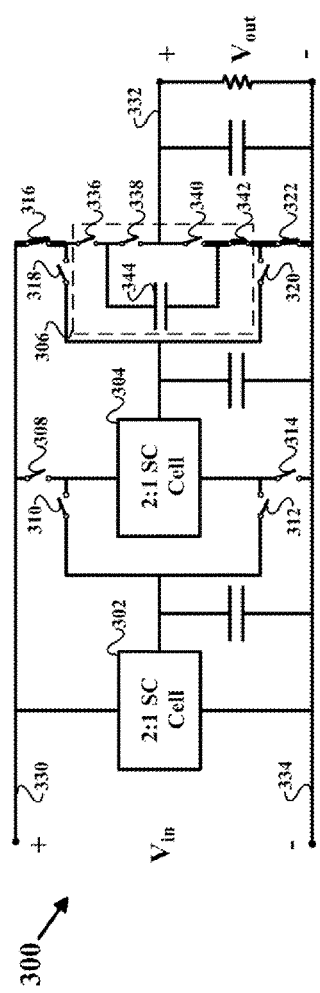
FIG. 3F illustrates the switched capacitor circuit of FIG. 3A in the 1 mode.

FIG. 3F illustrates the switched capacitor circuit 300 in the 1 mode ($V_{down}=V_{in}$). The switched capacitor cell 306 may include a capacitor 344, and four switches 336, 338, 340, 342. The switches may be one or more transistors. The switches 336, 338, 340, 342 are connected in series. The reconfiguration switches 316, 322 are closed and the other switches 318, 320 are open, therefore the switched capacitor cell 306 is connected between the input port 330 and the ground port 334 of the switched capacitor circuit 300. When the switches 336, 342 are closed and the switches 338, 340 are open the capacitor 344 is connected between the input port 330 and the ground port 334. When the switches 338, 342 are closed and the switches 336, 340 are open the capacitor 344 is connected between the output port 332 and the ground port 334. The switches 336, 338 are switched on and off alternatively at a constant frequency. The switched capacitor cell 304 may be floating where the reconfiguration switches 308, 310, 312, 314 are open, or the switched capacitor cell 304 may be in any other state depending on the reconfiguration switches 308, 310, 312, 314.

I presently contemplate for the circuit 300 that the flying capacitance of the successive cells 302, 304, 306 are weighted of the total circuit 300 flying capacitance C: e.g. the flying capacitance of cell 302 is C/7, the flying capacitance of cell 304 is 2C/7, and the flying capacitance of cell 306 is 4C/7. However the successive cells 302, 304, 306 capacitances can have different relative sizes, such as equal sizing of successive cells, etc. The weighted capacitances C/7, 2C/7, 4C/7 of the successive cells 302, 304, 306 may provide optimal relative sizing of the successive capacitances, in the modes 1/8, 3/8, 5/8, 7/8, and hence higher efficiency can be achieved for certain total flying capacitance C of the circuit 300.

Referring to FIG. 3A, the cells 302, 304, 306 may be operated at binary increasing switching frequencies of f, 2f, $2^2$f, respectively. Thus, charge balance may be provided by the faster cascaded cell (e.g., by cell 304 for the slower cell 302). In such embodiment the capacitors 324, 326 may be eliminated if required. In an embodiment, the operating frequencies of the cells 302, 304, 306 might be increasing in another weight instead of the binary increase of frequency.

The circuit 300 may be switched between the various modes (voltage conversion ratios 1/8, 1/4, 3/8, 1/2, 5/8, 3/4, 7/8) described above. The switching between modes may be based on what $V_{in}$ is received and what $V_{out}$ is desired. Since the conversion ratio is lossless (or substantially lossless) selecting an appropriate mode dependent of $V_{out}$ enables the resistive regulation (lossy) to be minimized. The appropriate mode selected would provide $V_{down}$ closest to the desired $V_{out}$, without going below the desired regulated $V_{out}$. For example, if the input voltage $V_{in}$ is 8V, the appropriate mode to select may be: (1) 8:1 to provide $V_{down}$ of 1V if the desired $V_{out}$ from 0-1V, (2) 4:1 to provide $V_{down}$ of 2V if the desired $V_{out}$ from 1-2V, (3) 8:3 to provide $V_{down}$ of 3V if the desired $V_{out}$ from 2-3V, (4) 2:1 to provide $V_{down}$ of 4V if the desired $V_{out}$ from 3-4V, (5) 8:5 to provide $V_{down}$ of 5V if the desired $V_{out}$ from 4-5V, (6) 4:3 to provide $V_{down}$ of 6V if the desired $V_{out}$ from 5-6V, (7) 8:7 to provide $V_{down}$ of 7V if the desired $V_{out}$ from 6-7V, and (8) 1:1 to provide $V_{down}$ of 8V if the desired $V_{out}$ from 7-8V.

Utilizing a fixed voltage conversion ratio switched capacitor circuit would either be inefficient because it relied heavily on the lossy resistance mechanism to regulate $V_{out}$ to the desired level or would not be able to provide the necessary $V_{out}$ for certain $V_{in}$ regions. In the above noted example, if the 2:1 voltage conversion ratio is the only available mode while the desired output voltage $V_{out}$ is 1V, a substantial reduction/regulation (e.g., from 4V to 1V) would be provided by the resistive regulation mechanism (lossy), which would result in an inefficient regulation. On the other hand, if the input voltage $V_{in}$ becomes 5V (e.g. system battery voltage decays from 8V after operation) and the desired $V_{out}$ is 4V, the 2:1 mode would result in $V_{down}$ of 2.5V, below the desired $V_{out}$.

Figure 3G:
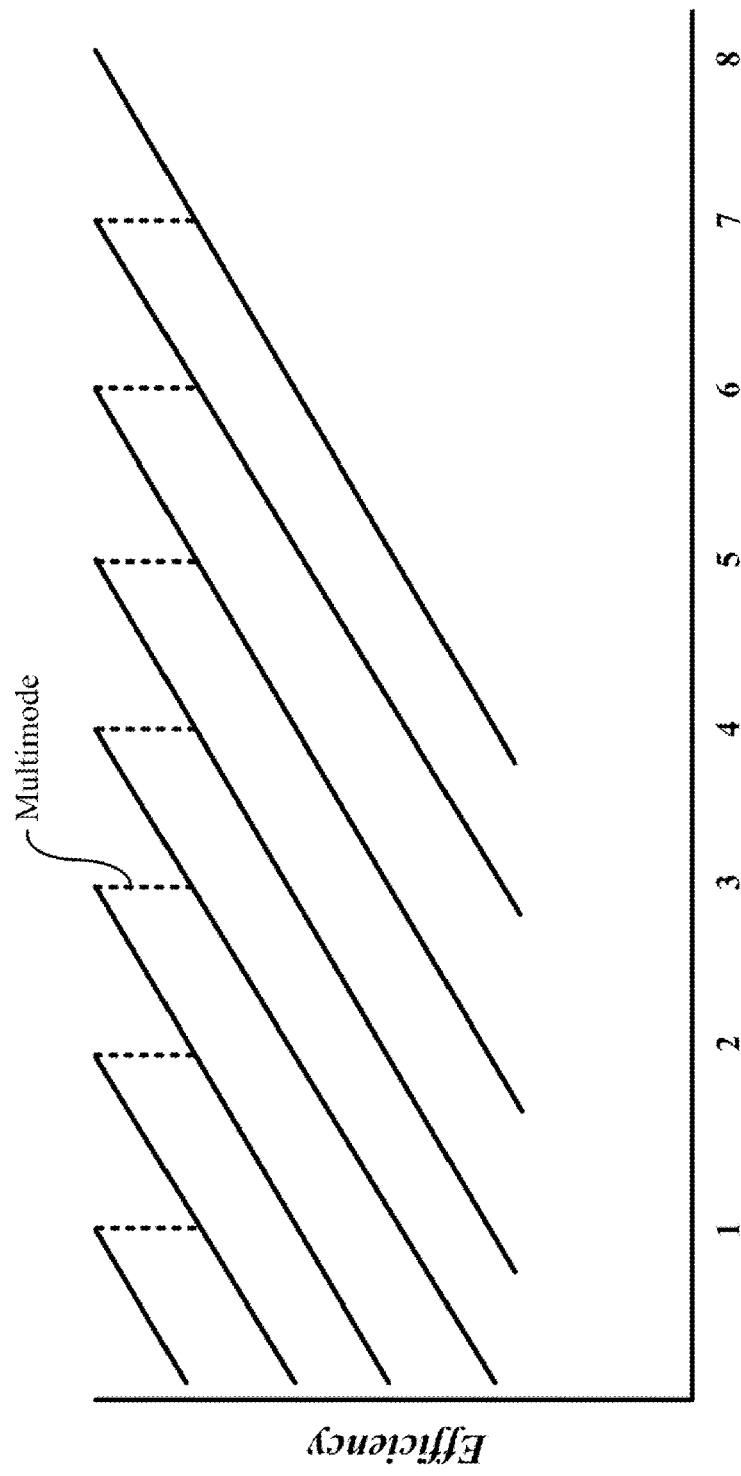
FIG. 3G illustrates a graph of an example voltage regulation efficiency for the multi-mode switched capacitor circuit of FIG. 3A.

FIG. 3G illustrates a graph of an example voltage regulation efficiency for the multi-mode switched capacitor circuit 300 for the above noted examples. A 100% efficiency may be achieved when the desired $V_{out}$ matches the switched capacitor circuit 300 mode (voltage conversion ratio). For instance, the 8:3 voltage conversion ratio (mode) may provide approximately 100% efficiency for $V_{out}$=3V since $V_{down}$ generated is the desired $V_{out}$ ($V_{down}$=$V_{out}$=3V) and then the efficiency falls from there as $V_{out}$ decreases and resistive regulation (lossy) is required. Some modes of the circuit 300 would not be able to provide the necessary $V_{out}$. For example, the 8:3 mode may not be used for $V_{out}$>3V since it would produce $V_{out}$<3V.

Selecting the appropriate mode based on the desired $V_{out}$ may enable the circuit 300 to be used over the entire range of $V_{out}$ with an efficiency that is approximately 100% at several points and never falls too far. The mode that the circuit 300 is operated in may be controlled by the signals provided thereto (e.g., the signals for the reconfiguration switches 308-322, the switching signals provided to the internal switches 336-342 of the cell 306). A controller (not illustrated) may be utilized to detect desired $V_{out}$ and select the appropriate mode. The controller may provide the appropriate switch signals or may control the switching signals that are provided (e.g., gate other signals).

The resolution of the circuit 300 may be $V_{in}/2^3$. The resolution may be improved by dithering between two conversion ratios (m/$2^3$ and (m+1)/$2^3$; m=0, 1, 2, . . . , 7). In order to obtain an output voltage $V_{out}$ between two discrete conversion ratios the circuit 300 may dither between two modes (m/$2^3$ and (m+1)/$2^3$; m=0, 1, 2, . . . , 7), through dithering the reconfiguration switches 308, 310, 312, 314, 316, 318, 320, 322, in a duty cycle for each respective mode determined by the desired $V_{out}$. The duty cycle for each mode may be between 0% and 100% of a cycle time, 0%<duty cycle<100%. Dithering may be performed between two neighboring modes and in a more elaborate control, dithering may be performed over several (more than two) modes.

Referring back to FIG. 3A, the switched capacitor circuit 300 may be used for stepping up (boosting) voltages by simply connecting the input voltage ($V_{in}$) to the output port 332 while connecting the load resistance and the capacitor 328 to the input port 330. The circuit 300 may exhibit eight voltage conversion ratios (modes) 1, 8/7, 4/3, 8/5, 2, 8/3, 4, 8. The voltage conversion ratio of the switched capacitor circuit 300 is changed to one of the available conversion ratios 1, 8/7, 4/3, 8/5, 2, 8/3, 4, 8 (modes) by controlling the state of the reconfiguration switches 308, 310, 312, 314, 316, 318, 320, 322 and the internal switches 336, 338, 340, 342 of the cell 306. The output voltage ($V_{out}$) is provided to the load (e.g. microprocessor).

Figure 4A:
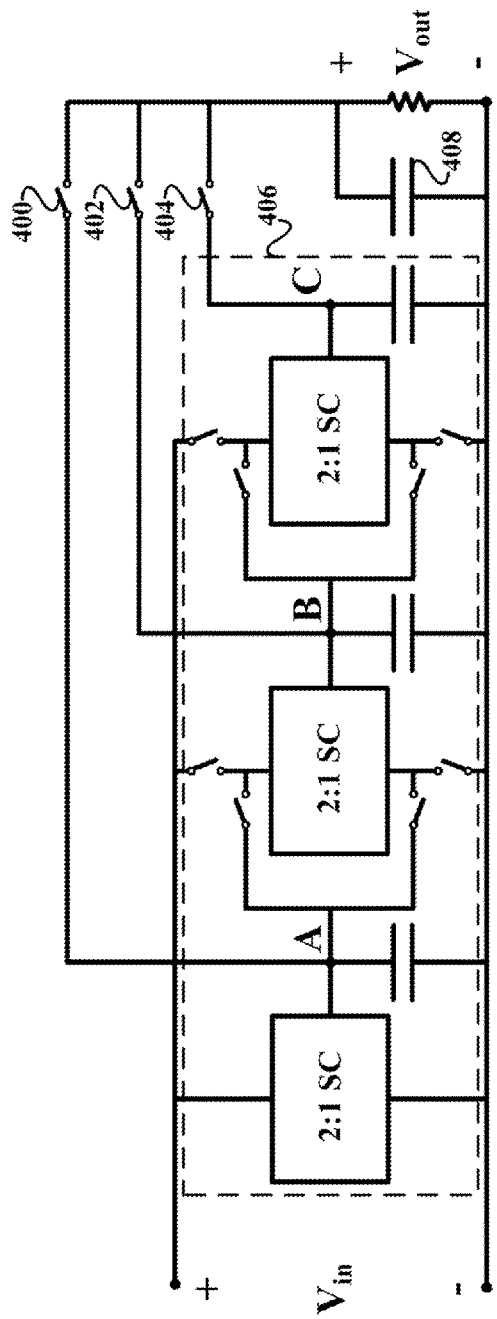
FIG. 4A illustrates an example output selection circuit of a switched capacitor circuit of FIG. 3A.

FIG. 4A illustrates an example output selection circuit of a switched capacitor circuit (e.g., 300). The selection circuit may include three selection switches 400, 402, 404, a switched capacitor circuit 406 consisting of three switched capacitor cells (e.g., 300), and a capacitor 408. The selection switches 400, 402, 404 may be connected to the internal nodes A, B, C, respectively, within the circuit 406. When the switch 400 is closed and the other switches 402, 404 are open the output voltage ($V_{out}$) is connected to node A within the circuit 406. When the switch 402 is closed and the other switches 400, 404 are open the output voltage ($V_{out}$) is connected to node B within the circuit 406. When the switch 404 is closed and the other switches 400, 402 are open the output voltage ($V_{out}$) is connected to node C within the circuit 406. When $V_{out}$ is connected to node A the conversion ratio of the switched capacitor circuit 406 may be $V_{in}/2$. When $V_{out}$ is connected to node B the conversion ratio of the switched capacitor circuit 406 may be $V_{in}/2$, $V_{in}/4$, or $3V_{in}/4$. When $V_{out}$ is connected to node C the conversion ratio of the switched capacitor circuit 406 may be $V_{in}$, $V_{in}/2$, $V_{in}/4$, $3V_{in}/4$, $V_{in}/8$, $3V_{in}/8$, $5V_{in}/8$, or $7V_{in}/8$.

When the switches 400, 402, 404 are closed the conversion ratio of the circuit 406 may be $V_{in}/2$ without disconnecting any switched capacitor cell within the circuit 406. The switched capacitor circuit 300 in the 1/2 mode (FIG. 3E) disconnects cells 302, 304 while cell 306 is connected to the output. By connecting all the three cells within the circuit 406 to the output $V_{out}$ in the 1/2 mode to provide the output load current, a higher efficiency may be achieved where larger flying capacitance is involved in the charge transfer process.

Figure 4B:
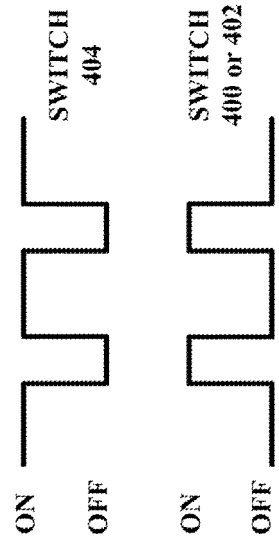
FIG. 4B illustrates an example timing diagram of the operation of the output selection switches of FIG. 4A to provide an output voltage level in between two discrete conversion ratios.

FIG. 4B illustrates an example timing diagram of the operation of the output selection switches 400, 402, 404 to provide an output voltage level in between two discrete conversion ratios (m/$2^3$ and (m+1)/$2^3$; m=1, 2, . . . , 7). The output selection switches may provide a resistive mechanism which regulates the output voltage $V_{out}$ at a desired level. The capacitor 408 may act with the equivalent resistance of the switches 400, 402, 404 as a low pass filter. When either of the switches 400 or 402 is on the switch 404 is off and vice versa. The switches 404 and (400 or 402) may be switched on and off alternatively at a constant frequency. The on cycle (duty cycle) may be between 0% and 100% of the cycle time, 0%<on cycle<100%. When the mode $V_{in}/8$ is generated at node C the mode $V_{in}/4$ is produced at node B. The output voltage ($V_{out}$) may dither between node C and node B through the switches 404, 402 respectively by a duty cycle (on cycle) determined by the desired level in between $V_{in}/8$ and $V_{in}/4$. When the mode $3V_{in}/8$ is generated at node C the mode $V_{in}/2$ is produced at node A. The output voltage ($V_{out}$) may dither between node C and node A through the switches 404, 400 respectively by a duty cycle (on cycle) determined by the desired level in between $3V_{in}/8$ and $V_{in}/2$. A similar operation may be followed to generate output levels in between the other ratios. The frequency of operation may be fixed which might be of importance to some sensitive circuits. In this embodiment, dithering was performed between two neighboring modes. In a more elaborate control, dithering may be performed over several (more than two) modes.

FIG. 5A illustrates an example switched capacitor circuit 500 providing the average of two input voltages. The circuit 500 may include two capacitors 502, 504, eight switches 506, 508, 510, 512, 514, 516, 518, 520, an input port 522 to receive an input voltage ($V_{inHigh}$), a ground port 524 to receive an input voltage ($V_{inLow}$) and an output port 526 to produce an output voltage ($V_{out}$). The switches may be one or more transistors. The switches 506, 508, 510, 512 are connected in series as well as the switches 514, 516, 518, 520. The switches 508, 510, 516, 518 are connected to the output port 526.

The switched capacitor circuit 500 takes two inputs, $V_{inHigh}$ and $V_{inLow}$ through the input port 522 and the ground port 524 respectively, and produces at the output port 526 the output voltage ($V_{out}$) which is the average of the input voltages, $V_{out}=(V_{inHigh}+V_{inLow})/2$, or below, $V_{out}<(V_{inHigh}+V_{inLow})/2$. The flying capacitors 502, 504 may be symmetric and are out of phase to guarantee continuous input current through the input port 522. When the switch pairs 506/510, 516/520 are closed while the other switches are open the capacitor 502 is connected between the input port 522 and the output port 526 while the capacitor 504 is connected between the output port 526 and the ground port 524. When the switch pairs 508/512, 514/518 are closed while the other switches are open the capacitor 502 is connected between the output port 526 and the ground port 524 while the capacitor 504 is connected between the input port 522 and the output port 526. The switch groups 506/510, 516/520 and 508/512, 514/518 are switched on and off alternatively at a constant frequency. The input port 522 (ground port 524) would see the same amount of charge drawn in each half of the switching cycle. The input port 522 and the ground port 524 may be swapped without affecting the operation of the switched capacitor circuit 500.

FIG. 5B illustrates an example timing diagram of the operation of the switch pairs for the switched capacitor circuit 500 to provide the average of two input voltages. The switch pairs 506/510, 516/520 are on while the switch pairs 508/512, 514/518 are off and vice versa. The on cycle is approximately half of the cycle time for each pair of switches. It should be noted that the signals are illustrated as on and off signals for ease of illustration.

FIG. 5C illustrates an example switched capacitor circuit 528 that may be utilized to provide binary $2^3$: m transformation modes (e.g., 1/8, 1/4, 3/8, 1/2, 5/8, 3/4, 7/8, 1) by utilizing three switched capacitor circuits (e.g., 200 and 500) connected together. The circuit 528 may include three switched capacitor cells 530, 532, 534, eight reconfiguration switches 536, 538, 540, 542, 544, 546, 548, 550, and an output capacitor 552. The circuit 528 may be similar in operation to the circuit 300. The switches 536, 538, 540, 542, 544, 546, 548, 550 are operated similar to the switches 308, 310, 312, 314, 316, 318, 320, 322, respectively in order to provide the modes 1/8, 1/4, 3/8, 1/2, 5/8, 3/4, 7/8, 1. The circuit 528 may not include the capacitors 324, 326 (FIG. 3A) since the charge balance may be accomplished by the out of phasing within the cells 532, 534.

Figure 6:
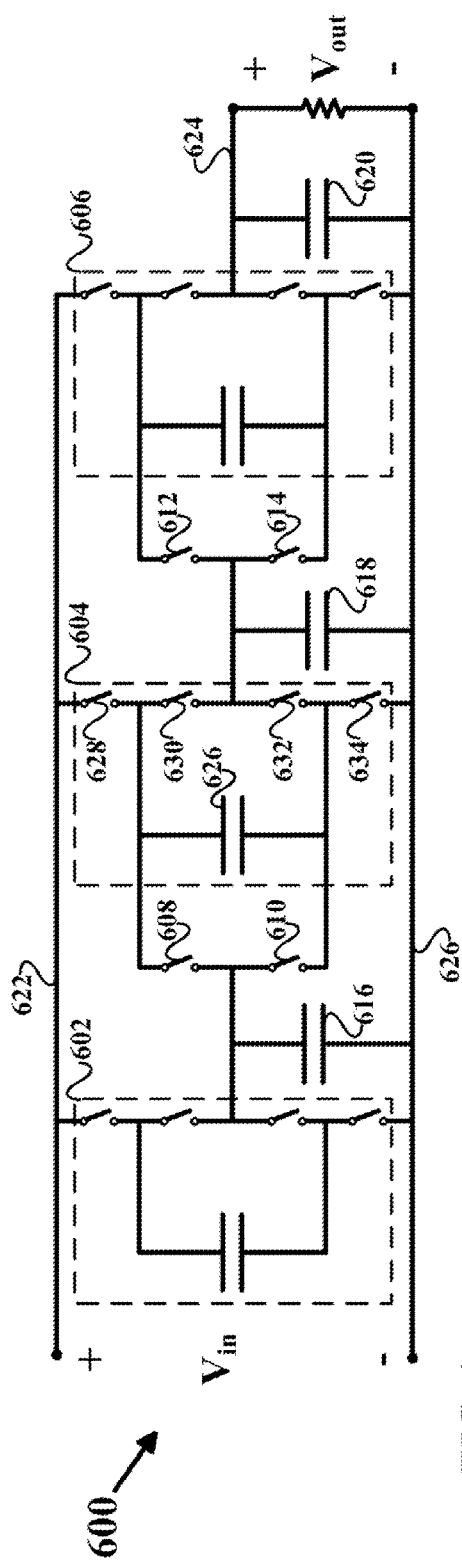
FIG. 6 illustrates an example switched capacitor circuit that may be utilized to provide binary $2^3$: m transformation modes (e.g., 1/8, 1/4, 3/8, 1/2, 5/8, 3/4, 7/8, 1) by utilizing three switched capacitor circuits connected together in cascade.

FIG. 6 illustrates an example switched capacitor circuit 600 that may be utilized to provide binary $2^3$: m transformation modes (e.g., 1/8, 1/4, 3/8, 1/2, 5/8, 3/4, 7/8, 1) by utilizing three switched capacitor circuits (e.g., 200) connected together in cascade. The circuit 600 may include three switched capacitor cells (e.g., 200) 602, 604, 606, four reconfiguration switches 608, 610, 612, 614, three capacitors 616, 618, 620, an input port 622 to receive an input voltage ($V_{in}$), an output port 624 to produce an output voltage ($V_{out}$), and a ground port 626. The switches may be one or more transistors. The circuit 600 may not include the input side reconfiguration switches 308, 316 and ground side reconfiguration switches 314, 322 of the circuit 300 (FIG. 3A) where they are embedded in the switches within the cells 604, 606. The reduced number of reconfiguration switches might reduce cost and might enhance the efficiency. The reconfiguration switches 608, 610, 612, 614 may be switched on and off alternatively at a constant frequency while the reconfiguration switches 308, 310, 312, 314, 316, 318, 320, 322 of the circuit 300 (FIG. 3A) may be operated as static switches.

The switched capacitor cells 602, 604, 606 are connected in cascade and the input voltage ($V_{in}$) is provided across the first switched capacitor cell 602. Each switched capacitor cell of the cells 602, 604, 606 takes two inputs and produces, at the output port of the switched capacitor cell, an output voltage which is the average of the voltage at the input port and the ground port of the switched capacitor cell, ($V_{input\ port}+V_{ground\ port}$)/2. Each cell 604, 606 might be connected between: the input port 622 and the ground port 626, the output port of the previous cell (602 and 604 respectively) and the ground port 626, or the input port 622 and the output port of the previous cell (602 and 604 respectively).

Referring to cell 604, when the switch pair 628/632 is closed and the other switches 608, 610, 630, 634 are open the flying capacitor 626 is connected between the input port 622 and the output port of cell 604 and when the switch pair 630/634 is closed and the other switches 608, 610, 628, 632 are open the flying capacitor 626 is connected between the output port of cell 604 and the ground port 626. The pairs of switches 628/632, 630/634 are switched on and off alternatively at a constant frequency. Thus, cell 604 is connected between the input port 622 and the ground port 626. When the switch pair 608/632 is closed and the other switches 628, 610, 630, 634 are open the flying capacitor 626 is connected between the output port of the previous cell 602 and the output port of cell 604 and when the switch pair 630/634 is closed and the other switches 608, 610, 628, 632 are open the flying capacitor 626 is connected between the output port of cell 604 and the ground port 626. The pairs of switches 608/632, 630/634 are switched on and off alternatively at a constant frequency. Thus, cell 604 is connected between the output port of the previous cell 602 and the ground port 626. When the switch pair 628/632 is closed and the other switches 608, 610, 630, 634 are open the flying capacitor 626 is connected between the input port 622 and the output port of cell 604 and when the switch pair 630/610 is closed and the other switches 608, 634, 628, 632 are open the flying capacitor 626 is connected between the output port of cell 604 and the output port of the previous cell 602. The pairs of switches 628/632, 630/610 are switched on and off alternatively at a constant frequency. Thus, cell 604 is connected between the input port 622 and the output port of the previous cell 602. The switched capacitor cell 606 may be operated in a similar fashion as the cell 604.

The output port 624 of the switched capacitor circuit 600 provides an output voltage ($V_{out}$) which is at binary $2^3$: m transformation (voltage conversion ratio) of the input voltage $V_{in}$ (provides output that is m/$2^3$ of $V_{in}$) with $V_{in}/2^3$ voltage resolution based on the operation of eight switches: the reconfiguration switches 608, 610, 612, 614 and the switches of the input port 622 side and the ground port 626 side within the cells 604, 606. The switched capacitor circuit 600 may exhibit eight (i.e. $2^3$, given three flying capacitors within each switched capacitor cell 602, 604, 606) target conversion ratios 1/8, 1/4, 3/8, 1/2, 5/8, 3/4, 7/8, 1. The output voltage ($V_{out}$) is provided to the load (e.g. microprocessor).

Figure 7:
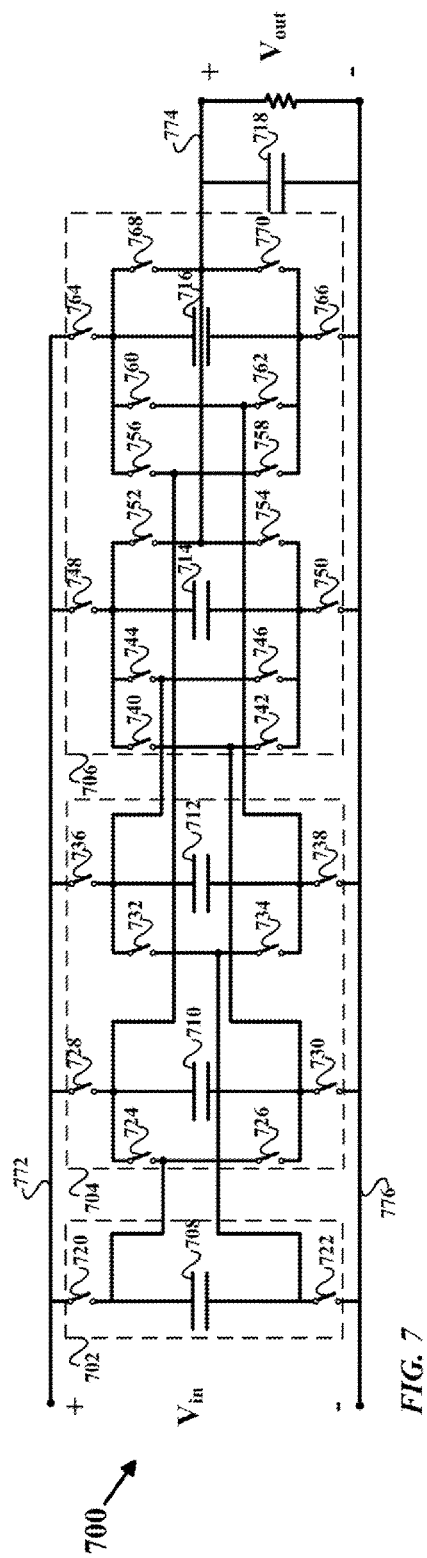
FIG. 7 illustrates an example switched capacitor circuit that may be utilized to provide binary $2^3$: m transformation modes (e.g., 1/8, 1/4, 3/8, 1/2, 5/8, 3/4, 7/8, 1) by utilizing three switched capacitor circuits connected together in cascade.

FIG. 7 illustrates an example switched capacitor circuit 700 that may be utilized to provide binary $2^3$: m transformation modes (e.g., 1/8, 1/4, 3/8, 1/2, 5/8, 3/4, 7/8, 1) by utilizing three switched capacitor circuits 702, 704, 706 connected together in cascade. The circuit 700 may include six capacitors 708, 710, 712, 714, 716, 718, twenty six switches 720-770, an input port 772 to receive an input voltage ($V_{in}$), an output port 774 to produce an output voltage ($V_{out}$), and a ground port 776. The switches may be one or more transistors. The circuit 700 may not include the reconfiguration switches 308, 310, 312, 314, 316, 318, 320, 322 of the circuit 300 (FIG. 3A). In addition, the circuit 700 may not include the output side switches (e.g., the switches 108, 110 of the circuit 100 in FIG. 1A) within each cell 302, 304, 306 of the circuit 300 (FIG. 3A). The circuit 700 exhibits lower number of series connected switches in the charge path (lower resistive loss) and hence the circuit 700 might have higher efficiency and reduced cost.

The switched capacitor cells 702, 704, 706 are connected in cascade and the input voltage ($V_{in}$) is provided across the first switched capacitor cell 702. Each switched capacitor cell of the cells 702, 704, 706 takes two inputs and produces an output voltage which is the average of the voltage at the input port and the ground port of the switched capacitor cell, ($V_{input\ port}+V_{ground\ port}$)/2. The cell 704 (and 706) may include two flying capacitors 710, 712 (714, 716) that may be symmetric and are out of phase to guarantee continuous input current through the input port/ground port of the cell 704 (706).

Each cell 704, 706 might be connected between: the input port 772 and the ground port 776, the output port of the previous cell (702 and 704, respectively) and the ground port 776, or the input port 772 and the output port of the previous cell (702 and 704 respectively). Referring to cell 704, when the switch pair 728/738 is closed and the other switches 724, 726, 730, 732, 734, 736 are open the flying capacitor 710 is connected between the input port 772 and the output of cell 704 and the flying capacitor 712 is connected between the output of cell 704 and the ground port 776, and when the switch pair 730/736 is closed and the other switches 724, 726, 728, 732, 734, 738 are open the flying capacitor 710 is connected between the output of cell 704 and the ground port 776 and the flying capacitor 712 is connected between the input port 772 and the output of cell 704. The pairs of switches 728/738, 730/736 are switched on and off alternatively at a constant frequency. Thus, cell 704 is connected between the input port 772 and the ground port 776. When the switch pair 728/734 is closed and the other switches 724, 726, 730, 732, 736, 738 are open the flying capacitor 710 is connected between the input port 772 and the output of cell 704 and the flying capacitor 712 is connected between the output of cell 704 and the output of previous cell 702, and when the switch pair 726/736 is closed and the other switches 724, 728, 730, 732, 734, 738 are open the flying capacitor 710 is connected between the output of cell 704 and the output of previous cell 702 and the flying capacitor 712 is connected between the input port 772 and the output of cell 704. The switch groups 720/728/734, 722/726/736 are switched on and off alternatively at a constant frequency. Thus, cell 704 is connected between the input port 772 and the output of previous cell 702.

When the switch pair 724/738 is closed and the other switches 728, 726, 730, 732, 736, 734 are open the flying capacitor 710 is connected between the output of previous cell 702 and the output of cell 704 and the flying capacitor 712 is connected between the output of cell 704 and the ground port 776, and when the switch pair 730/732 is closed and the other switches 724, 726, 728, 734, 736, 738 are open the flying capacitor 710 is connected between the output of cell 704 and the ground port 776 and the flying capacitor 712 is connected between the output of previous cell 702 and the output of cell 704. The switch groups 722/724/738, 720/730/732 are switched on and off alternatively at a constant frequency. Thus, cell 704 is connected between the output of previous cell 702 and the ground port 776.

Referring to cell 706, when the switches 748, 754, 766, 768 are closed and the other switches 740, 742, 744, 746, 750, 752, 756, 758, 760, 762, 764, 770 are open the flying capacitor 714 is connected between the input port 772 and the output port 774 and the flying capacitor 716 is connected between the output port 774 and the ground port 776, and when the switches 750, 752, 764, 770 are closed and the other switches 740, 742, 744, 746, 748, 754, 756, 758, 760, 762, 766, 768 are open the flying capacitor 714 is connected between the output port 774 and the ground port 776 and the flying capacitor 716 is connected between the input port 772 and the output port 774. The switch groups 748/754/766/768, 750/752/764/770 are switched on and off alternatively at a constant frequency. Thus, cell 706 is connected between the input port 772 and the ground port 776.

When the switches 748, 754, 758, 762, 768 are closed and the other switches 740, 742, 744, 746, 750, 752, 756, 760, 764, 766, 770 are open the flying capacitor 714 is connected between the input port 772 and the output port 774 and the flying capacitor 716 is connected between the output port 774 and the output of previous cell 704, and when the switches 742, 746, 752, 764, 770 are closed and the other switches 740, 744, 748, 750, 754, 756, 758, 760, 762, 766, 768 are open the flying capacitor 714 is connected between the output port 774 and the output of previous cell 704 and the flying capacitor 716 is connected between the input port 772 and the output port 774. The switch groups 748/754/758/762/768/(726 or 730)/(732 or 736) and 742/746/752/764/770/(724 or 728)/(734 or 738) are switched on and off alternatively at a constant frequency. Thus, cell 706 is connected between the input port 772 and the output of previous cell 704.

When the switches 740, 744, 754, 766, 768 are closed and the other switches 742, 746, 748, 750, 752, 756, 758, 760, 762, 764, 770 are open the flying capacitor 714 is connected between the output of previous cell 704 and the output port 774 and the flying capacitor 716 is connected between the output port 774 and the ground port 776, and when the switches 750, 752, 756, 760, 770 are closed and the other switches 740, 742, 744, 746, 748, 754, 758, 762, 764, 766, 768 are open the flying capacitor 714 is connected between the output port 774 and the ground port 776 and the flying capacitor 716 is connected between the output of previous cell 704 and the output port 774. The switch groups 740/744/754/766/768/(724 or 728)/(734 or 738) and 750/752/756/760/770/(726 or 730)/(732 or 736) are switched on and off alternatively at a constant frequency. Thus, cell 706 is connected between the output of previous cell 704 and the ground port 776.

Figure 8:
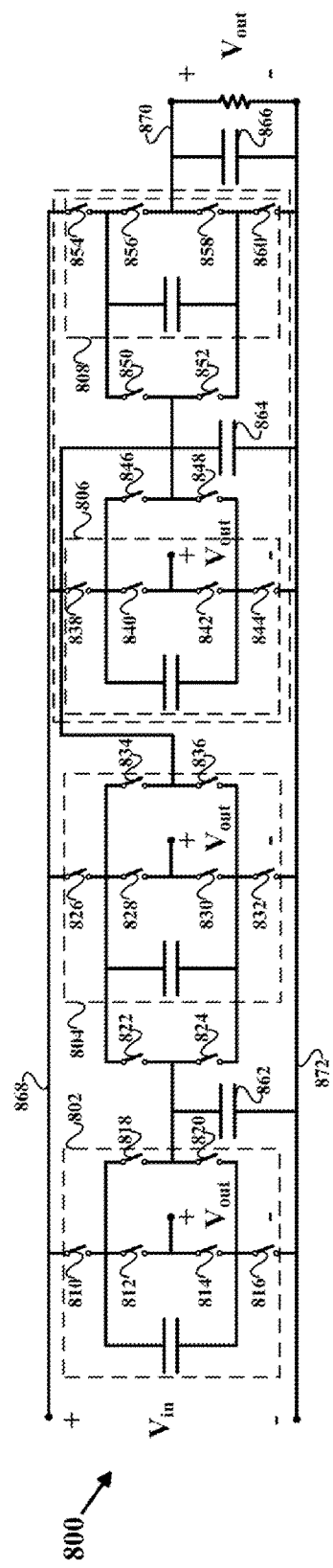
FIG. 8 illustrates an example switched capacitor circuit that may be utilized to provide binary $2^3$: m transformation modes (e.g., 1/8, 1/4, 3/8, 1/2, 5/8, 3/4, 7/8, 1) by utilizing four switched capacitor circuits connected together.

FIG. 8 illustrates an example switched capacitor circuit 800 that may be utilized to provide binary $2^3$: m transformation modes (e.g., 1/8, 1/4, 3/8, 1/2, 5/8, 3/4, 7/8, 1) by utilizing four switched capacitor circuits (e.g., 200) connected together. The circuit 800 may include four switched capacitor cells 802, 804, 806, 808, six reconfiguration switches 822, 824, 846, 848, 850, 852, three capacitors 862, 864, 866, an input port 868 to receive an input voltage ($V_{in}$), an output port 870 to produce an output voltage ($V_{out}$), and a ground port 872. The switches may be one or more transistors. The circuit 800 may guarantee the utilization of the capacitance within the cells 802, 804, 806, 808 in the delivery of the output charge at the output port 870 while providing the modes 1/8, 1/4, 3/8, 1/2, 5/8, 3/4, 7/8, 1, without disconnecting (wasting) the charge-transfer capacitance of any individual cell 802, 804, 806, 808. Thus, higher efficiency might be achieved. For example, the switched capacitor circuit 300 in the 1/2 mode (FIG. 3E) disconnects (wastes) cells 302, 304 while cell 306 is connected to the output. By connecting all the four cells within the circuit 800 to the output $V_{out}$ in the 1/2 mode to provide the output load current, a higher efficiency may be achieved where larger capacitance is involved in the charge transfer process.

The switched capacitor circuit 800 may have a similar structure as the circuit 600. The cell 802 (804) may include an extra switch pair 812, 814 (828, 830) connected to the output voltage $V_{out}$, as may not be the case in the cell 602 (604). Each switched capacitor cell of the cells 802, 804, 806, 808 takes two inputs through the input port and the ground port of the cell and produces, at the output port of the respective switched capacitor cell, an output voltage which is the average of the voltages at the input port and the ground port of the switched capacitor cell, ($V_{input\ port}$+ $V_{ground\ port}$)/2. Each cell 804, 806, 808 might be connected between: the input port 868 and the ground port 872, the output port of the previous cell (802 and 804 respectively) and the ground port 872, or the input port 868 and the output port of the previous cell (802 and 804 respectively).

The switches 810, 812, 814, 816 within the cell 802 may be operated as the switches 106, 108, 110, 112, respectively, in the circuit 100. The switches 810, 818, 820, 816 may be operated as the switches 106, 108, 110, 112, respectively, in the circuit 100. In the cell 802 when the switches 812, 814 are enabled the switches 818, 820 are disabled (gated) and vice versa. Referring to the cell 804, the switches 822, 824, 826, 828, 830, 832 may be operated as the switches 608, 610, 628, 630, 632, 634 respectively, in the circuit 600 (FIG. 6). The switches 822, 824, 826, 834, 836, 832 may be operated as the switches 608, 610, 628, 630, 632, 634 respectively, in the circuit 600. In the cell 804 when the switches 828, 830 are enabled the switches 834, 836 are disabled (gated) and vice versa. Referring to the cell 806, the switches 846, 848, 838, 840, 842, 844 may be operated as the switches 608, 610, 628, 630, 632, 634 respectively, in the circuit 600. The cell 808 may be operated in a similar fashion as the cell 806.

The switched capacitor circuit 800 can be operated to provide the modes 1/8, 3/8, 5/8, 7/8. The circuit 800 is operated as the switched capacitor circuit 600 in the modes 1/8, 3/8, 5/8, 7/8. The switched capacitor cells 802, 804, (806 and 808 as one cell) are connected in cascade and the input voltage ($V_{in}$) is provided across the first switched capacitor cell 802, as the cells 602, 604, 606 respectively. The cells 806, 808 may be connected in parallel and acting as one cell in cascade with the cell 804. The switches 812, 814 within the cell 802 and the switches 828, 830 within the cell 804 are disabled (gated). Each cell 804, (806 and 808 as one cell) might be connected between: the output port of the previous cell (802 and 804 respectively) and the ground port 872, or the input port 868 and the output port of the previous cell (802 and 804 respectively). For example, by connecting the cell 804 between the output port of the previous cell 802 and the ground port 872, and the cells 806, 808 (in parallel) between the input port 868 and the output port of the previous cell 804, the voltage conversion ratio 5/8 can be produced.

The switched capacitor circuit 800 can be operated to provide the modes 1/4, 3/4. The switched capacitor cells 802, 804 are connected in cascade. Besides, the cells 806, 808 are connected in cascade. The cascade of the cells 802, 804 is in parallel to the cascade of the cells 806, 808. The switches 812, 814 within the cell 802 and the switches 834, 836 within the cell 804 are disabled (gated). The switches 840, 842 are disabled and the switches 838, 846, 848, 844 are operated as the switches 106, 108, 110, 112, respectively, in the circuit 100 (FIG. 1A). Each cell 804, 808 might be connected between: the output port of the previous cell (802 and 806 respectively) and the ground port 872, or the input port 868 and the output port of the previous cell (802 and 806 respectively). For example, by connecting the cell 804 between the output port of the previous cell 802 and the ground port 872, and the cell 808 between the output port of the previous cell 806 and the ground port 872, the voltage conversion ratio 1/4 can be produced.

The switched capacitor circuit 800 can be operated to provide the mode 1/2. The switched capacitor cells 802, 804, 806, 808 are connected in parallel. The switches 818, 820, 822, 824, 834, 836, 846, 848, 850, 852 are disabled (gated). Each cell 802, 804, 806, 808 is connected between the input port 868 and the ground port 872 and produces a conversion ratio of 1/2.

The switched capacitor circuit 800 can be operated to provide the mode 1 ($V_{down}=V_{in}$). The switched capacitor cells 802, 804, 806, 808 are connected in parallel. The switches 818, 820, 822, 824, 834, 836, 846, 848, 850, 852 are disabled (gated). Each cell 802, 804, 806, 808 is connected between the input port 868 and the ground port 872. The switch groups 810/812/814/816, 826/828/830/832, 838/840/842/844, 854/856/858/860 are operated as the switches 336, 338, 340, 342, respectively, in the circuit 300 (FIG. 3F).

I presently contemplate for the circuit 800 that the flying capacitance of the successive cells 802, 804, (806 and 808 as one cell) are weighted of the total circuit 800 flying capacitance C; e.g., the flying capacitance of cell 802 is C/7, the flying capacitance of cell 804 is 2C/7, the flying capacitance of cell 806 is 4C/21, and the flying capacitance of cell 808 is 8C/21. However the cells 802, 804, 806, 808 capacitances can have different relative sizes, such as equal sizing of cells capacitances, etc. The weighted capacitances C/7, 2C/7, 4C/7 of the successive cells 802, 804, (806 and 808 as one cell) may provide optimal relative sizing of the successive capacitances, in the modes 1/8, 3/8, 5/8, 7/8, and hence higher efficiency can be achieved for certain total flying capacitance C of the circuit 800. The weighted capacitances C/7, 2C/7 of the successive cells 802, 804 and 4C/21, 8C/21 of the successive cells 806, 808 may provide optimal relative sizing of the successive capacitances, in the modes 1/4, 3/4 and hence higher efficiency can be achieved for certain total flying capacitance C of the circuit 800. Similarly, the switches conductance of the successive cells 802, 804, 806, 808 may be weighted of the total circuit 800 conductance G; G/7, 2G/7, 4G/21, 8G/21, respectively, for better efficiency.

Figure 9:
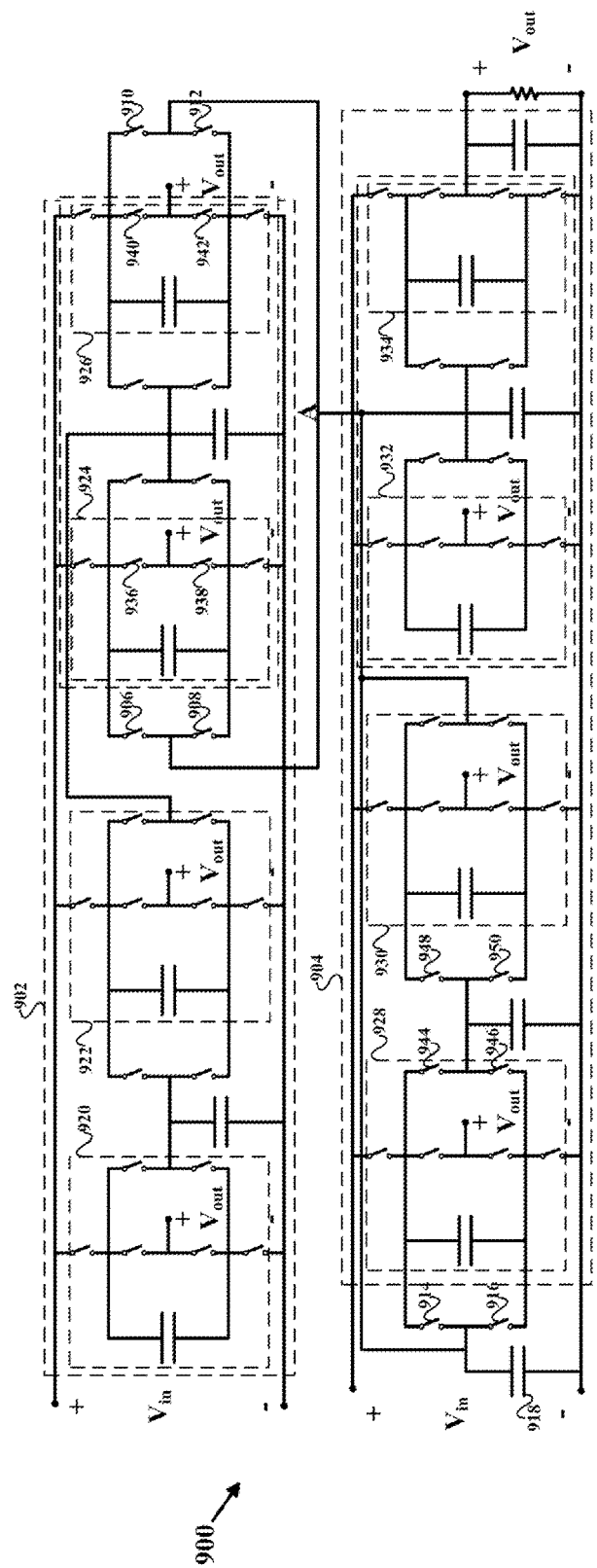
FIG. 9 illustrates an example switched capacitor circuit that may be utilized to provide binary $2^4$: m transformation modes (e.g., $2^4$ modes: 1/16, 2/16, . . . , 15/16, 1) by utilizing two switched capacitor circuits connected together.

Higher output voltage resolution (e.g., 4-bit) may be obtained by cascading the circuit 800 with another circuit (i.e., 800) and utilizing extra switches. FIG. 9 illustrates an example switched capacitor circuit 900 that may be utilized to provide binary $2^4$: m transformation modes (e.g., $2^4$ modes: 1/16, 2/16, . . . , 15/16, 1) by utilizing two switched capacitor circuits (i.e., 800) connected together. The circuit 900 may include two switched capacitor cells 902, 904, three switch pairs 906/908, 910/912, 914/916, and a capacitor 918. The switch pair 906/908 is connected to the cell 924. The switch pair 910/912 is connected to the cell 926. The switch pair 914/916 is connected to the cell 928. The input port and ground port of the cell 902 are connected to the corresponding input port and ground port of the cell 904. The node A is connected to the switch pairs 906/908, 910/912, 914/916 and to the cells 930, 932, 934, therefore cell 904 is in cascade with cells 924, 926 as one cell and the circuit 900 consists of four cascaded cells 920, 922, (924 and 926 as one cell), 904.

The switched capacitor circuit 900 can be operated to provide the modes 1/16, 3/16, 5/16, . . . , 15/16. The switches 936, 938, 940, 942, 944, 946, 948, 950 are disabled (gated). The switched capacitor cells 920, 922, (924 and 926 as one cell), 904 are connected in cascade and the input voltage ($V_{in}$) is provided across the first switched capacitor cell 920. The cells 924, 926 are connected in parallel and acting as one cell in cascade with the cell 922. The cells 928, 930, 932, 934 are connected in parallel and acting as one cell in cascade with (924 and 926 in parallel). Each cell 922, (924 and 926 as one cell), (928, 930, 932 and 934 as one cell) may be connected between: the output port of the previous cell (920, 922, and (924 and 926 as one cell) respectively) and the circuit 900 ground port, or the circuit 900 input port and the output port of the previous cell (920, 922, and (924 and 926 as one cell) respectively). For example, by connecting the cell 922 between the output port of the previous cell 920 and the circuit 900 ground port, the cells 924, 926 (in parallel) between the circuit 900 input port and the output port of the previous cell 922, and the cells 928, 930, 932, 934 (in parallel) between the circuit 900 input port and the output port of the previous cells 924, 926 (in parallel) the voltage conversion ratio 13/16 can be produced.

The switched capacitor circuit 900 can be operated to provide the other modes 1/8, 2/8, 3/8, . . . , 1. The switches 906, 908, 910, 912, 914, 916 are disabled (gated) and therefore the cells 902, 904 can be operated as two circuits as the switched capacitor circuit 800, in parallel.

I presently contemplate for the circuit 900 that the flying capacitance of the successive cells 920, 922, (924 and 926 as one cell), 904 are weighted of the total circuit 900 flying capacitance C; e.g., the flying capacitance of cell 920 is C/15, the flying capacitance of cell 922 is 2C/15, the flying capacitance of cell 924 is 4C/45 and 926 is 8C/45, and the flying capacitance of cell 928 is 8C/105, 930 is 16C/105, 932 is 32C/315, and 934 is 64C/315. However the cells 920, 922, (924 and 926 as one cell), 904 capacitances can have different relative sizes, such as equal sizing of cells capacitances, etc. The weighted capacitances C/15, 2C/15, 4C/15, 8C/15 of the successive cells 920, 922, (924 and 926 as one cell), 904 may provide optimal relative sizing of the successive capacitances in the modes 1/16, 3/16, 5/16, . . . , 15/16 and hence higher efficiency can be achieved for certain total flying capacitance C of the circuit 900; similarly in the 3-bit modes 1/8, 3/8, 5/8, 7/8 or the 2-bit modes 1/4, 3/4.

Similarly a 5-bit output voltage resolution may be obtained by cascading the circuit 900 with another circuit (i.e., 900). The last cell 904 (within the circuit 900) is cascaded with another circuit 900 by utilizing some type of switching mechanism.

It should be noted that the switched capacitor circuit 800 can be considered a 3-bit switched capacitor circuit which provides up to 3-bit output voltage resolution (provides $2^3$ modes 1/8, 2/8, 3/8, . . . , 1). Similarly, the switched capacitor circuit 900 can be considered a 4-bit switched capacitor circuit which provides up to 4-bit output voltage resolution (provides $2^4$ modes: 1/16, 2/16, 3/16, . . . , 1).

Figure 10:
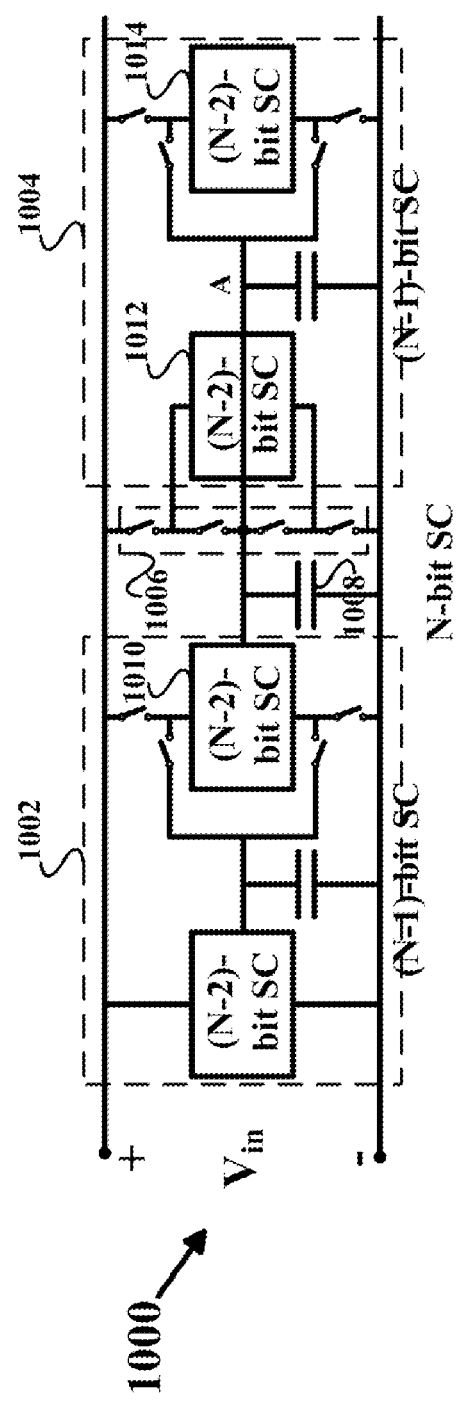
FIG. 10 illustrates an example configuration of a switched capacitor circuit that may be utilized to provide binary $2^N$: m transformation modes (e.g., $1/2^N, 2/2^N, 3/2^N, \ldots, 1$) by utilizing two (N−1)-bit switched capacitor circuits connected together.

Recursion in computer science is a method where the solution to a problem depends on solutions to smaller instances of the same problem. The circuits 800, 900 may have a recursive operation as illustrated in FIG. 8, FIG. 9. FIG. 10 illustrates an example configuration of a switched capacitor circuit 1000 that may be utilized to provide binary $2^N$: m transformation modes (e.g., $1/2^N$, $2/2^N$, $3/2^N$, . . . , 1) by utilizing two (N−1)-bit switched capacitor circuits connected together. The circuit 1000 may include two (N−1)-bit switched capacitor cells 1002, 1004, a reconfiguration switch block 1006, and a capacitor 1008. The input port and ground port of the cell 1002 are connected to the corresponding input port and ground port of the cell 1004. The reconfiguration switch block 1006 connects the output port of the second cell 1010 within the switched capacitor cell 1002 to the input port and the ground port of the first cell 1012 within the switched capacitor cell 1004. The output port of the last cell 1010 within the switched capacitor cell 1002 is connected to node A of the second cell 1014 within the cell 1004. While not illustrated, the comprising cells of the cells 1002, 1004 are connectible to the output port of the circuit 1000 ($V_{out}$). Each switched capacitor cell 1002, 1004 can generate the modes $1/2^{(N-1)}$, $2/2^{(N-1)}$, . . . , 1. The capacitor 1008 may provide decoupling and charge balance between the cells 1002, 1004.

The reconfiguration switch block 1006 can be operated as the switches 308, 310, 312, 314 (FIG. 3A). The cell 1004 can be connected between: the output port of the cell 1010 within the switched capacitor cell 1002 and the ground port of the circuit 1000, or the input port of the circuit 1000 and the output port of the cell 1010. The cells 1002, 1004 can constitute N cells, each of 2:1 transformation ratio (e.g., 200), in cascade, where the cells 1010, 1004 constitute the last two cells in such N sequence, and hence the modes $1/2^N$, $3/2^N$, . . . , 1 can be produced. By connecting the cell 1012 between the input port and the ground port of the circuit 1000 and connecting the output port of the cell 1010 to the output port of the circuit 1000 ($V_{out}$) instead of node A the (N−1)-bit cells 1002, 1004 may be operated in parallel and therefore the modes $1/2^{N-1}$, $3/2^{N-1}$, . . . , 1 may be provided. A similar approach can be followed to realize the modes $1/2^{N-2}$, $3/2^{N-2}$, . . . , 1, where the four (N−2) cells are connected in parallel and to $V_{out}$, and so on: N−3, N−4, . . . , 1. It should be noted that the reconfiguration switch block 1006 may be fully or partially embedded within the cells 1010, 1012 for example as in the circuit 600 (FIG. 6) or the circuit 700 (FIG. 7).

I presently contemplate that the successive cells 1010, 1004 within the circuit 1000 may have a binary relative sizing e.g., the flying capacitance (conductance) of cell 1004 is twice the flying capacitance (conductance) of cell 1010. However the capacitances (conductance) of the cells 1010, 1004 can have different relative sizes, such as equal sizing of cells, etc. The binary relative sizing of the successive cells 1010, 1004 may provide optimal relative sizing of the successive flying capacitances (conductance), in the modes $1/2^N$, $3/2^N$, . . . , 1, and hence higher efficiency can be achieved for certain total flying capacitance (conductance) of the circuit 1000.

FIG. 11A illustrates an example switched capacitor circuit 1100 that may be utilized to provide binary $2^3$: m transformation modes (e.g., 1/8, 1/4, 3/8, 1/2, 5/8, 3/4, 7/8, 1) by utilizing three switched capacitor circuits (e.g., 200) connected together in cascade. The circuit 1100 may include three switched capacitor cells (i.e., 200) 1102, 1104, 1106, eight reconfiguration switches 1108, 1110, 1112, 1114, 1116, 1118, 1120, 1122, three capacitors 1124, 1126, 1128, an input port 1130 to receive an input voltage ($V_{in}$), an output port 1132 to produce an output voltage ($V_{out}$), and a ground port 1134. The switches may be one or more transistors. The switched capacitor cells 1102, 1104, 1106 are connected in cascade and the input voltage ($V_{in}$) is provided across the first switched capacitor cell 1102. Each switched capacitor cell of the cells 1102, 1104, 1106 takes two inputs and produces, at the output port of the switched capacitor cell, an output voltage which is the average of the voltage at the input port and the ground port of the switched capacitor cell, ($V_{input\ port}+V_{ground\ port}$)/2. Each cell 1104, 1106 might be connected between: the input port and the ground port of the previous cell (1102 and 1104 respectively), the output port and the ground port of the previous cell (1102 and 1104 respectively), or the input port and the output port of the previous cell (1102 and 1104 respectively).

When the switches 1108, 1114 are closed and the other switches 1110, 1112 are open the switched capacitor cell 1104 is connected between the input port 1130 and the ground port 1134 of the switched capacitor circuit 1100. When the switches 1108, 1112 are closed and the other switches 1110, 1114 are open the switched capacitor cell 1104 is connected between the input port and the output port of the previous switched capacitor cell 1102. When the switches 1110, 1114 are closed and the other switches 1108, 1112 are open the switched capacitor cell 1104 is connected between the output port and the ground port of the previous switched capacitor cell 1102.

When the switches 1116, 1122 are closed and the other switches 1118, 1120 are open the switched capacitor cell 1106 is connected between the input port and the ground port of the previous switched capacitor cell 1104. When the switches 1116, 1120 are closed and the other switches 1118, 1122 are open the switched capacitor cell 1106 is connected between the input port and the output port of the previous switched capacitor cell 1104. When the switches 1118, 1122 are closed and the other switches 1116, 1120 are open the switched capacitor cell 1106 is connected between the output port and the ground port of the previous switched capacitor cell 1104. The capacitors 1124, 1126, 1128 can act as decoupling capacitors and reduce the voltage ripple at the output ports of the switched capacitor cells 1102, 1104, 1106 respectively. The capacitors 1124, 1126 can be applied for the purpose of charge balance between the consecutive switched capacitor cells: 1102, 1104 and 1104, 1106.

The output port 1132 of switched capacitor circuit 1100 provides an output voltage ($V_{out}$) which is at binary $2^3$: m transformation (voltage conversion ratio) of the input voltage $V_{in}$ (provides output that is m/$2^3$ of $V_{in}$) with $V_{in}/2^3$ voltage resolution based on the state of the reconfiguration switches 1108, 1110, 1112, 1114, 1116, 1118, 1120, 1122. The switched capacitor circuit 1100 may exhibit eight (i.e. $2^3$, given three flying capacitors within the switched capacitor cells 1102, 1104, 1106) target conversion ratios 1/8, 1/4, 3/8, 1/2, 5/8, 3/4, 7/8, 1. The voltage conversion ratio of the switched capacitor circuit 1100 is changed to one of the available conversion ratios 1/8, 1/4, 3/8, 1/2, 5/8, 3/4, 7/8, 1 (modes) by controlling the state of the reconfiguration switches 1108, 1110, 1112, 1114, 1116, 1118, 1120, 1122. The output voltage ($V_{out}$) is provided to the load (e.g. microprocessor).

The switched capacitor circuit 1100 can be operated to provide the modes 1/8, 3/8, 5/8, 7/8. When the switches 1110, 1114, 1118, 1122 are closed and the other switches 1108, 1112, 1116, 1120 are open the cell 1104 is connected between the output port and the ground port of the cell 1102 while the cell 1106 is connected between the output port and the ground port of the cell 1104 and therefore the mode 1/8 is produced. When the switches 1110, 1114, 1116, 1120 are closed and the other switches 1108, 1112, 1118, 1122 are open the cell 1104 is connected between the output port and the ground port of the cell 1102 while the cell 1106 is connected between the input port and the output port of the cell 1104 and therefore the mode 3/8 is produced. When the switches 1108, 1112, 1118, 1122 are closed and the other switches 1110, 1114, 1116, 1120 are open the cell 1104 is connected between the input port and the output port of the cell 1102 while the cell 1106 is connected between the output port and the ground port of the cell 1104 and therefore the mode 5/8 is produced. When the switches 1108, 1112, 1116, 1120 are closed and the other switches 1110, 1114, 1118, 1122 are open the cell 1104 is connected between the input port and the output port of the cell 1102 while the cell 1106 is connected between the input port and the output port of the cell 1104 and therefore the mode 7/8 is produced.

The switched capacitor circuit 1100 can be operated to provide the modes 1/4, 3/4. When the switches 1108, 1114, 1118, 1122 are closed and the other switches 1110, 1112, 1116, 1120 are open the cell 1104 is connected between the input port 1130 and the ground port 1134 while the cell 1106 is connected between the output port and the ground port of the cell 1104 and therefore the mode 1/4 is produced. When the switches 1108, 1114, 1116, 1120 are closed and the other switches 1110, 1112, 1118, 1122 are open the cell 1104 is connected between the input port 1130 and the ground port 1134 while the cell 1106 is connected between the input port and the output port of the cell 1104 and therefore the mode 3/4 is produced.

The switched capacitor circuit 1100 can be operated to provide the mode 1/2. When the switches 1108, 1114, 1116, 1122 are closed and the other switches 1110, 1112, 1118, 1120 are open the cell 1106 is connected between the input port 1130 and the ground port 1134 and therefore the mode 1/2 is produced.

The switched capacitor circuit 1100 can be operated to provide the mode 1 ($V_{down}=V_{in}$). When the switches 1108, 1114, 1116, 1122 are closed and the other switches 1110, 1112, 1118, 1120 are open the cell 1106 is connected between the input port 1130 and the ground port 1134. The cell 1106 is operated as the cell 306 in the circuit 300 (FIG. 3F).

The resolution of the circuit 1100 may be $V_{in}/2^3$. The resolution may be improved by dithering between two conversion ratios (m/$2^3$ and (m+1)/$2^3$; m=0, 1, 2, . . . , 7). In order to obtain an output voltage $V_{out}$ between two discrete conversion ratios the circuit 1100 may dither between two modes (m/$2^3$ and (m+1)/$2^3$; m=0, 1, 2, . . . , 7), through dithering the reconfiguration switches 1108, 1110, 1112, 1114, 1116, 1118, 1120, 1122, in a duty cycle for each respective mode determined by the desired $V_{out}$. The duty cycle for each mode may be between 0% and 100% of a cycle time, 0%<duty cycle<100%. Dithering may be performed between two neighboring modes and in a more elaborate control, dithering may be performed over several (more than two) modes.

I presently contemplate for the circuit 1100 that the flying capacitance (conductance) of the successive cells 1102, 1104, 1106 are weighted of the total circuit 1100 flying capacitance (conductance): e.g. the flying capacitance (conductance) of cell 1102 is 1/7, the flying capacitance (conductance) of cell 1104 is 2/7, and the flying capacitance (conductance) of cell 1106 is 4/7. However the successive cells 1102, 1104, 1106 capacitances (conductance) can have different relative sizes, such as equal sizing of successive cells, etc. The weighted capacitances (conductance) 1/7, 2/7, 4/7 of the successive cells 1102, 1104, 1106 may provide optimal relative sizing of the successive capacitances (conductance), in the modes 1/8, 3/8, 5/8, 7/8, and hence higher efficiency can be achieved for certain total flying capacitance (conductance) of the circuit 1100.

FIG. 11B illustrates an example switched capacitor circuit 1136 that may be utilized to provide binary $2^3$: m transformation modes (e.g., 1/8, 1/4, 3/8, 1/2, 5/8, 3/4, 7/8, 1) by utilizing three switched capacitor circuits (e.g., 200 and 500) connected together. The circuit 1136 may include three switched capacitor cells 1138, 1140, 1142, eight reconfiguration switches 1144, 1146, 1148, 1150, 1152, 1154, 1156, 1158, and an output capacitor 1160. The circuit 1136 may be similar in operation to the circuit 1100. The switches 1144, 1146, 1148, 1150, 1152, 1154, 1156, 1158 are operated similar to the switches 1108, 1110, 1112, 1114, 1116, 1118, 1120, 1122, respectively in order to provide the modes 1/8, 1/4, 3/8, 1/2, 5/8, 3/4, 7/8, 1. The circuit 1136 may not include the capacitors 1124, 1126 (FIG. 11A) since the charge balance may be accomplished by the out of phasing within the cells 1140, 1142.

Figure 12A:
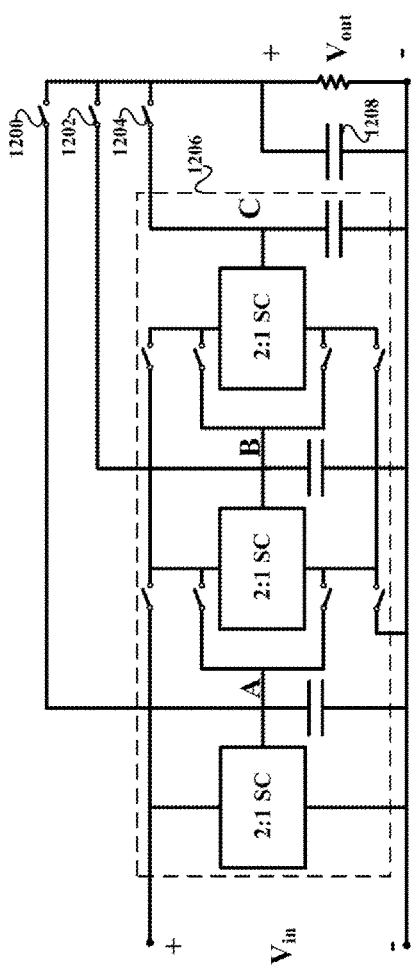
FIG. 12A illustrates an example output selection circuit of a switched capacitor circuit.

FIG. 12A illustrates an example output selection circuit of a switched capacitor circuit (e.g., 1100). The selection circuit may include three selection switches 1200, 1202, 1204, a switched capacitor circuit 1206 consisting of three switched capacitor cells (e.g., 1100), and a capacitor 1208. The selection switches 1200, 1202, 1204 are connected to the internal nodes A, B, C, respectively, within the circuit 1206. The switches 1200, 1202, 1204 may be operated as the switches 400, 402, 404, respectively (FIG. 4A). When $V_{out}$ is connected to node A the conversion ratio of the switched capacitor circuit 1206 may be $V_{in}/2$. When $V_{out}$ is connected to node B the conversion ratio of the switched capacitor circuit 1206 may be $V_{in}/2$, $V_{in}/4$, or $3V_{in}/4$. When $V_{out}$ is connected to node C the conversion ratio of the switched capacitor circuit 1206 may be $V_{in}/2$, $V_{in}/4$, $3V_{in}/4$, $V_{in}/8$, $3V_{in}/8$, $5V_{in}/8$, or $7V_{in}/8$. When the switches 1200, 1202, 1204 are closed the conversion ratio of the circuit 1206 may be $V_{in}/2$ without disconnecting any switched capacitor cell within the circuit 1206. The switched capacitor circuit 1100 in the 1/2 mode (FIG. 11A) disconnects cells 1102, 1104 while cell 1106 is connected to the output. By connecting all the three cells within the circuit 1206 to the output $V_{out}$ in the 1/2 mode to provide the output load current, a higher efficiency may be achieved where larger flying capacitance is involved in the charge transfer process.

The output selection switches 1200, 1202, 1204 may be utilized to provide an output voltage level in between two discrete conversion ratios (m/$2^3$ and (m+1)/$2^3$; m=1, 2, . . . , 7). The output selection switches may provide a resistive mechanism which regulates the output voltage $V_{out}$ at a desired level. The capacitor 1208 may act with the equivalent resistance of the switches 1200, 1202, 1204 as a low pass filter. When either of the switches 1200 or 1202 is on the switch 1204 is off and vice versa. The switches 1204 and (1200 or 1202) may be switched on and off alternatively at a constant frequency. The on cycle may be between 0% and 100% of the cycle time, 0%<on cycle<100%. When the voltage level $V_{in}/8$ is generated at node C a voltage of $V_{in}/4$ is produced at node B. The output voltage ($V_{out}$) may dither between node C and node B through the switches 1204, 1202 respectively by a duty cycle (on cycle) determined by the desired level in between $V_{in}/8$ and $V_{in}/4$. When the voltage level $3V_{in}/8$ is generated at node C a voltage of $V_{in}/2$ is produced at node A. The output voltage ($V_{out}$) may dither between node C and node A through the switches 1204, 1200 respectively by a duty cycle (on cycle) determined by the desired level in between $3V_{in}/8$ and $V_{in}/2$. A similar operation may be followed to generate output levels in between the other ratios. The frequency of operation may be fixed which might be of importance to some sensitive circuits. In this embodiment, dithering was performed between two neighboring modes. In a more elaborate control, dithering may be performed over several (more than two) modes.

Figure 12B:
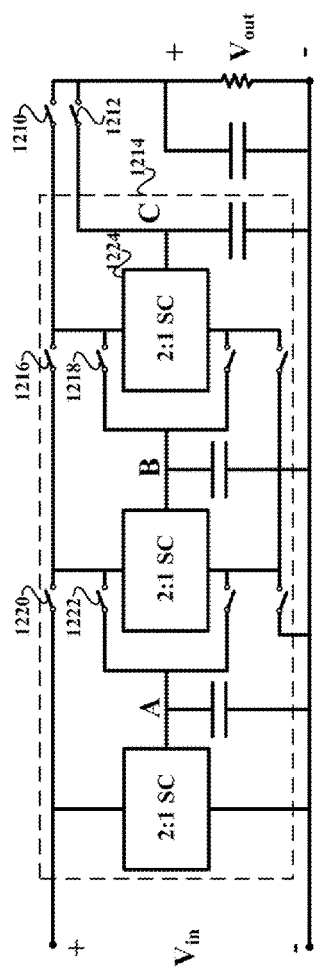
FIG. 12B illustrates an example output selection circuit embedded within a switched capacitor circuit.

The output selection switches 1200, 1202 might be embedded in some of the switches of the circuit 1206. This embodiment is illustrated in FIG. 12B. When the switches 1210, 1216, 1220 are closed and the other switches 1212, 1218, 1222 are open $V_{out}$ is connected to $V_{in}$. When the switches 1210, 1216, 1222 are closed and the other switches 1212, 1218, 1220 are open $V_{out}$ is connected to node A and the conversion ratio of the switched capacitor circuit 1214 may be $V_{in}/2$. When the switches 1210, 1218 are closed and the other switch 1216 is open $V_{out}$ is connected to node B and the conversion ratio of the switched capacitor circuit 1214 may be $V_{in}/2$, $V_{in}/4$, or $3V_{in}/4$. When the switch 1212 is closed $V_{out}$ is connected to node C and the conversion ratio of the switched capacitor circuit 1214 may be $V_{in}/2$, $V_{in}/4$, $3V_{in}/4$, $V_{in}/8$, $3V_{in}/8$, $5V_{in}/8$, or $7V_{in}/8$.

As in FIG. 12A, the embedded output selection switches in FIG. 12B can be utilized to provide an output voltage level in between two discrete conversion ratios (m/$2^3$ and (m+1)/$2^3$; m=1, 2, . . . , 7). The output selection switches may provide a resistive mechanism which regulates the output voltage $V_{out}$ at a desired level. When the switch 1210 is on the switch 1212 is off and vice versa. The switches 1210, 1212 may be switched on and off alternatively at a constant frequency. The on cycle may be between 0% and 100% of the cycle time, 0%<on cycle<100%. When the voltage level $V_{in}/8$ is generated at node C a voltage of $V_{in}/4$ is produced at node B. The output voltage ($V_{out}$) may be dithered between node C and node B through the switches 1212, 1210 respectively by a duty cycle (on cycle) determined by the desired level in between $V_{in}/8$ and $V_{in}/4$. When the voltage level $3V_{in}/8$ is generated at node C a voltage of $V_{in}/2$ is produced at node A. The output voltage ($V_{out}$) may dither between node C and node A through the switches 1212, 1210 respectively by a duty cycle (on cycle) determined by the desired level in between $3V_{in}/8$ and $V_{in}/2$. A similar operation may be followed to generate output levels in between the other ratios. In order to generate voltages between $V_{in}/2$, $5V_{in}/8$ a switch may be connected between the ground port of the cell 1224 and $V_{out}$ and may be operated in place of the switch 1210. The frequency of operation may be fixed which might be of importance to some sensitive circuits. In this embodiment, dithering was performed between two neighboring modes. In a more elaborate control, dithering may be performed over several (more than two) modes. In an embodiment, the switch 1210 may be connected between the ground port of the cell 1224 and $V_{out}$.

Figure 13:
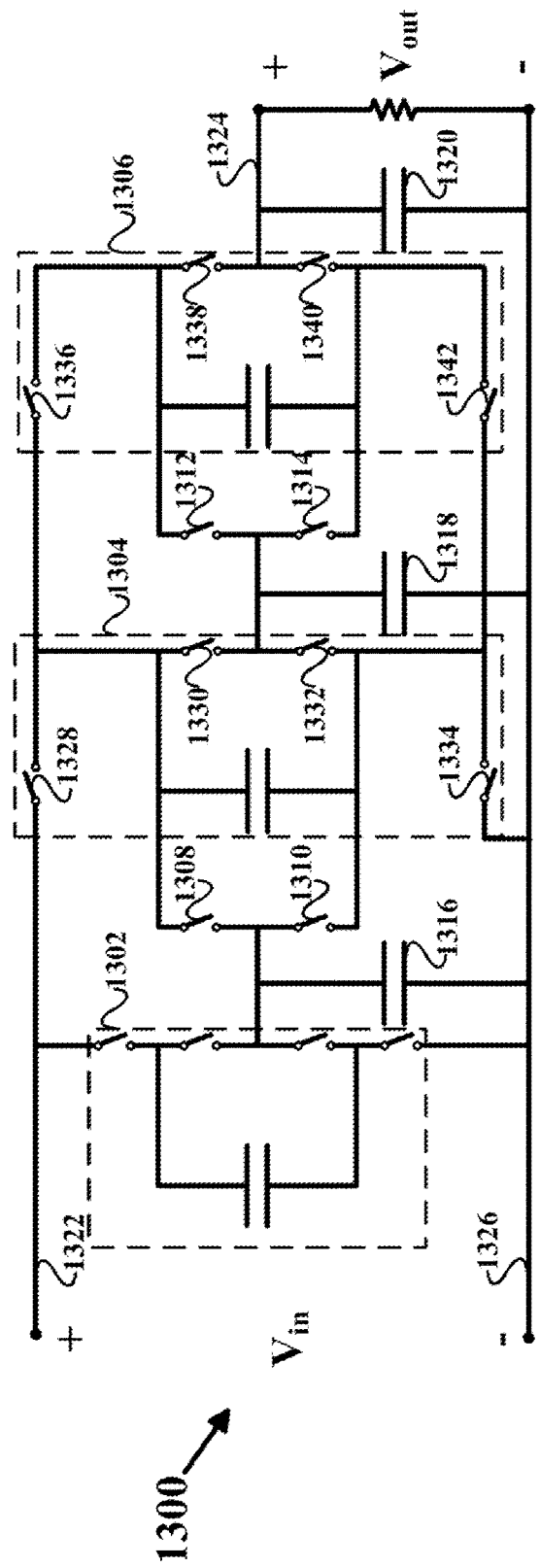
FIG. 13 illustrates an example switched capacitor circuit that may be utilized to provide binary $2^3$: m transformation modes (e.g., 1/8, 1/4, 3/8, 1/2, 5/8, 3/4, 7/8, 1) by utilizing three switched capacitor circuits connected together in cascade.

The reconfiguration switches within the circuit 1100 may be embedded in the switches of the cells 1104, 1106. FIG. 13 illustrates an example switched capacitor circuit 1300 that may be utilized to provide binary $2^3$: m transformation modes (e.g., 1/8, 1/4, 3/8, 1/2, 5/8, 3/4, 7/8, 1) by utilizing three switched capacitor circuits (e.g., 200) connected together in cascade. The circuit 1300 may include three switched capacitor cells (i.e., 200) 1302, 1304, 1306, four reconfiguration switches 1308, 1310, 1312, 1314, three capacitors 1316, 1318, 1320, an input port 1322 to receive an input voltage ($V_{in}$), an output port 1324 to produce an output voltage ($V_{out}$), and a ground port 1326. The switches may be one or more transistors. The circuit 1300 may not include the input side switches 1108, 1116 and ground side switches 1114, 1122 of the circuit 1100 (FIG. 11A). The reduced number of reconfiguration switches might reduce cost and might enhance the efficiency. The reconfiguration switches 1308, 1310, 1312, 1314 may be switched on and off alternatively at a constant frequency while the reconfiguration switches 1108, 1110, 1112, 1114, 1116, 1118, 1120, 1122 of the circuit 1100 (FIG. 11A) may be operated as static switches.

The switched capacitor cells 1302, 1304, 1306 are connected in cascade and the input voltage ($V_{in}$) is provided across the first switched capacitor cell 1302. Each switched capacitor cell of the cells 1302, 1304, 1306 takes two inputs and produces, at the output port of the switched capacitor cell, an output voltage which is the average of the voltage at the input port and the ground port of the switched capacitor cell, ($V_{input\ port}+V_{ground\ port}$)/2. The cell 1302 may be operated as the cell 100 (FIG. 1A). The switches 1308, 1310, 1328, 1330, 1332, 1334 may be operated as the switches 608, 610, 628, 630, 632, 634, respectively (FIG. 6). The switches 1312, 1314, 1336, 1338, 1340, 1342 may be operated as the switches 608, 610, 628, 630, 632, 634, respectively (FIG. 6). Thus, each cell 1304, 1306 might be connected between: the input port and the ground port of the previous cell (1302 and 1304 respectively), the output port and the ground port of the previous cell (1302 and 1304 respectively), or the input port and the output port of the previous cell (1302 and 1304 respectively).

When the switch 1308 or 1328 is closed either the switch 1312 or 1336 is closed. When the switch 1310 or 1334 is closed either the switch 1314 or 1342 is closed. In other words the flying capacitor of the cell 1306 is in phase with the flying capacitor of the cell 1304. When the flying capacitor of the cell 1304 is connected to the input port or the output port of the cell 1302 the flying capacitor of the cell 1306 is connected to either the input port or the output port of the cell 1304. When the flying capacitor of the cell 1304 is connected to the output port or the ground port of the cell 1302 the flying capacitor of the cell 1306 is connected to either the output port or the ground port of the cell 1304.

Figure 14:
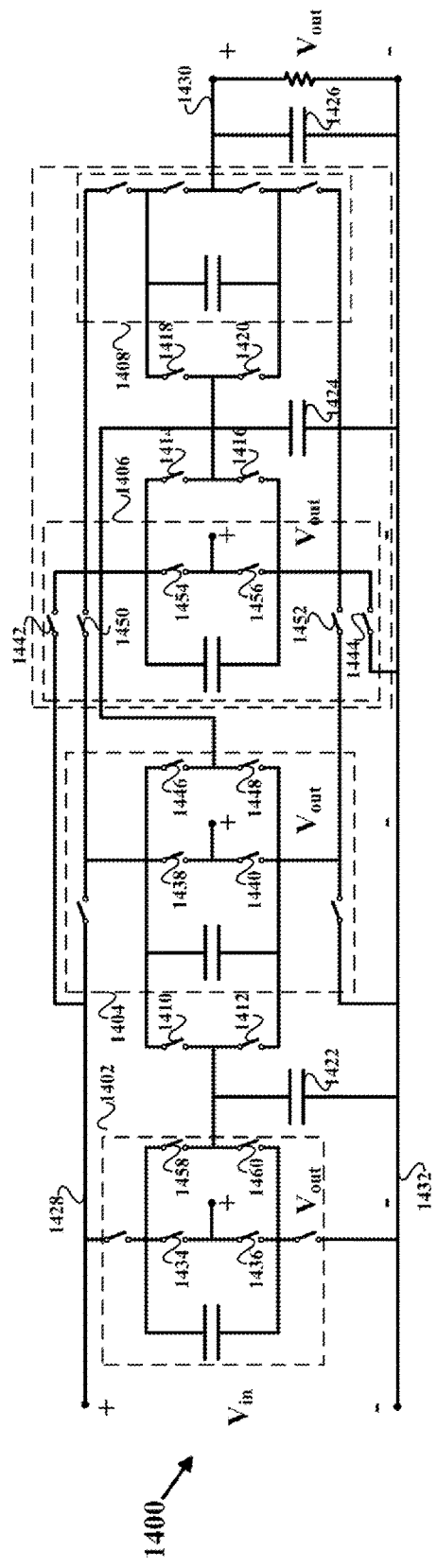
FIG. 14 illustrates an example switched capacitor circuit that may be utilized to provide binary $2^3$: m transformation modes (e.g., 1/8, 1/4, 3/8, 1/2, 5/8, 3/4, 7/8, 1) by utilizing four switched capacitor circuits connected together.

As FIG. 8, FIG. 14 illustrates an example switched capacitor circuit 1400 that may be utilized to provide binary $2^3$: m transformation modes (e.g., 1/8, 1/4, 3/8, 1/2, 5/8, 3/4, 7/8, 1) by utilizing four switched capacitor circuits (e.g., 200) connected together. The circuit 1400 may include four switched capacitor cells 1402, 1404, 1406, 1408, six reconfiguration switches 1410, 1412, 1414, 1416, 1418, 1420, three capacitors 1422, 1424, 1426, an input port 1428 to receive an input voltage ($V_{in}$), an output port 1430 to produce an output voltage ($V_{out}$), and a ground port 1432. The switches may be one or more transistors. The circuit 1400 may guarantee the utilization of the capacitance within the cells 1402, 1404, 1406, 1408 in the delivery of the output charge at the output port 1430 while providing the modes 1/8, 1/4, 3/8, 1/2, 5/8, 3/4, 7/8, 1, without disconnecting (wasting) any individual cell 1402, 1404, 1406, 1408 charge-transfer capacitance. For example, the switched capacitor circuit 1300 in the 1/2 mode (FIG. 13) disconnects (wastes) cells 1302, 1304 while cell 1306 is connected to the output. By connecting all the four cells within the circuit 1400 to the output $V_{out}$ in the 1/2 mode to provide the output load current, a higher efficiency may be achieved where larger capacitance is involved in the charge transfer process.

The switched capacitor circuit 1400 may have a similar structure as the circuit 1300. The circuit 1400 may include a fourth cell 1408, as may not be the case in the circuit 1300. The cell 1402 (1404) may include an extra switch pair 1434, 1436 (1438, 1440) connected to the output voltage $V_{out}$, as may not be the case in the cell 1302 (1304). The cell 1406 may include extra switches 1442, 1444 connected to the input port 1428 and the ground port 1432, as may not be the case in the cell 1306. As discussed in the circuit 1300 (FIG. 13), the flying capacitors of the cells 1404, 1406, 1408 are switched in phase. Each switched capacitor cell of the cells 1402, 1404, 1406, 1408 takes two inputs through the input port and the ground port of the cell and produces, at the output port of the respective switched capacitor cell, an output voltage which is the average of the voltages at the input port and the ground port of the switched capacitor cell, ($V_{input\ port}+V_{ground\ port}$)/2.

The switched capacitor circuit 1400 can be operated to provide the modes 1/8, 3/8, 5/8, 7/8. The circuit 1400 is operated as the switched capacitor circuit 1300 in the modes 1/8, 3/8, 5/8, 7/8. The switched capacitor cells 1402, 1404, (1406 and 1408 as one cell) are connected in cascade and the input voltage ($V_{in}$) is provided across the first switched capacitor cell 1402, as the cells 1302, 1304, 1306 respectively. The cells 1406, 1408 may be connected in parallel and may be operated as one cell in cascade with the cell 1404. The switches 1434, 1436 within the cell 1402, the switches 1438, 1440 within the cell 1404, and the switches 1442, 1444 are disabled (gated). The cells 1402, 1404, (1406 and 1408 as one cell) may be operated as the cells 1302, 1304, 1306 (FIG. 13), respectively in the modes 1/8, 3/8, 5/8, 7/8. Each cell 1404, (1406 and 1408 as one cell) might be connected between: the output port and the ground port of the previous cell (1402 and 1404 respectively), or the input port and the output port of the previous cell (1402 and 1404 respectively). As an example, by connecting the cell 1404 between the output port and the ground port of the cell 1402, and the cells 1406, 1408 (in parallel) between the input port and the output port of the previous cell 1404, the voltage conversion ratio 3/8 can be produced.

The switched capacitor circuit 1400 can be operated to provide the modes 1/4, 3/4. The switched capacitor cells 1402, 1404 are connected in cascade. The cells 1406, 1408 are connected in cascade. The cascade of the cells 1402, 1404 is in parallel to the cascade of the cells 1406, 1408. The switches 1434, 1436 within the cell 1402 and the switches 1446, 1448 within the cell 1404 are disabled (gated). The switches 1450, 1452, 1454, 1456 are disabled and the switches 1442, 1414, 1416, 1444 are operated as the switches 106, 108, 110, 112, respectively, in the circuit 100 (FIG. 1). Each cell 1404, 1408 might be connected between: the output port and the ground port of the previous cell (1402 and 1406 respectively), or the input port and the output port of the previous cell (1402 and 1406 respectively). For example, by connecting the cell 1404 between the output port and the ground port of the previous cell 1402, and the cell 1408 between the output port and the ground port of the previous cell 1406, the voltage conversion ratio 1/4 can be produced.

The switched capacitor circuit 1400 can be operated to provide the mode 1/2. The switched capacitor cells 1402, 1404, 1406, 1408 are connected in parallel. The switches 1458, 1460, 1410, 1412, 1446, 1448, 1414, 1416, 1418, 1420, 1450, 1452 are disabled (gated). Each cell 1402, 1404, 1406, 1408 is connected between the input port 1428 and the ground port 1432 and produces conversion ratio of $V_{in}/2$.

The switched capacitor circuit 1400 can be operated to provide the mode 1 ($V_{down}=V_{in}$). The switched capacitor cells 1402, 1404, 1406, 1408 are connected in parallel as in the mode 1/2. Each cell 1402, 1404, 1406, 1408 may be operated as the cell 306 in the circuit 300 (FIG. 3F).

I presently contemplate for the circuit 1400 that the flying capacitance of the successive cells 1402, 1404, (1406 and 1408 as one cell) are weighted of the total circuit 1400 flying capacitance C; e.g., the flying capacitance of cell 1402 is C/7, the flying capacitance of cell 1404 is 2C/7, the flying capacitance of cell 1406 is 4C/21, and the flying capacitance of cell 1408 is 8C/21. However the cells 1402, 1404, 1406, 1408 capacitances can have different relative sizes, such as equal sizing of cells capacitances, etc. The weighted capacitances C/7, 2C/7, 4C/7 of the successive cells 1402, 1404, (1406 and 1408 as one cell) may provide optimal relative sizing of the successive capacitances, in the modes 1/8, 3/8, 5/8, 7/8, and hence higher efficiency can be achieved for certain total flying capacitance C of the circuit 1400. The weighted capacitances C/7, 2C/7 of the successive cells 1402, 1404 and 4C/21, 8C/21 of the successive cells 1406, 1408 may provide optimal relative sizing of the successive capacitances, in the modes 1/4, 3/4 and hence higher efficiency can be achieved for certain total flying capacitance C of the circuit 1400.

Figure 15:
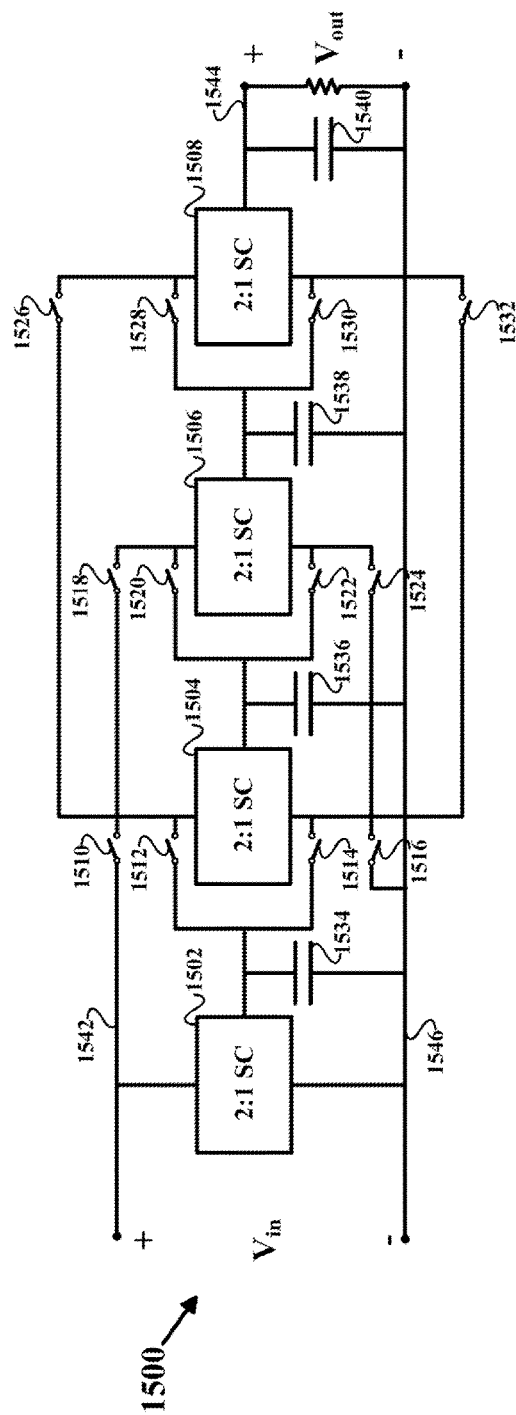
FIG. 15 illustrates an example switched capacitor circuit that may be utilized to provide binary $2^4$: m transformation modes (e.g., 1/16, 2/16, 3/16, . . . , 1) by utilizing four switched capacitor circuits connected together in cascade.

FIG. 15 illustrates an example switched capacitor circuit 1500 that may be utilized to provide binary $2^4$: m transformation modes (e.g., 1/16, 2/16, 3/16, ..., 1) by utilizing four switched capacitor circuits (e.g., 200) connected together in cascade. The circuit 1500 may include four switched capacitor cells (i.e., 200) 1502, 1504, 1506, 1508, twelve reconfiguration switches 1510-1532, four capacitors 1534, 1536, 1538, 1540 an input port 1542 to receive an input voltage ($V_{in}$), an output port 1544 to produce an output voltage ($V_{out}$), and a ground port 1546. The switches may be one or more transistors. The switched capacitor cells 1502, 1504, 1506, 1508 are connected in cascade and the input voltage ($V_{in}$) is provided across the first switched capacitor cell 1502. Each switched capacitor cell of the cells 1502, 1504, 1506, 1508 takes two inputs and produces, at the output port of the switched capacitor cell, an output voltage which is the average of the voltage at the input port and the ground port of the switched capacitor cell, ($V_{input\ port}+V_{ground\ port}$)/2. Through the reconfiguration switches 1510-1524, each cell 1504, 1506 might be connected between: the input port and the ground port of the previous cell (1502 and 1504 respectively), the output port and the ground port of the previous cell (1502 and 1504 respectively), or the input port and the output port of the previous cell (1502 and 1504 respectively). Through the reconfiguration switches 1526-1532, the cell 1508 might be connected between: the input port and the ground port of the cell 1504, the output port of the previous cell 1506 and the ground port of the cell 1504, or the input port of the cell 1504 and the output port of the previous cell 1506.

The switched capacitor circuit 1500 can be operated to provide the modes 1/16, 3/16, ..., 15/16. When the switches 1512, 1516, 1520, 1524, 1528, 1532 are closed and the other switches 1510, 1514, 1518, 1522, 1526, 1530 are open the cell 1504 is connected between the output port and the ground port of the cell 1502, the cell 1506 is connected between the output port and the ground port of the cell 1504, and the cell 1508 is connected between the output port of the cell 1506 and the ground port of the cell 1504, therefore the mode 1/16 is produced. When the switches 1512, 1516, 1520, 1524, 1526, 1530 are closed and the other switches 1510, 1514, 1518, 1522, 1528, 1532 are open the cell 1504 is connected between the output port and the ground port of the cell 1502, the cell 1506 is connected between the output port and the ground port of the cell 1504, and the cell 1508 is connected between the input port of the cell 1504 and the output port of the cell 1506, therefore the mode 5/16 is produced. A similar approach may be followed to produce the other ratios 3/16, 7/16, 9/16, 11/16, 13/16, 15/16.

The switched capacitor circuit 1500 can be operated to provide the modes 1/8, 3/8, 5/8, 7/8. When the switches 1510, 1516, 1520, 1524, 1528, 1532 are closed and the other switches 1512, 1514, 1518, 1522, 1526, 1530 are open the cell 1504 is connected between the input port 1542 and the ground port 1546, the cell 1506 is connected between the output port and the ground port of the cell 1504, and the cell 1508 is connected between the output port of the cell 1506 and the ground port of the cell 1504, therefore the mode 1/8 is produced. When the switches 1510, 1516, 1520, 1524, 1526, 1530 are closed and the other switches 1512, 1514, 1518, 1522, 15268 1532 are open the cell 1504 is connected between the input port 1542 and the ground port 1546, the cell 1506 is connected between the output port and the ground port of the cell 1504, and the cell 1508 is connected between the input port of the cell 1504 and the output port of the cell 1506, therefore the mode 5/8 is produced. A similar approach may be followed to produce the other ratios 3/8, 7/8.

The switched capacitor circuit 1500 can be operated to provide the modes 1/4, 3/4. When the switches 1510, 1516, 1518, 1524, 1528, 1532 are closed and the other switches 1512, 1514, 1520, 1522, 1526, 1530 are open the cell 1506 is connected between the input port 1542 and the ground port 1546 and the cell 1508 is connected between the output port of the cell 1506 and the ground port of the cell 1504, therefore the mode 1/4 is produced. A similar approach may be followed to produce the other ratio 3/4.

The switched capacitor circuit 1500 can be operated to provide the mode 1/2. When the switches 1510, 1516, 1526, 1532 are closed and the other switches 1512, 1514, 1518, 1520, 1522, 1524, 1528, 1530 are open the cell 1508 is connected between the input port 1542 and the ground port 1546, therefore the mode 1/2 is produced.

The switched capacitor circuit 1500 can be operated to provide the mode 1 ($V_{down}=V_{in}$). When the switches 1510, 1516, 1526, 1532 are closed and the other switches 1512, 1514, 1518, 1520, 1522, 1524, 1528, 1530 are open the cell 1508 is connected between the input port 1542 and the ground port 1546. The cell 1508 is operated as the cell 306 in the circuit 300 (FIG. 3F).

I presently contemplate for the circuit 1500 that the flying capacitance of the successive cells 1502, 1504, 1506, 1508 are weighted of the total circuit 1500 flying capacitance: e.g. the flying capacitance of cell 1502 is C/15, the flying capacitance of cell 1504 is 2C/15, the flying capacitance of cell 1506 is 4C/15, and the flying capacitance of cell 1508 is 8C/15. However the successive cells 1502, 1504, 1506, 1508 capacitances can have different relative sizes, such as equal sizing of successive cells, etc. The weighted capacitances C/15, 2C/15, 4C/15, 8C/15 of the successive cells 1502, 1504, 1506, 1508 may provide optimal relative sizing of the successive capacitances, in the modes 1/4, 3/4, 1/8, 3/8, 5/8, 7/8, 1/16, 3/16, ..., 15/16 and hence higher efficiency can be achieved for certain total flying capacitance C of the circuit 1500.

Figure 16:
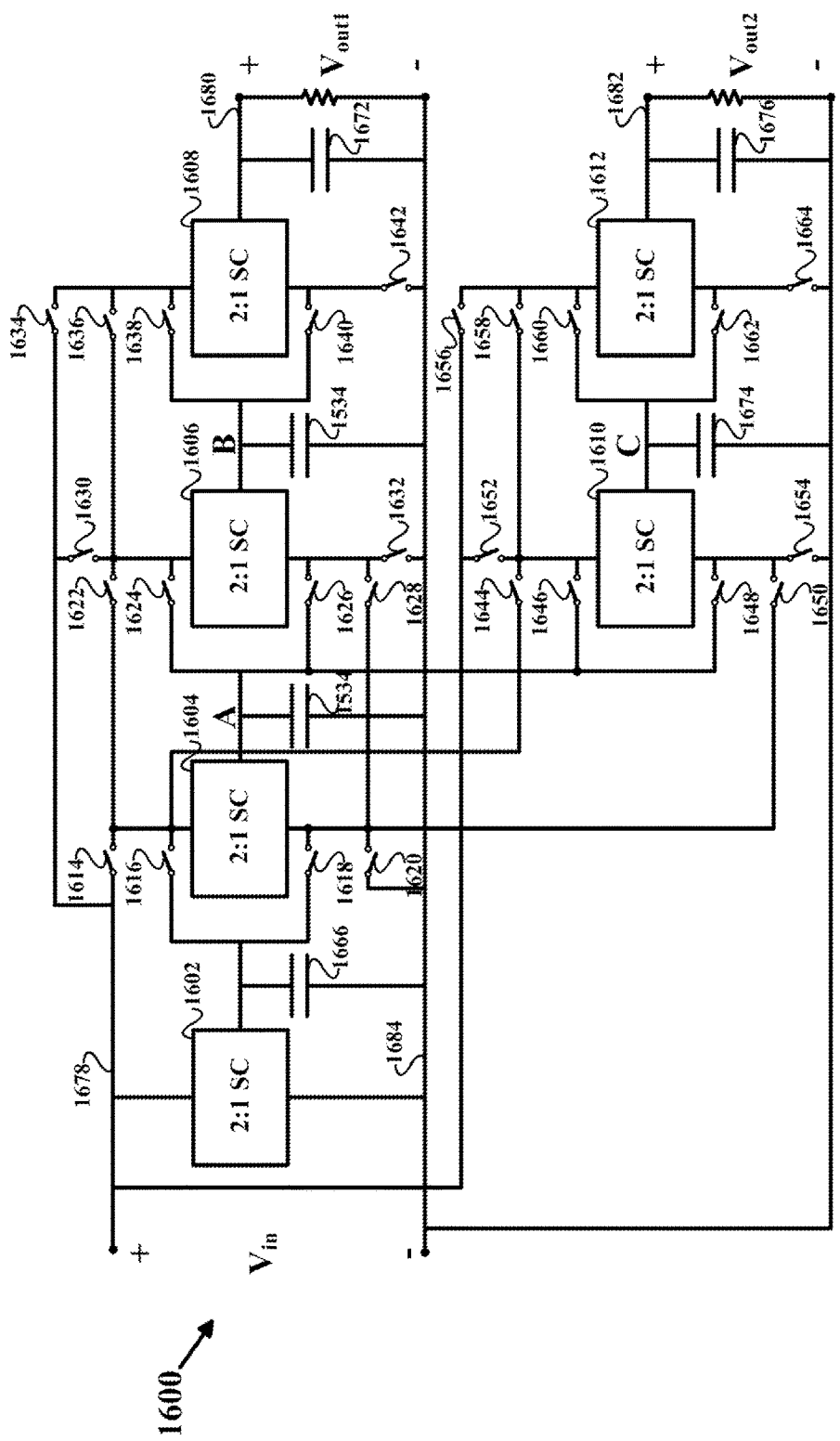
FIG. 16 illustrates an example switched capacitor circuit that may be utilized to provide two independent outputs at binary $2^4$: m transformation modes (e.g., 1/16, 2/16, 3/16, . . . , 1) by utilizing six switched capacitor circuits connected together.

FIG. 16 illustrates an example switched capacitor circuit 1600 that may be utilized to provide two independent outputs at binary $2^4$: m transformation modes (e.g., 1/16, 2/16, 3/16, ..., 1) by utilizing six switched capacitor circuits (e.g., 200) connected together. The circuit 1600 may include six switched capacitor cells (i.e., 200) 1602, 1604, 1606, 1608, 1610, 1612, twenty six reconfiguration switches 1614-1664, six capacitors 1666, 1668, 1670, 1672, 1674, 1676, an input port 1678 to receive an input voltage ($V_{in}$), two output ports 1680, 1682, to produce two output voltages $V_{out1}$, $V_{out2}$, and a ground port 1684. The switches may be one or more transistors.

The switched capacitor cells 1602, 1604, 1606, 1608 are connected in cascade and similarly the cells 1602, 1604, 1610, 1612, and the input voltage ($V_{in}$) is provided across the first switched capacitor cell 1602. The switch 1644 may connect the input port of the cell 1604 and the input port of the cell 1610. The switch 1650 may connect the ground port of the cell 1604 and the ground port of the cell 1610. Each switched capacitor cell of the cells 1602, 1604, 1606, 1608, 1610, 1612 takes two inputs and produces, at the output port of the switched capacitor cell, an output voltage which is the average of the voltage at the input port and the ground port of the switched capacitor cell, ($V_{input\ port} + V_{ground\ port}$)/2.

Through the reconfiguration switches 1614, 1616, 1618, 1620, the cell 1604 might be connected between: the input port 1678 and the ground port 1684, the output port of the previous cell 1602 and the ground port 1684, or the input port 1678 and the output port of the previous cell 1602. Through the reconfiguration switches 1622, 1624, 1626, 1628, 1630, 1632 the cell 1606 might be connected between: the input port 1678 and the ground port 1684, the output port of the previous cell 1604 and the ground port 1684, the input port 1678 and the output port of the previous cell 1604, the input port and the ground port of the previous cell 1604, the output port and the ground port of the previous cell 1604, the input port and the output port of the previous cell 1604, the input port of the previous cell 1604 and the ground port 1684, or the input port 1678 and the ground port of the previous cell. Similar states as the cell 1606 may be configured for the cell 1610 through the reconfiguration switches 1644, 1646, 1648, 1650, 1652, 1654. It should be noted that the available configuration states for each of the cells 1606, 1610 may combine the states of the cell 304 (or 306) (FIG. 3A) and the cell 1104 (or 1106) (FIG. 11A).

Through the reconfiguration switches 1634, 1636, 1638, 1640, 1642 the cell 1608 might be connected between: the input port 1678 and the ground port 1684, the output port of the previous cell 1606 and the ground port 1684, the input port 1678 and the output port of the previous cell 1606, the input port and the output port of the previous cell 1606, or the input port of the previous cell 1606 and the ground 1684. Similar states as the cell 1608 may be configured for the cell 1612 through the reconfiguration switches 1656, 1658, 1660, 1662, 1664.

When the switches 1616, 1620 are closed and the other switches 1614, 1618 are open the mode $V_{in}/4$ is produced at node A. Through the various configuration states of the cells 1606, 1608 and the cells 1610, 1612 the modes 1/16, 3/16, . . . , 13/16 may be produced independently at $V_{out1}$ and $V_{out2}$. It should be noted that the cells 1602, 1604 are shared and utilized to provide the outputs $V_{out1}$, $V_{out2}$. The cell 1606 (1610) may be connected between: the output port of the previous cell 1604 and the ground port 1684 to provide the 1/8 mode at node B (node C), the input port 1678 and the output port of the previous cell 1604 to provide the mode 5/8 at the node B (node C), or the input port and the output port of the previous cell 1604 to provide the mode 3/8 at the node B (node C). The cell 1608 (1612) may be connected between: the output port of the previous cell 1606 (1610) and the ground port 1684 to provide the modes 1/16, 3/16, 5/16, the input port 1678 and the output port of the previous cell 1606 (1610) to provide the modes 9/16, 11/16, 13/16, or the input port and the output port of the previous cell 1606 (1610) to provide the mode 7/16. Similarly, when the switches 1614, 1618 are closed and the other switches 1616, 1620 are open the mode $3V_{in}/4$ is produced at node A. Through the various configuration states of the cells 1606, 1608 and the cells 1610, 1612 the modes 3/16, 5/16, . . . , 15/16 may be produced independently at $V_{out1}$ and $V_{out2}$.

Through the various configuration states of the cells 1606, 1608 and the cells 1610, 1612 the modes 1/8, 3/8, 5/8, 7/8 may be produced independently at $V_{out1}$ and $V_{out2}$. It should be noted that the cell 1602 is shared and utilized to provide the outputs $V_{out1}$, $V_{out2}$. The cell 1606 (1610) might be connected between: the input port of the previous cell 1604 and the ground port 1684 (when the cell 1604 is providing the mode 1/4 at the node A) to provide the mode 1/4 at the node B (node C), or the input port 1678 and the ground port of the previous cell 1604 (when the cell 1604 is providing the mode 3/4 at the node A) to provide the mode 3/4 at the node B (node C). The cell 1608 (1612) may be connected between: the output port of the previous cell 1606 (1610) and the ground port 1684 to provide the modes 1/8, 3/8, the input port 1678 and the output port of the previous cell 1606 (1610) to provide the modes 5/8, 7/8, or the input port and the output port of the previous cell 1606 (1610) to provide the mode 3/8, 7/8.

Through the various configuration states of the cells 1606, 1608 and the cells 1610, 1612 the modes 1/4, 3/4 may be produced independently at $V_{out1}$ and $V_{out2}$. When the switches 1630, 1632 are closed and the other switches 1622, 1624, 1626, 1628 are open the cell 1606 is connected between the input port 1678 and the ground port 1684. The cell 1608 may be connected between: the output port of the previous cell 1606 and the ground port 1684 to provide the mode 1/4 at $V_{out1}$, or the input port 1678 and the output port of the previous cell 1606 to provide the mode 3/4 at $V_{out1}$. A similar approach may be followed to provide the modes 1/4, 3/4 at $V_{out2}$.

When the switches 1634, 1642 are closed and the other switches 1636, 1638, 1640 are open $V_{in}/2$ is produced at $V_{out1}$. Besides, when the cell 1608 is operated as the cell 306 (FIG. 3F) the mode 1 is produced at $V_{out1}$. A similar approach may be followed to produce the modes 1/2 and 1 at $V_{out2}$.

The circuit 1600 may become of importance when the number of capacitors (or switches) used to implement certain power stage is limited (e.g., discrete capacitors). For example, if twenty independent outputs $V_{out1}$, $V_{out2}$, . . . , $V_{out20}$ are required, a similar circuit to the circuit 600, or 1300 (but 4-bit) may need 160 capacitors, while the circuit 1600 may need 84 capacitors. A different embodiment may have recursive implementation (similar to 1000) for the cells 1606, 1608 and 1610, 1612, respectively. Another embodiment may share more stages (more than two stages 1602, 1604) between different outputs $V_{out1}$, $V_{out2}$ that may further reduce the number of components.

I presently contemplate for the circuit 1600 that the flying capacitance of the successive cells 1602, 1604, 1606, 1608 and 1602, 1604, 1610, 1612 might be weighted of the circuit 1600 total flying capacitance in order to provide optimal relative sizing of the successive capacitances, in the modes 1/4, 3/4, 1/8, 3/8, 5/8, 7/8, 1/16, 3/16, . . . , 15/16 at $V_{out1}$ and $V_{out2}$ and hence higher efficiency can be achieved for certain total flying capacitance C of the circuit 1600.

Figure 17A:
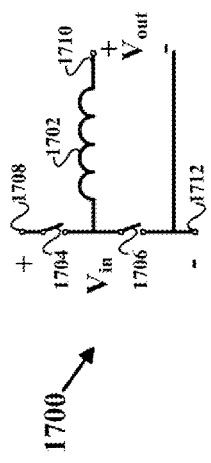
FIG. 17A illustrates an example switched inductor circuit that may be utilized to provide a continuous voltage conversion ratio of an input voltage Vin.

FIG. 17A illustrates an example switched inductor circuit 1700 that may be utilized to provide a continuous voltage conversion ratio of an input voltage $V_{in}$. The switched inductor circuit may include an inductor 1702, two switches 1704, 1706, an input port 1708 to receive an input voltage $V_{in}$, an output port 1710 to produce an output voltage $V_{out}$, and a ground port 1712. The inductor 1702 is connected between common node of the switches 1704, 1706 and the output port 1708. When the switch 1704 is closed and the other switch 1706 is open the inductor 1702 is connected between the input port 1708 and the output port 1710. When the switch 1706 is closed and the other switch 1704 is open the inductor 1702 is connected between the ground port 1712 and the output port 1710.

The switches 1704, 1706 may be switched on and off alternatively at a constant frequency. The on cycle (duty cycle) may be between 0% and 100% of the cycle time, 0%<on cycle<100%, and may match the voltage conversion ratio of the switched inductor cell 1700.

Figure 17B:
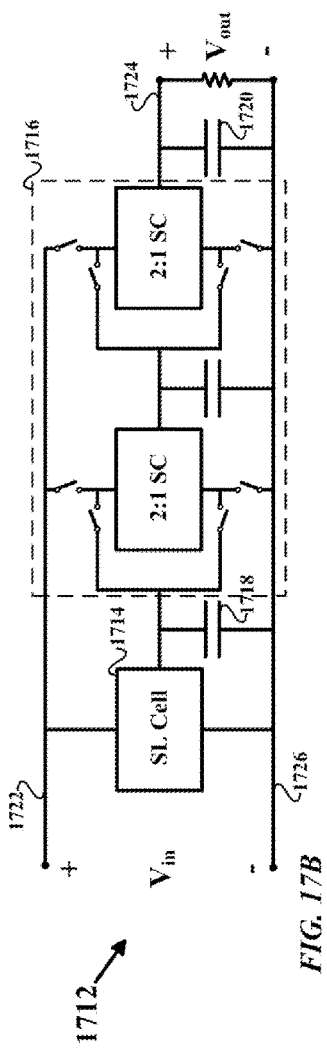
FIG. 17B illustrates an example direct current to direct current (DC-DC) converter circuit that may be utilized to provide continuous transformation modes.

FIG. 17B illustrates an example direct current to direct current (DC-DC) converter circuit 1712 that may be utilized to provide continuous transformation modes. The circuit 1712 may include a switched inductor cell 1714, a switched capacitor cell 1716, two capacitors 1718, 1720, an input port 1722 to receive an input voltage ($V_{in}$), an output port 1724 to produce an output voltages $V_{out}$, and a ground port 1726. The switched inductor cell 1714 is cascaded with the switched capacitor cell 1716 and the input voltage $V_{in}$ is applied across the switched inductor cell 1714.

The switched inductor cell 1714 provides continuous voltage conversion ratio of the input voltage $V_{in}$. When the switched inductor cell 1714 is operated to provide the 1/2 voltage conversion ratio the circuit 1712 may produce the modes 1/8, 3/8, 5/8, 7/8, as the circuit 300. When the voltage conversion ratio of the switched inductor cell 1714 is continuously varied above and below the 1/2 mode the output voltage $V_{out}$ can be produced continuously above and below each mode 1/8, 3/8, 5/8, 7/8. The current through the inductor may be the load current $I_L$ divided by $2^2$, $I_L/2^2$. The inductor handles a small portion of the load current $I_L$ and that might be of importance for low quality inductors (such as integrated inductors).

The switched inductor cell 1714 may be placed as the second cell or the third cell instead of being the first cell. In such embodiments the inductor handles larger portion of the load current $I_L$. The switched capacitor cell 1716 may have a recursive implementation as in 1000 (FIG. 10) and hence when the voltage conversion ratio of the switched inductor cell 1714 is continuously varied above and below the 1/2 mode the output voltage $V_{out}$ can be produced continuously above and below each mode 1/8, 1/4, 3/8, 1/2, 5/8, 3/4, 7/8, 1.

Figure 17C:
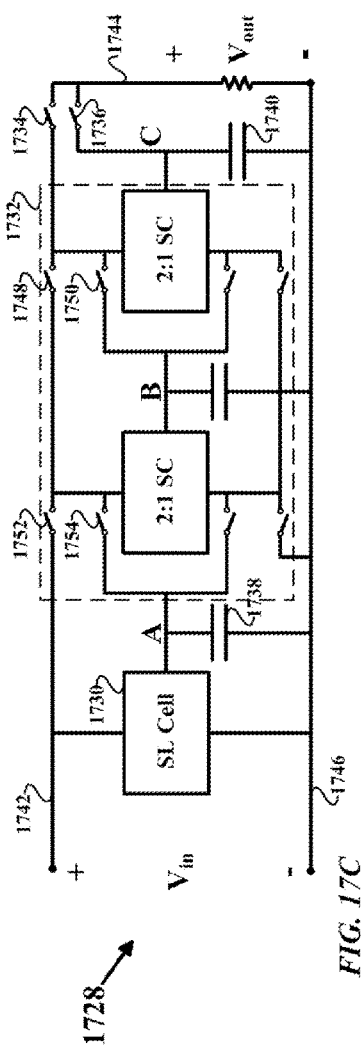
FIG. 17C illustrates an example DC-DC converter circuit that may be utilized to provide continuous transformation modes.

FIG. 17C illustrates an example DC-DC converter circuit 1728 that may be utilized to provide continuous transformation modes. The circuit 1728 may include a switched inductor cell 1730, a switched capacitor cell 1732, two output selection switches 1734, 1736, two capacitors 1738, 1740, an input port 1742 to receive an input voltage ($V_{in}$), an output port 1744 to produce an output voltages $V_{out}$, and a ground port 1746. The switched inductor cell 1730 is cascaded with the switched capacitor cell 1732 and the input voltage $V_{in}$ is applied across the switched inductor cell 1730.

The switched inductor cell 1730 provides continuous voltage conversion ratio of the input voltage $V_{in}$. When the selection switch 1736 is closed and the switch 1734 is open, and the switched inductor cell 1730 is operated to provide the 1/2 voltage conversion ratio the circuit 1728 may produce the modes 1/8, 3/8, 5/8, 7/8, as the circuit in FIG. 12B. When the voltage conversion ratio of the switched inductor cell 1730 is continuously varied above and below the 1/2 mode the output voltage $V_{out}$ can be produced continuously above and below each mode 1/8, 3/8, 5/8, 7/8. The current through the inductor may be the load current $I_L$ divided by $2^2$, $I_L/2^2$. The inductor handles a small portion of the load current $I_L$ and that might be of importance for low quality inductors (such as integrated inductors).

When the switches 1734, 1750 are closed and the switches 1736, 1748 are open, and the switched inductor cell 1730 is operated to provide the 1/2 voltage conversion ratio the circuit 1728 may produce the modes 1/4, 3/4, as the circuit in FIG. 12B. When the voltage conversion ratio of the switched inductor cell 1730 is continuously varied above and below the 1/2 mode the output voltage $V_{out}$ can be produced continuously above and below each mode 1/4, 3/4. The current through the inductor may be the load current $I_L$ divided by $2^1$, $I_L/2^1$. The inductor handles half of the load current $I_L$ and that might be of importance for low quality inductors (such as integrated inductors).

When the switches 1734, 1748, 1754 are closed and the switches 1736, 1750, 1752 are open, and the switched inductor cell 1730 is operated to provide the 1/2 voltage conversion ratio the circuit 1728 may produce the mode 1/2 as the circuit in FIG. 12B. When the voltage conversion ratio of the switched inductor cell 1730 is continuously varied above and below the 1/2 mode the output voltage $V_{out}$ can be produced continuously above and below the mode 1/2. The current through the inductor may be the load current $I_L$.

The switched inductor cell 1730 may be placed as the second cell or the third cell instead of being the first cell. In such embodiments the inductor handles larger portion of the load current $I_L$. Also, the switched capacitor cell 1732 may have a recursive implementation as the circuit 1400 (FIG. 14) and may be operated to produce an output voltage $V_{out}$ continuously above and below each mode 1/8, 1/4, 3/8, 1/2, 5/8, 3/4, 7/8, 1. Another embodiment may be utilized to provide continuous transformation modes by replacing one of the cells within the circuit 1500 with a switched inductor cell (e.g., 1700). Another embodiment may replace one or more of the cells within the circuit 1000 (FIG. 10) by a switched inductor cell (e.g., 1700) to provide continuous transformation modes above and below the binary $2^N$: m transformation modes (e.g., $1/2^N$, $2/2^N$, $3/2^N$, . . . , 1).

Figure 18:
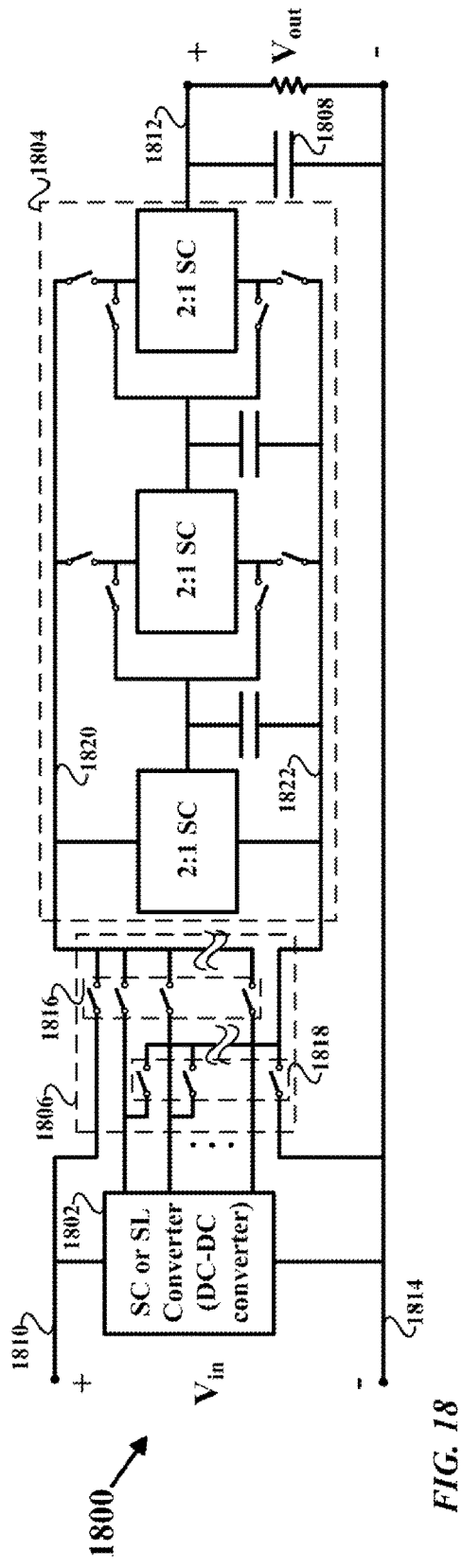
FIG. 18 illustrates an example DC-DC converter circuit that may be utilized to provide several transformation modes by cascading a DC-DC converter (providing a plurality of transformation modes) with a switched capacitor circuit of binary transformation modes.

FIG. 18 illustrates an example DC-DC converter circuit 1800 that may be utilized to provide several transformation modes by cascading a DC-DC converter (providing a plurality of transformation modes) with a switched capacitor circuit (e.g., 300) of binary transformation modes. The circuit 1800 may include a DC-DC converter cell 1802, a switched capacitor cell 1804, a reconfiguration switch block 1806, a capacitor 1808, an input port 1810 to receive an input voltage ($V_{in}$), an output port 1812 to produce an output voltages $V_{out}$, and a ground port 1814. The DC-DC converter cell 1802 and the switched capacitor cell 1804 are connected in cascade through the reconfiguration switch block 1806 and the input voltage ($V_{in}$) is provided across the DC-DC converter cell 1802.

The reconfiguration switch block may include two switch groups 1816, 1818. The DC-DC converter cell 1802 may provide a plurality of outputs. The switched capacitor cell 1804 may act as a magnifying element to enhance the voltage resolution of the DC-DC converter 1802. The reconfiguration switch block 1806 may connect the input port 1820 and the ground port 1822 of the switched capacitor cell 1804 to: the input port 1810 and the ground port 1814 through the switch groups 1816, 1818, respectively; the input port 1810 and one of the outputs for the cell 1802 through the switch groups 1816, 1818, respectively; one of the outputs for the cell 1802 and the ground port 1814 through the switch groups 1816, 1818, respectively; or any two outputs of the cell 1802 through the switch groups 1816,

1818, respectively. When one of the switches of the group 1816 (1818) is closed the other switches of the group 1816 (1818) are open.

The switches of the reconfiguration switch block 1806 may be embedded within the cell 1802 or the cell 1804 (e.g., 600). In other embodiments, the cell 1802 or 1804 may be the circuits 300 or 1100.

Figure 19A:
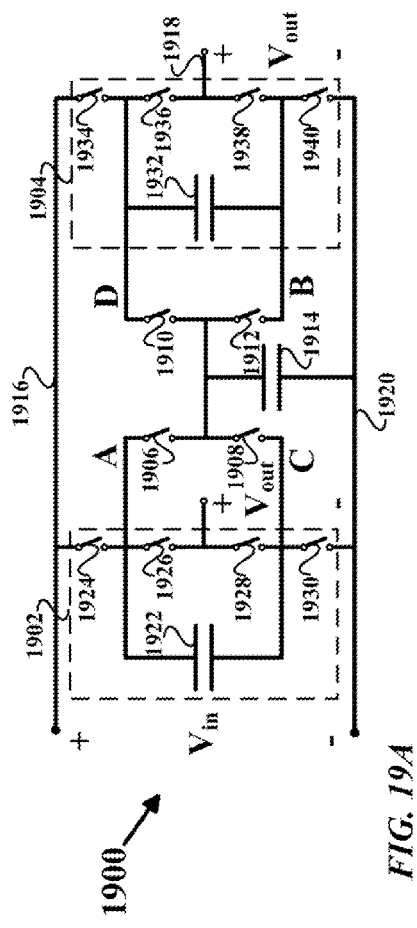
FIG. 19A illustrates an example switched capacitor circuit that may be utilized to provide five voltage conversion ratios: 1/2, 2/3, 1/3, 3/4, and 1/4 of an input voltage Vin.

FIG. 19A illustrates an example switched capacitor circuit 1900 that may be utilized to provide five voltage conversion ratios: 1/2, 2/3, 1/3, 3/4, and 1/4 of an input voltage $V_{in}$. The circuit 1900 may include two switched capacitor cells (e.g., 200) 1902, 1904, four reconfiguration switches 1906, 1908, 1910, 1912, a capacitor 1914, an input port 1916 to receive an input voltage ($V_{in}$), an output port 1918 to produce an output voltage $V_{out}$, and a ground port 1920. The cell 1902 may include a flying capacitor 1922, and four switches 1924, 1926, 1928, 1930. The cell 1904 may include a flying capacitor 1932, and four switches 1934, 1936, 1938, 1940. The cells 1902, 1904 are connected in cascade and the input voltage ($V_{in}$) is provided across the cell 1902. Each switched capacitor cell of the cells 1902, 1904 takes two inputs and produces, at the output port of the switched capacitor cell, an output voltage which is the average of the voltage at the input port and the ground port of the switched capacitor cell, ($V_{input\ port}+V_{ground\ port}$)/2.

When the reconfiguration switches 1906, 1908, 1910, 1912 are disabled (gated) and the other switches 1924, 1926, 1928, 1930 (1934, 1936, 1938, 1940) are operated as the switches 106, 108, 110, 112, respectively in the circuit 100 (FIG. 1A) the cells 1902, 1904 are connected in parallel and to the output port 1918 of the circuit 1900. Therefore, the mode 1/2 may be produced at the output port 1918.

When the switches 1926, 1928 are disabled (gated) the switches 1924, 1906, 1908, 1930 may be operated as the switches 106, 108, 110, 112, respectively in the circuit 100 (FIG. 1A). Besides, the switches 1910, 1912, 1934, 1936, 1938, 1940 may be operated as the switches 608, 610, 628, 630, 632, 634, respectively in the circuit 600 (FIG. 6). Therefore, when the cell 1904 is connected between the input port 1916 and the output port of the previous cell 1902 the mode 3/4 may be produced at the output port 1918. When the cell 1904 is connected between the output port of the previous cell 1902 and the ground port 1920 the mode 1/4 may be produced at the output port 1918.

When the switches 1924, 1928, 1934, 1938 are closed and the other switches 1926, 1930, 1906, 1908, 1910, 1912, 1936, 1940 are open the capacitors 1922, 1932 are connected in parallel and between the input port 1916 and the output port 1918. When the switches 1936, 1912, 1906, 1930 are closed and the other switches 1924, 1926, 1928, 1908, 1910, 1934, 1938, 1940 are open the capacitors 1932, 1922 are connected in series and between the output port 1918 and the ground port 1920. The switch groups 1924/1928/1934/1938, 1936/1912/1906/1930 are switched on and off alternatively at a constant frequency. Therefore, the voltage conversion ratio 2/3 may be produced at the output port 1918.

When the switches 1924, 1908, 1910, 1938 are closed and the other switches 1926, 1928, 1930, 1906, 1912, 1934, 1936, 1940 are open the capacitors 1922, 1932 are connected in series and between the input port 1916 and the output port 1918. When the switches 1926, 1930, 1936, 1940 are closed and the other switches 1924, 1928, 1906, 1908, 1910, 1912, 1934, 1938 are open the capacitors 1922, 1932 are connected in parallel and between the output port 1918 and the ground port 1920. The switch groups 1924/1908/1910/1938, 1926/1930/1936/1940 are switched on and off alternatively at a constant frequency. Therefore, the voltage conversion ratio 1/3 may be produced at the output port.

It should be noted that in the 2/3, 1/3 modes the series switches 1906, 1912 or 1908, 1910 may be replaced by one switch between nodes A, B or C, D, respectively. The elimination of series connected switches might enhance the efficiency and might reduce cost.

The switched capacitor circuit 1900 can be operated to provide the mode 1 ($V_{down}=V_{in}$). When the switches 1906, 1908, 1910, 1912 are open and the cells 1902, 1904 are operated in parallel as the cell 306 in the circuit 300 (FIG. 3F), the circuit 1900 may produce the mode 1.

Figure 19B:
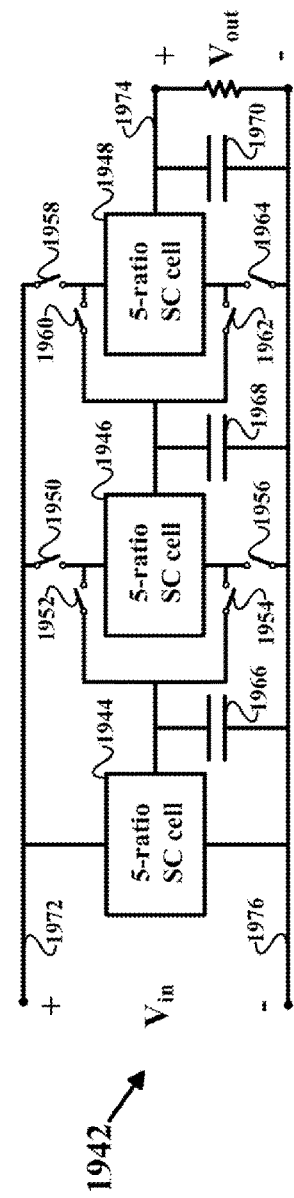
FIG. 19B illustrates an example switched capacitor circuit that may be utilized to provide several transformation modes by cascading three switched capacitor circuits, each of five transformation modes 1/2, 2/3, 1/3, 3/4, and 1/4.

FIG. 19B illustrates an example switched capacitor circuit 1942 that may be utilized to provide several transformation modes by cascading three switched capacitor circuits (e.g., 1900), each of five transformation modes 1/2, 2/3, 1/3, 3/4, and 1/4. The switched capacitor circuit 1942 may include three switched capacitor cells 1944, 1946, 1948, eight reconfiguration switches 1950, 1952, 1954, 1956, 1958, 1960, 1962, 1964, three capacitors 1966, 1968, 1970, an input port 1972 to receive an input voltage ($V_{in}$), an output port 1974 to produce an output voltage ($V_{out}$), and a ground port 1976. The switches may be one or more transistors.

The switched capacitor cells 1944, 1946, 1948 are connected in cascade and the input voltage ($V_{in}$) is provided across the first switched capacitor cell 1944. The voltage conversion ratios (modes 1/2, 2/3, 1/3, 3/4, 1/4) of the individual cells 1944, 1946, 1948 may be selected separate from each other to provide additional voltage conversion ratios (e.g., the mode for each of the cells 1944, 1946, 1948 need not be the same). The cell 1946 (1948) might be connected between: the input port 1972 and the ground port 1976 through the switches 1950, 1956 (1958, 1964), respectively; the output port of the previous cell 1944 (1946) and the ground port 1976 through the switches 1952, 1956 (1960, 1964), respectively; or the input port 1972 and the output port of the previous cell 1944 (1946) through the switches 1950, 1954 (1958, 1962), respectively.

FIG. 20A illustrates the voltage conversion ratios that may be produced by the circuit 1942 through cascading the cells 1944, 1946, 1948. Referring back to FIG. 19B, when the switches 1952, 1956, 1960, 1964 are closed and the other switches 1950, 1954, 1958, 1962 are open the cell 1946 is connected between the output port of the cell 1944 and the ground port 1976, and the cell 1948 is connected between the output port of the cell 1946 and the ground port 1976. In addition, when the voltage conversion ratios of the cells 1944, 1946, 1948 are 3/4, 1/4, 1/2, respectively, the mode 3/32 may be produced. When the switches 1950, 1954, 1960, 1964 are closed and the other switches 1952, 1956, 1958, 1962 are open the cell 1946 is connected between the input port 1972 and the output port of the cell 1944, and the cell 1948 is connected between the output port of the cell 1946 and the ground port 1976. In addition, when the voltage conversion ratios of the cells 1944, 1946, 1948 are 3/4, 1/4, 1/2, respectively, the mode 13/32 may be produced. A similar approach may be followed to produce the other ratios illustrated in FIG. 20A. There are 113 voltage conversion ratios available through the circuit 1942. It should be noted that the voltage step (difference between consecutive voltage conversion ratios) is not equal in the circuit 1942. Besides, the voltage conversion ratios of the circuit 1942 are symmetric around the 1/2 ratio.

FIG. 20B illustrates the voltage conversion ratios that may be produced by the circuit 1942 through cascading the cells 1946, 1948. The cell 1946 may be connected between the input port 1972 and the ground port 1976 through the switches 1950, 1956. When the switches 1960, 1964 are closed and the other switches 1958, 1962 are open the cell 1948 is connected between the output port of the cell 1946 and the ground port 1976. In addition, when the voltage conversion ratios of the cells 1946, 1948 are 1/3, 1/2, respectively, the mode 1/6 may be produced. When the switches 1958, 1962 are closed and the other switches 1960, 1964 are open the cell 1948 is connected between the input port 1972 and the output port of the cell 1946. In addition, when the voltage conversion ratios of the cells 1946, 1948 are 1/4, 1/2, respectively, the mode 5/8 may be produced. A similar approach may be followed to produce the other ratios illustrated in FIG. 20B. There are 25 voltage conversion ratios available through the circuit 1942. It should be noted that the voltage step (difference between consecutive voltage conversion ratios) is not equal in the circuit 1942. Besides, the voltage conversion ratios of the circuit 1942 are symmetric around the 1/2 ratio.

The switched capacitor circuit 1942 can be operated to provide the modes 3/4, 2/3, 1/2, 1/3, 1/4. When the switches 1958, 1964 are closed and the other switches 1960, 1962 are open the cell 1948 is connected between the input port 1972 and the ground port 1976. By operating the cell 1948 at the voltage conversion ratios 3/4, 2/3, 1/2, 1/3, 1/4, the circuit 1942 may produce the modes 3/4, 2/3, 1/2, 1/3, 1/4, respectively.

The switched capacitor circuit 1942 can be operated to provide the mode 1 ($V_{down}=V_{in}$). When the switches 1958, 1964 are closed and the other switches 1960, 1962 are open the cell 1948 is connected between the input port 1972 and the ground port 1976. By operating the cell 1948 at the voltage conversion ratios 1, the circuit 1942 may produce the mode 1.

I presently contemplate for the circuit 1942 that the flying capacitance of the successive cells 1944, 1946, 1948 might be weighted of the circuit 1942 total flying capacitance in order to provide optimal relative sizing of the successive capacitances, in the various modes and hence higher efficiency can be achieved for certain total flying capacitance C of the circuit 1942.

In an embodiment the circuit 1942 may have a recursive implementation (similar to 1000). Besides, the circuit 1942 may not include the input side reconfiguration switches 1950, 1958 and ground side reconfiguration switches 1956, 1964, where these reconfiguration switches may be embedded in the cells 1946, 1948, respectively as in the circuit 600 (FIG. 6) or the circuit 800 (FIG. 8). The reduced number of reconfiguration switches might reduce cost and might enhance the efficiency.

Figures 21A, 21B:
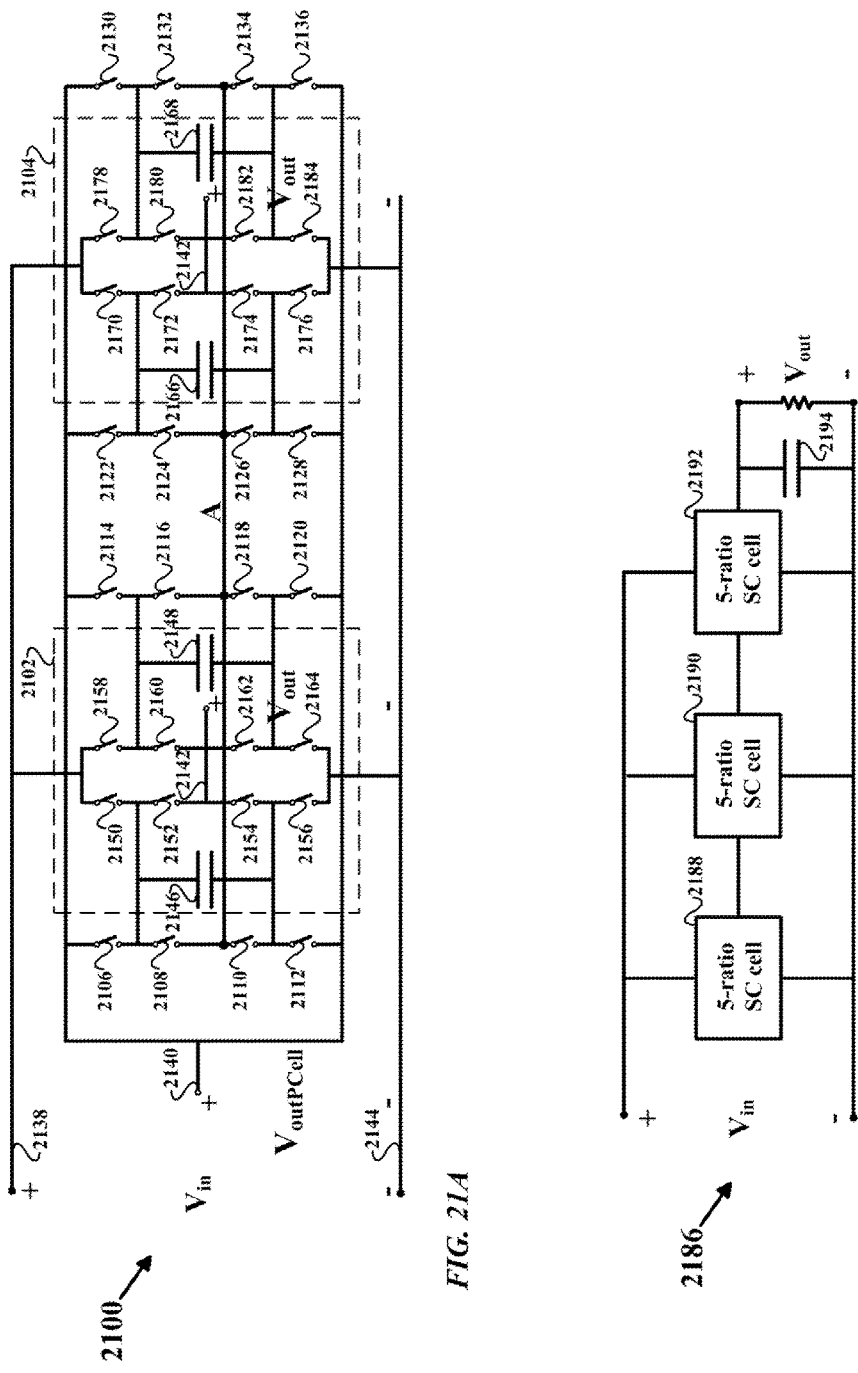
FIG. 21A illustrates an example switched capacitor circuit that may be utilized to provide five voltage conversion ratios: 1/2, 2/3, 1/3, 3/4, and 1/4 of an input voltage.
FIG. 21B illustrates an example switched capacitor circuit that may be utilized to provide several transformation modes by cascading three switched capacitor circuits, each of five transformation modes 1/2, 2/3, 1/3, 3/4, and 1/4.

FIG. 21A illustrates an example switched capacitor circuit 2100 that may be utilized to provide five voltage conversion ratios: 1/2, 2/3, 1/3, 3/4, and 1/4 of an input voltage $V_{in}$. The circuit 2100 may include two switched capacitor cells (e.g., 500) 2102, 2104, sixteen reconfiguration switches 2106-2136, two input ports 2138, 2140 to receive an input voltage ($V_{in}$) and a previous cell output ($V_{outPCell}$) respectively, an output port 2142 to produce an output voltage ($V_{out}$), and a ground port 2144. The cell 2102 may include two flying capacitors 2146, 2148, eight switches 2150-2164. The cell 2104 may include two flying capacitors 2166, 2168, eight switches 2170-2184. The switches may be one or more transistors. The circuit 2100 might not need the charge balance capacitor 1914 in the circuit 1900 or the capacitors 1966, 1968 in the circuit 1942. Besides, the input side and the ground side reconfiguration switches are embedded within the cells 2102, 2104. The reduced number of reconfiguration switches might reduce cost and might enhance the efficiency. The input port and the ground port of the cell 2102 (2104) are connected to the input port 2138 and the ground port 2144, respectively. The output ports of the cells 2102, 2104 are connected in parallel to the output port 2142. The reconfiguration switches 2106, 2114, 2122, 2130 are connected to the port 2140 and the reconfiguration switches 2112, 2120, 2128, 2136 are connected to the port 2140. The reconfiguration switch pair 2108/2110 is connected together to the node A, similarly the switch pairs 2116/2118, 2124/2126, 2132/2134.

Each switched capacitor cell of the cells 2102, 2104 takes two inputs and produces, at the output port of the switched capacitor cell, an output voltage which is the average of the voltage at the input port and the ground port of the switched capacitor cell, ($V_{input\ port}+V_{ground\ port}$)/2. The cell 2102 might be connected between: the input port 2138 and the ground port 2144, the output port 2140 of the previous cell and the ground port 2144, or the input port 2138 and the output port 2140 of the previous cell. Similarly for the cell 2104, besides the cell 2104 may be connected between: the output port of the previous cell 2102 (node A) and the ground port 2144, or the input port 2138 and the output port of the previous cell 2102 (node A).

When the reconfiguration switches 2106-2136 are disabled (gated) and the cells 2102, 2104 are operated as the circuit 500 (FIG. 5A) the mode 1/2 may be produced at the output port 2142, $V_{in}/2$. When the switch pair 2106/2114 is operated in place of the switch pair 2150/2158 (the switches 2150, 2158 are disabled) and the switch pair 2122/2130 is operated in place of the switch pair 2170/2178 (the switches 2170, 2178 are disabled) the cells 2102, 2104 are connected between the output port 2140 of the previous cell and the ground port 2144. When the switch pair 2112/2120 is operated in place of the switch pair 2156/2164 (the switches 2156, 2164 are disabled) and the switch pair 2128/2136 is operated in place of the switch pair 2176/2184 (the switches 2176, 2184 are disabled) the cells 2102, 2104 are connected between the input port 2138 and the output port 2140 of the previous cell. In these three states, the cells 2102, 2104 provide the average of the voltage at the input port and the ground port of the switched capacitor cell (Vinput port+ Vground port)/2, i.e. a 1/2 voltage conversion ratio.

When the reconfiguration switches 2106-2120 are disabled (gated) and the cell 2102 is operated as the circuit 500 (FIG. 5A) the cell 2102 may produce the mode 1/2 at the node A, $V_{in}/2$. When the switch pair 2124/2132 is operated in place of the switch pair 2170/2178 (the switches 2170, 2178 are disabled) the cell 2104 is connected between the output port (node A) of the previous cell 2102 and the ground port 2144, thus the mode 1/4 may be produced at the output port 2142. When the switch pair 2126/2134 is operated in place of the switch pair 2176/2184 (the switches 2176, 2184 are disabled) the cell 2104 is connected between the input port 2138 and the output port (node A) of the previous cell 2102, thus the mode 3/4 may be produced at the output port 2142. A similar approach may be followed to produce the modes 1/4, 3/4 while the input port 2138 is replaced by the output port 2140 of the previous cell through replacing the switch pair 2150/2158 by 2106/2114 and the switch pair 2170/2178 by 2122/2130 (if 3/4 mode), or while the ground port 2144 is replaced by the output port 2140 of the previous cell through replacing the switch pair 2156/2164 by 2112/2120 and 2176/2184 by 2128/2136 (if 1/4 mode).

The flying capacitors 2146, 2148 are out of phase to guarantee continuous input current, similarly the flying capacitors 2166, 2168. The flying capacitors 2146, 2166

(2148, 2168) may be in phase and hence may be operated to produce the 2/3 mode. For instance, when the switches 2150, 2154, 2170, 2174 are enabled and the switches 2152, 2156, 2172, 2176 are disabled the flying capacitors 2146, 2166 are connected in parallel between the input port 2138 and the output port 2142. When the switches 2152, 2110, 2124, 2176 are enabled and the switches 2106, 2108, 2112, 2150, 2154, 2156, 2122, 2126, 2128, 2170, 2172, 2174 are disabled the flying capacitors 2146, 2166 are connected in series and between the output port 2142 and the ground port 2144. Therefore, the 2/3 mode may be produced at the output port 2142. When the switch 2106 is operated in place of the switch 2150 (the switch 2150 is disabled) and the switch 2122 is operated in place of the switch 2170 (the switch 2170 is disabled) the cells 2102, 2104 are connected between the output port 2140 of the previous cell (instead of the input port 2138) and the ground port 2144. When the switch 2128 is operated in place of the switch 2176 (the switch 2176 is disabled) the cells 2102, 2104 are connected between the input port 2138 and the output port 2140 of the previous cell (instead of the ground port 2144). A similar approach may be followed for the flying capacitors 2148, 2168.

The flying capacitors 2146, 2166 (2148, 2168) may be in phase and hence may be operated to produce the 1/3 mode. For instance, when the switches 2110, 2150, 2124, 2174 are enabled and the switches 2106, 2108, 2112, 2152, 2154, 2156, 2122, 2126, 2128, 2170, 2172, 2176 are disabled the flying capacitors 2146, 2166 are connected in series between the input port 2138 and the output port 2142. When the switches 2152, 2156, 2172, 2176 are enabled and the switches 2150, 2154, 2170, 2174 are disabled the flying capacitors 2146, 2166 are connected in parallel and between the output port 2142 and the ground port 2144. Therefore, the 1/3 mode may be produced at the output port 2142. When the switch 2106 is operated in place of the switch 2150 (the switch 2150 is disabled) the cells 2102, 2104 are connected between the output port 2140 of the previous cell (instead of the input port 2138) and the ground port 2144. When the switch 2112 is operated in place of the switch 2156 (the switch 2156 is disabled) and the switch 2128 is operated in place of the switch 2176 (the switch 2176 is disabled) the cells 2102, 2104 are connected between the input port 2138 and the output port 2140 of the previous cell (instead of the ground port 2144). A similar approach may be followed for the flying capacitors 2148, 2168.

FIG. 21B illustrates an example switched capacitor circuit 2186 that may be utilized to provide several transformation modes by cascading three switched capacitor circuits (e.g., 2100), each of five transformation modes 1/2, 2/3, 1/3, 3/4, and 1/4. The switched capacitor circuit 2186 may include three switched capacitor cells 2188, 2190, 2192, and a capacitor 2194. The cell 2188 may not include the port 2140 and its switches 2106, 2112, 2114, 2120, 2122, 2128, 2130, 2136. The switched capacitor cells 2188, 2190, 2192 are connected in cascade and the input voltage ($V_{in}$) is provided across the three cells. The voltage conversion ratios (modes 1/2, 2/3, 1/3, 3/4, 1/4) of the individual cells 2188, 2190, 2192 may be selected separate from each other to provide additional voltage conversion ratios (e.g., the mode for each of the cells 2188, 2190, 2192 need not be the same). The cell 2190 (2192) might be connected between: the input port and the ground port of the circuit 2186, the output port of the previous cell 2188 (2190) and the ground port of the circuit 2186, or the input port of the circuit 2186 and the output port of the previous cell 2188 (2190). Thus, the circuit 2186 may produce the voltage conversion ratios illustrated in FIG. 20A and FIG. 20B, beside the ratios 1, 3/4, 2/3, 1/2, 1/3, 1/4.

I presently contemplate for the circuit 2186 that the flying capacitance of the successive cells 2188, 2190, 2192 might be weighted of the circuit 2186 total flying capacitance in order to provide optimal relative sizing of the successive capacitances, in the various modes and hence higher efficiency can be achieved for certain total flying capacitance C of the circuit 2186. In an embodiment the circuit 2186 may have a recursive implementation (similar to 1000).

Figure 22:
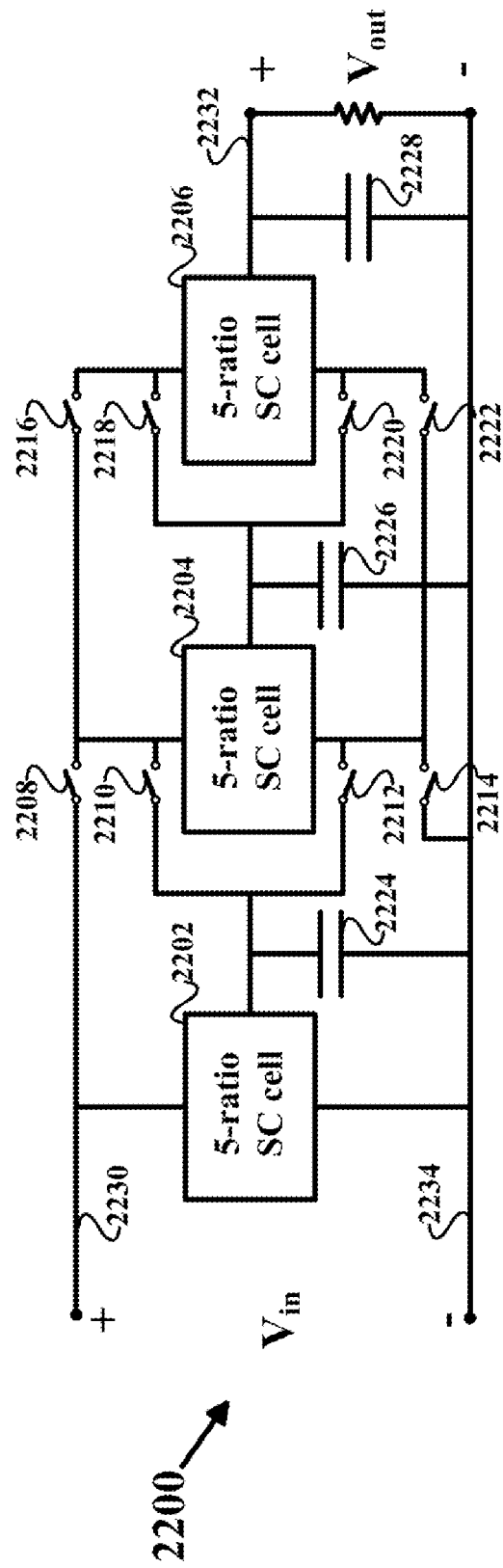
FIG. 22 illustrates an example switched capacitor circuit that may be utilized to provide several transformation modes by cascading three switched capacitor circuits, each of five transformation modes 1/2, 2/3, 1/3, 3/4, and 1/4.

FIG. 22 illustrates an example switched capacitor circuit 2200 that may be utilized to provide several transformation modes by cascading three switched capacitor circuits (e.g., 1900), each of five transformation modes 1/2, 2/3, 1/3, 3/4, and 1/4. The switched capacitor circuit 2200 may include three switched capacitor cells 2202, 2204, 2206, eight reconfiguration switches 2208, 2210, 2212, 2214, 2216, 2218, 2220, 2222, three capacitors 2224, 2226, 2228, an input port 2230 to receive an input voltage ($V_{in}$), an output port 2232 to produce an output voltage ($V_{out}$), and a ground port 2234. The switches may be one or more transistors. The switched capacitor cells 2202, 2204, 2206 are connected in cascade and the input voltage ($V_{in}$) is provided across the first switched capacitor cell 2202. The voltage conversion ratios (modes 1/2, 2/3, 1/3, 3/4, 1/4) of the individual cells 2202, 2204, 2206 may be selected separate from each other to provide additional voltage conversion ratios (e.g., the mode for each of the cells 2202, 2204, 2206 need not be the same). As in the circuit 1100 (FIG. 11A) each cell 2204, 2206 might be connected between: the input port 2230 and the ground port 2234, the output port and the ground port of the previous cell (2202 and 2204 respectively), or the input port and the ground port of the previous cell (2202 and 2204 respectively).

The reconfiguration switches 2208, 2210, 2212, 2214, 2216, 2218, 2220, 2222 may be operated as the reconfiguration switches 1108, 1110, 1112, 1114, 1116, 1118, 1120, 1122, respectively, in the circuit 1100 (FIG. 11A). The overall voltage conversion ratio of the circuit 2200 depends on the number of cascaded cells 2202, 2204, 2206, and the mode each cell 2202, 2204, 2206 is operated at.

I presently contemplate for the circuit 2200 that the flying capacitance of the successive cells 2202, 2204, 2206 might be weighted of the circuit 2200 total flying capacitance in order to provide optimal relative sizing of the successive capacitances, in the various modes, and hence higher efficiency can be achieved for certain total flying capacitance C of the circuit 2200.

In an embodiment the circuit 2200 may have a recursive implementation (similar to 1000). Besides, the circuit 2200 may not include the input side reconfiguration switches 2208, 2216 and ground side reconfiguration switches 2214, 2222, where these reconfiguration switches may be embedded in the cells 2204, 2206, respectively as in the circuit 1300 (FIG. 13). The reduced number of reconfiguration switches might reduce cost and might enhance the efficiency.

Figure 23A:
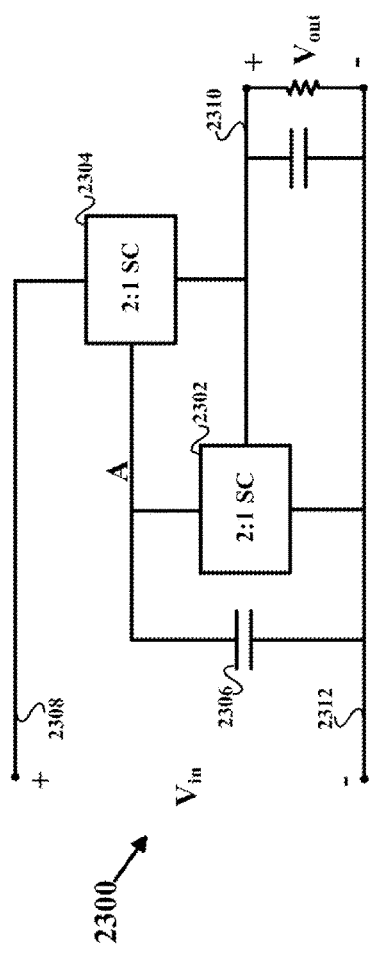
FIG. 23A illustrates an example switched capacitor circuit that may be utilized to provide several voltage conversion ratios of an input voltage by stacking two switched capacitor circuits.

FIG. 23A illustrates an example switched capacitor circuit 2300 that may be utilized to provide several voltage conversion ratios of an input voltage by stacking two switched capacitor circuits (e.g., 200). The switched capacitor circuit 2300 may include two switched capacitor cells 2302, 2304, a capacitor 2306, an input port 2308 to receive an input voltage ($V_{in}$), an output port 2310 to produce an output voltage ($V_{out}$), and a ground port 2312. The switched capacitor cells 2302, 2304 are stacked on top of each other and the input voltage ($V_{in}$) is provided across the stack. The input port of the cell 2302 is connected to the output port of the cell 2304 (node A). The ground port of the cell 2304 is connected to the output port of the cell 2302. The capacitor 2306 is connected between the node A and the ground port 2312. $V_{out}$ is measured from the output port of the cell 2302. The capacitor 2306 may provide charge balance between the cells 2302, 2304. Using this arrangement and operating the cells 2302, 2304 in the 2:1 mode may result in an overall voltage conversion ratio of 3:1 for the circuit 2300.

The circuit 2300 can be converted from a 3:1 voltage conversion ratio to a 3:2 voltage conversion ratio by reconfiguring the placement of the load (where $V_{out}$ is provided from). While not illustrated the load may be switched from being connected to the output port of the cell 2302 to being connected to the output port of the cell 2304 (in parallel with the capacitor 2306) by utilizing some type of switching mechanism and thus a 3:2 voltage conversion ratio may result.

Referring to FIG. 23A, the cells 2304, 2302 may be operated at binary increasing switching frequencies of f, $2^1$f, respectively, in the 3:1 mode, and $2^1$f, f, respectively in the mode 3:2. Thus, charge balance may be provided by the faster cell in the stack (e.g., by cell 2302 for the slower cell 2304). In such embodiment the capacitor 2306 may be eliminated if required. In an embodiment, the operating frequencies of the cells 2304, 2302 might be increasing in another weight instead of the binary increase of frequency (e.g., f, 10f).

Figure 23B:
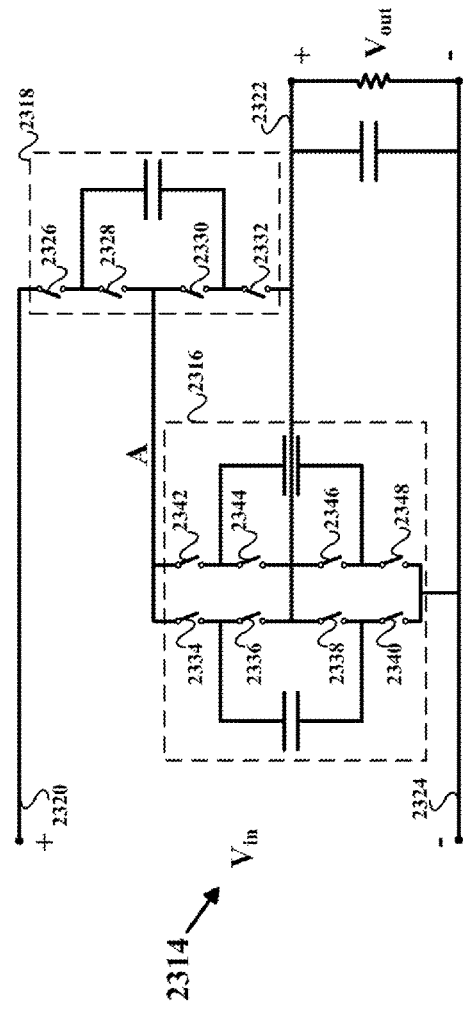
FIG. 23B illustrates an example switched capacitor circuit that may be utilized to provide several voltage conversion ratios of an input voltage by stacking two switched capacitor circuits.

FIG. 23B illustrates an example switched capacitor circuit 2314 that may be utilized to provide several voltage conversion ratios of an input voltage by stacking two switched capacitor circuits (e.g., 200 and 500). The switched capacitor circuit 2314 may include two switched capacitor cells 2316, 2318, an input port 2320 to receive an input voltage ($V_{in}$), an output port 2322 to produce an output voltage ($V_{out}$), and a ground port 2324. The switches may be one or more transistors. The switched capacitor cells 2316, 2318 are stacked on top of each other and the input voltage ($V_{in}$) is provided across the stack. The circuit 2314 may not include the capacitor 2306 of the circuit 2300. The charge balance between the cells 2316, 2318 is achieved through the out of phasing within the cell 2316. Using this arrangement and operating the cells 2316, 2318 in the 2:1 mode may result in an overall voltage conversion ratio of 3:1. The circuit 2300 can be converted from a 3:1 voltage conversion ratio to a 3:2 voltage conversion ratio by reconfiguring the placement of the load to the output port of the cell 2316 by utilizing some type of switching mechanism.

The cell 2318 may include the switches 2326, 2328, 2330, 2332. The cell 2316 may include the switches 2334-2348. When the switches 2326, 2328 are closed and the switch 2332 is open the cell 2316 is connected between the input port 2320 and the ground port 2324. Thus, the circuit 2314 may provide a 2:1 voltage conversion ratio. Similarly, when 2338, 2340, 2346, 2348 are closed and the switches 2334, 2342 are open the cell 2318 is connected between the input port 2320 and the ground port 2324. Thus, the circuit 2314 may provide a 2:1 voltage conversion ratio if the load ($V_{out}$) is connected to node A.

The circuit 2314 may also be used to provide a voltage conversion ratio of 1. When 2338, 2340, 2346, 2348 are closed and the switches 2334, 2342 are open the cell 2318 is connected between the input port 2320 and the ground port 2324. By operating the switches 2326, 2328, 2330, 2332 as the switches 336, 338, 340, 342 in the circuit 300 (FIG. 3F) and reconfiguring the placement of the load to node A a voltage conversion ratio of 1 may be produced.

The flying capacitance of the stacked cells 2316, 2318 might be weighted of the circuit 2314 total flying capacitance in order to provide optimal relative sizing of the flying capacitances, in the various modes, and hence higher efficiency can be achieved for certain total flying capacitance C of the circuit 2314.

Additional voltage conversion ratios may be obtained by stacking a plurality of switched capacitor cells (e.g., 200 or 500). The placement of load may be reconfigured to select an appropriate voltage conversion ratio. The number of stacked cells may be changed by disconnecting a subset of the stacked cells to provide additional voltage conversion ratios, as illustrated in the circuit 2314.

Figure 24:
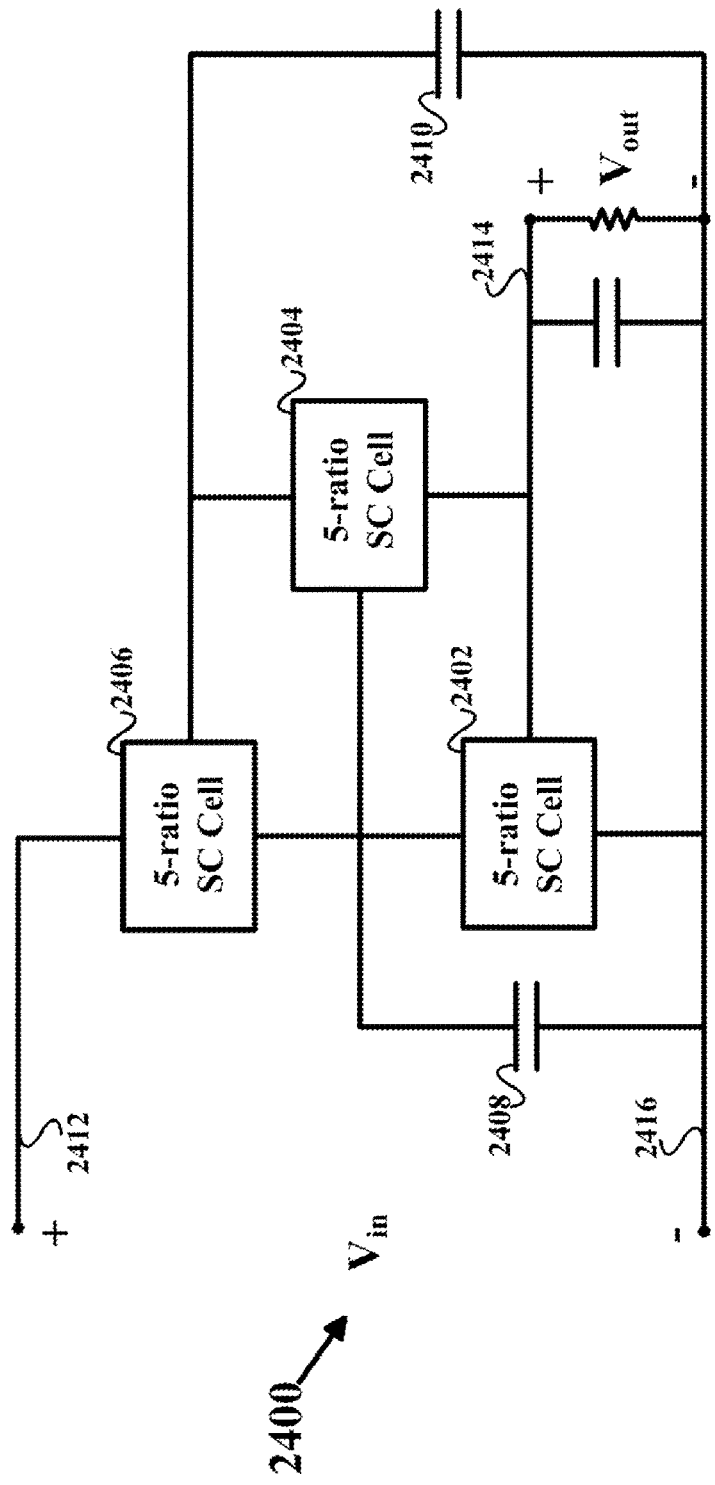
FIG. 24 illustrates an example switched capacitor circuit that may be utilized to provide several voltage conversion ratios of an input voltage by stacking three switched capacitor circuits.

FIG. 24 illustrates an example switched capacitor circuit 2400 that may be utilized to provide several voltage conversion ratios of an input voltage by stacking three switched capacitor circuits (e.g., 1900). The switched capacitor circuit 2400 may include three switched capacitor cells 2402, 2404, 2406, two capacitors 2408, 2410, an input port 2312 to receive an input voltage ($V_{in}$), an output port 2414 to produce an output voltage ($V_{out}$, and a ground port 2316. The switched capacitor cells 2402, 2404, 2406 are stacked on top of each other and the input voltage ($V_{in}$) is provided across the stack. The input port of the cell 2402 is connected to the output port of the cell 2404. The ground port of the cell 2404 is connected to the output port of the cell 2402. The input port of the cell 2404 is connected to the output port of the cell 2406. The ground port of the cell 2406 is connected to the output port of the cell 2404. The capacitors 2408, 2410 are connected between the output port of the cells 2404, 2406, respectively, and the ground port 2416. $V_{out}$ is measured from the output port of the cell 2414. The capacitors 2408, 2410 may provide charge balance between the cells 2402, 2404 and 2404, 2406, respectively.

Using this arrangement and operating the cells 2402, 2404, 2406 in one of the modes 1, 1/2, 2/3, 1/3, 3/4, or 1/4 may result in several voltage conversion ratios. The voltage conversion ratios of the individual cells may be selected separate from each other to provide additional voltage conversion ratios (e.g., the mode for each of the cells need not be the same). For example, if the cell 2402 is operating in 1/4 mode, the cell 2404 is operating in 2/3 mode, and the cell 2406 is operating in 1/2 mode the circuit 2400 may provide an overall conversion ratio of 1/18. Besides, the number of stacked cells may be changed by disconnecting a subset of the stacked cells 2402, 2404, 2406 to provide additional voltage conversion ratios, as illustrated in the circuit 2314.

The flying capacitance of the stacked cells 2402, 2404, 2406 might be weighted of the circuit 2400 total flying capacitance in order to provide optimal relative sizing of the flying capacitances, in the various modes, and hence higher efficiency can be achieved for certain total flying capacitance C of the circuit 2400.

The circuit 2400 can provide additional conversion ratios by reconfiguring the placement of the load (where $V_{out}$ is provided from). While not illustrated the load may be switched from being connected to the output port of the cell 2402 to being connected to the output port of the cell 2404 or the output port of the cell 2406, by utilizing some type of switching mechanism and thus additional voltage conversion ratios may be obtained. The circuit 2400 may select an appropriate overall voltage conversion ratio based on the input voltage received or output voltage required, and the mode selected for each of the blocks may be based thereon.

One or more of the capacitors 2408, 2410 may be eliminated by replacing one or more of the cells 2402, 2404 with the circuit 2100 (FIG. 21A).

Figure 25A:
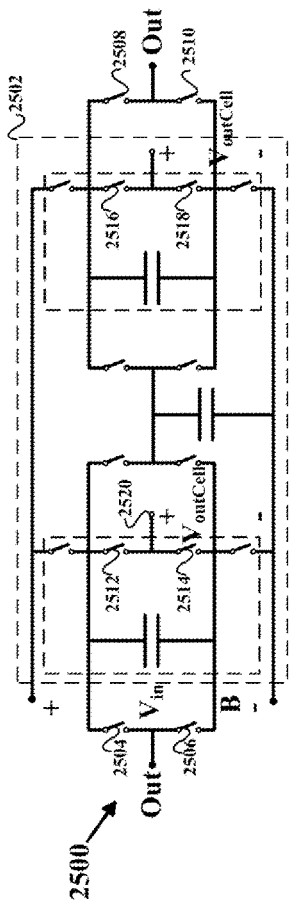
FIG. 25A illustrates an example switched capacitor circuit that may be utilized to provide five voltage conversion ratios: 1/2, 2/3, 1/3, 3/4, and 1/4 of an input voltage.

FIG. 25A illustrates an example switched capacitor circuit 2500 that may be utilized to provide five voltage conversion ratios: 1/2, 2/3, 1/3, 3/4, and 1/4 of an input voltage $V_{in}$. The circuit 2500 may include a switched capacitor cell (i.e., 1900) 2502, and four reconfiguration switches 2504, 2506, 2508, 2510. The switches may be one or more transistors. The cell 2502 may include the switches 2512, 2514, 2516, 2518, and the output port 2520. The switches 2504, 2506, 2508, 2510 are connected together at node Out. The switched capacitor cell 2502 may be operated as the circuit 1900. The switched capacitor circuit 2500 may include additional output port (node Out). When the switches 2508, 2510 are operated in place of the switches 2516, 2518; or the switches 2508, 2510 are operated in place of the switches 2516, 2518 and the switches 2504, 2506 are operated in place of the switches 2512, 2514 the output port 2520 is disabled and the output of the circuit 2500 may be produced at the other output port (node Out).

Figure 25B:
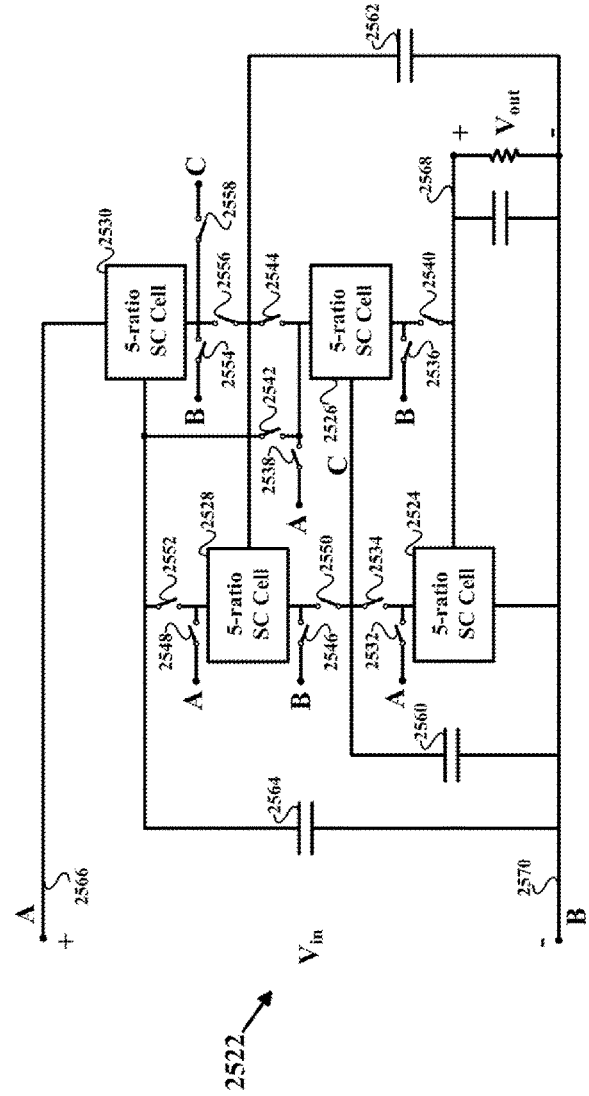
FIG. 25B illustrates an example switched capacitor circuit that may be utilized to provide several voltage conversion ratios of an input voltage by stacking variable number of switched capacitor circuits.

FIG. 25B illustrates an example switched capacitor circuit 2522 that may be utilized to provide several voltage conversion ratios of an input voltage by stacking variable number of switched capacitor circuits (e.g., 1900, 2500). The circuit 2522 may include four switched capacitor cells 2524, 2526, 2528, 2530, fourteen reconfiguration switches 2532-2558, three capacitors 2560, 2562, 2564, an input port 2566 (node A) to receive an input voltage ($V_{in}$), an output port 2568 to produce an output voltage ($V_{out}$, and a ground port 2570 (node B). The circuit 2522 may guarantee the utilization of the capacitance within the cells 2524, 2526, 2528, 2530 in the delivery of the output charge at the output port 2568 while providing various modes without disconnecting (wasting) the charge-transfer capacitance of any individual cell 2524, 2526, 2528, 2530. Thus, higher efficiency might be achieved. The switches may be one or more transistors. The cell 2524 may be similar to the circuit 1900, and the cells 2526, 2528, 2530 may be similar to the circuit 2500. Node Out (FIG. 25A) within the cells 2526, 2528, 2530 is connected to the output port 2568. The reconfiguration switch 2542 is connected between the input port of the cell 2526 and the output port of the cell 2530. The reconfiguration switch 2558 is connected between the output port of the cell 2526 and the ground port of the cell 2530. The capacitors 2560, 2562, 2564 are connected between the output port of the cells 2526, 2528, 2530, respectively, and the ground port 2566.

When the reconfiguration switches 2534, 2540, 2544, 2550, 2552, 2556 are closed and the other reconfiguration switches are open the switched capacitor cells 2524, 2526, 2528, 2530 are stacked on top of each other and the input voltage ($V_{in}$) is provided across the stack. Using this arrangement and operating the cells 2524, 2526, 2528, 2530 in one of the modes 1, 1/2, 2/3, 1/3, 3/4, or 1/4 may result in several overall voltage conversion ratios of the circuit 2522. The voltage conversion ratios of the individual cells 2524, 2526, 2528, 2530 may be selected separate from each other to provide additional voltage conversion ratios (e.g., the mode for each of the cells need not be the same).

When the reconfiguration switches 2534, 2540, 2542, 2544, 2550, 2548, 2558 are closed and the other reconfiguration switches are open the switched capacitor cells 2524, 2526, (2528 and 2530 as one cell) are stacked on top of each other and the input voltage ($V_{in}$) is provided across the stack. The cells 2528, 2530 are connected in parallel. Using this arrangement and operating the cells 2524, 2526, (2528 and 2530 as one cell) in one of the modes 1, 1/2, 2/3, 1/3, 3/4, or 1/4 may result in several overall voltage conversion ratios of the circuit 2522. The voltage conversion ratios of the individual cells 2524, 2526, (2528 and 2530 as one cell) may be selected separate from each other to provide additional voltage conversion ratios.

When the switches 2504, 2506, 2508, 2510 are operated in place of the switches 2512, 2514, 2516, 2518, within the cell 2528, the output of the cell 2528 is provided to the output port 2568. Besides, when the reconfiguration switches 2534, 2540, 2538, 2546, 2552, 2556 are closed while the other reconfiguration switches are open the switched capacitor cells 2524, 2526 are stacked on top of each other and in parallel to the stacked cells 2528, 2530 while the input voltage ($V_{in}$) is provided across the two parallel stacks. Using this arrangement and operating the cells 2524, 2526, 2528, 2530 in one of the modes 1, 1/2, 2/3, 1/3, 3/4, or 1/4 may result in several overall voltage conversion ratios of the circuit 2522. The voltage conversion ratios of the individual cells (2524 and 2528 as one cell), (2526 and 2530 as one cell) may be selected separate from each other to provide additional voltage conversion ratios.

When the switches 2504, 2506, 2508, 2510 are operated in place of the switches 2512, 2514, 2516, 2518, within the cells 2526, 2528, 2530, the output of each cell 2526, 2528, 2530 is provided to the output port 2568. Besides, when the reconfiguration switches 2532, 2536, 2538, 2546, 2548, 2454 are closed while the other reconfiguration switches are open the switched capacitor cells 2524, 2526, 2528, 2530 are connected in parallel while the input voltage ($V_{in}$) is provided across the four parallel cells. Using this arrangement and operating the cells 2524, 2526, 2528, 2530 in one of the modes 1, 1/2, 2/3, 1/3, 3/4, or 1/4 may result in the overall voltage conversion ratios 1, 1/2, 2/3, 1/3, 3/4, or 1/4 of the circuit 2522. It should be noted that the cells 2524, 2526, 2528, 2530 may be operated at the same conversion ratio.

It should be noted that the circuit 2522 may follow a recursive implementation.

The flying capacitance of the stacked cells 2524, 2526, 2528, 2530 might be weighted of the circuit 2522 total flying capacitance in order to provide optimal relative sizing of the flying capacitances, in various modes, and hence higher efficiency can be achieved for certain total flying capacitance C of the circuit 2522.

The circuit 2522 can provide additional conversion ratios by reconfiguring the placement of the load (where $V_{out}$ is provided from). While not illustrated the load may be switched from being connected to the output port of the cell 2524 to being connected to: the output port of the cell 2526, the output port of the cell 2528, or the output port of the cell 2530, by utilizing some type of switching mechanism and thus additional voltage conversion ratios may be obtained. For instance, the switches 2504, 2506, 2508, 2510 may be operated in parallel with the switches 2512, 2514, 2516, 2518, within the cells 2526, 2528, 2530 and thus the output port 2568 is connected to the output port of the cells 2526, 2528, 2530, respectively. Besides, the cell 2524 may be similar to the circuit 2500 and the switches 2512, 2514, 2516, 2518 are operated in place of the switches 2504, 2506, 2508, 2510 so that the output port 2568 is disconnected from the output port of the cell 2524, where the switch 2540 is connected between the ground port of the cell 2526 and the output port 2520 of the cell 2524. The circuit 2522 may select an appropriate overall voltage conversion ratio based on the input voltage received or output voltage required, and the mode selected for each of the blocks may be based thereon.

Figure 26:
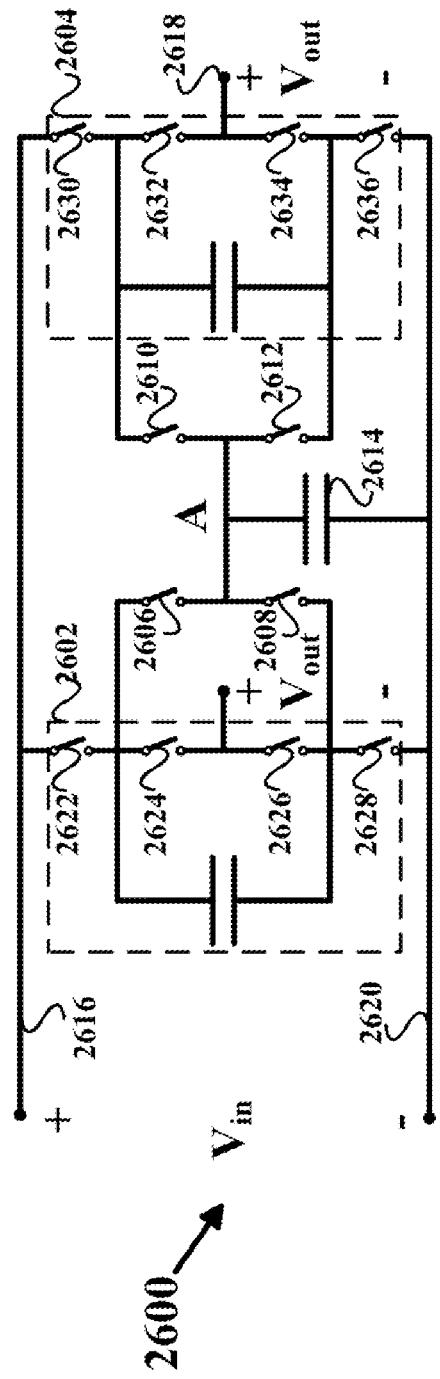
FIG. 26 illustrates an example switched capacitor circuit that may be utilized to provide several voltage conversion ratios of an input voltage by connecting two switched capacitor circuits.

FIG. 26 illustrates an example switched capacitor circuit 2600 that may be utilized to provide several voltage conversion ratios of an input voltage by connecting two switched capacitor circuits (e.g., 200). The circuit 2600 may include two switched capacitor cells 2602, 2604, four reconfiguration switches 2606, 2608, 2610, 2612, a capacitor 2614, an input port 2616 to receive an input voltage ($V_{in}$), an output port 2618 to produce an output voltage ($V_{out}$), and a ground port 2620. The switches may be one or more transistors. The circuit 2600 may be operated as the circuit 1900 (FIG. 19A) and hence the circuit 2600 may provide the ratios 1, 1/2, 2/3, 1/3, 3/4, and 1/4.

When the switches 2606, 2608 are operated in place of the switches 2624, 2626 the output of the cell 2602 is provided at node A. Besides, when the switch 2626 is operated in place of the switch 2628 the ground port of the cell 2602 becomes the output port 2618. When the switch 2610 is operated in place of the switch 2630 the input port of the cell 2604 becomes node A. Thus, the cell 2602 is stacked on top of the cell 2604 and hence the circuit 2600 may provide a 3:1 voltage conversion ratio.

When the switches 2606, 2608 are operated in place of the switches 2624, 2626 the output of the cell 2602 is provided at node A. Besides, when the switch 2624 is operated in place of the switch 2622 the input port of the cell 2602 becomes the output port 2618. When the switch 2612 is operated in place of the switch 2636 the ground port of the cell 2604 becomes node A. Thus, the cell 2604 is stacked on top of the cell 2602 and hence the circuit 2600 may provide a 3:2 voltage conversion ratio.

The flying capacitance of the stacked cells 2602, 2504 might be weighted of the circuit 2600 total flying capacitance in order to provide optimal relative sizing of the flying capacitances, in various modes, and hence higher efficiency can be achieved for certain total flying capacitance C of the circuit 2600.

Figure 27:
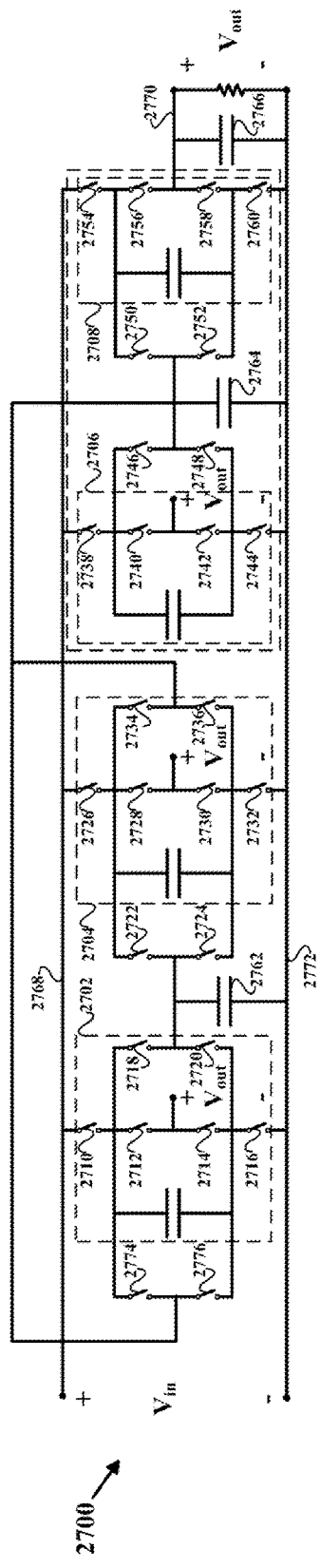
FIG. 27 illustrates an example switched capacitor circuit that may be utilized to provide several conversion ratios by utilizing four switched capacitor circuits.

FIG. 27 illustrates an example switched capacitor circuit 2700 that may be utilized to provide several conversion ratios by utilizing four switched capacitor circuits (e.g., 200) connected together. The circuit 2700 may include the components of the circuit 800, and two reconfiguration switches 2774, 2676. When the switches 2674, 2676 are disabled (gated) the circuit 2700 may be operated as the circuit 800 to provide binary $2^3$: m transformation modes (e.g., 1/8, 1/4, 3/8, 1/2, 5/8, 3/4, 7/8, 1).

When the switches 2718, 2720 are operated in place of the switches 2712, 2714 the output of the cell 2702 is provided across the capacitor 2762. Besides, when the switch 2776 is operated in place of the switch 2716 the ground port of the cell 2702 becomes connected to the output port of the cell 2704. When the switches 2734, 2736 are operated in place of the switches 2728, 2730 the output of the cell 2704 is provided across the capacitor 2764. Besides, when the switch 2722 is operated in place of the switch 2726 the input port of the cell 2704 becomes connected to the output port of the cell 2702 and when the switch 2730 is operated in place of the switch 2732 the ground port of the cell 2704 becomes connected to the output port 2770. When the switches 2746, 2750 are operated in place of the switches 2738, 2754, respectively, the input port of the cells 2706, 2708 becomes connected to the output port of the cell 2704. Thus, the cell 2702 is stacked on top of the cell 2704 which is stacked on top of the cells 2706, 2708 in parallel, hence the circuit 2700 may provide a 4:1 voltage conversion ratio.

When the switches 2718, 2720 are operated in place of the switches 2712, 2714 the output of the cell 2702 is provided across the capacitor 2762. Besides, when the switch 2774 is operated in place of the switch 2710 the input port of the cell 2702 becomes connected to the output port of the cell 2704. When the switches 2734, 2736 are operated in place of the switches 2728, 2730 the output of the cell 2704 is provided across the capacitor 2764. Besides, when the switch 2724 is operated in place of the switch 2732 the ground port of the cell 2704 becomes connected to the output port of the cell 2702 and when the switch 2728 is operated in place of the switch 2726 the input port of the cell 2704 becomes connected to the output port 2770. When the switches 2748, 2752 are operated in place of the switches 2744, 2760, respectively, the ground port of the cells 2706, 2708 becomes connected to the output port of the cell 2704. Thus, the cells 2706, 2708 in parallel are stacked on top of the cell 2704 which is stacked on top of the cell 2702, hence the circuit 2700 may provide a 4:3 voltage conversion ratio.

When the switches 2718, 2720 are operated in place of the switches 2712, 2714 the output of the cell 2702 is provided across the capacitor 2762. Besides, when the switch 2712 is operated in place of the switch 2710 the input port of the cell 2702 becomes connected to the output port 2770. When the switch 2724 is operated in place of the switch 2732 the ground port of the cell 2704 becomes connected to the output port of the cell 2702 and when the switch 2734 is operated in place of the switch 2726 the input port of the cell 2704 becomes connected across the capacitor 2764. When the switches 2746, 2748, 2750, 2752 are operated in place of the switches 2740, 2742, 2756, 2758, respectively, the output pot of the cells 2706, 2708 becomes connected across the capacitor 2764. In addition, when the switches 2742, 2758 are operated in place of the switches 2744, 2760, respectively, the ground port of the cells 2706, 2708 becomes connected to the output port 2770. Thus, the cells 2706, 2708 in parallel are stacked on top of the cell 2704 which is stacked on top of the cell 2702, hence the circuit 2700 may provide a 2:1 voltage conversion ratio.

When the switches 2718, 2720 are operated in place of the switches 2712, 2714 the output of the cell 2702 is provided across the capacitor 2762. Besides, when the switch 2714 is operated in place of the switch 2716 the ground port of the cell 2702 becomes connected to the output port of the cell 2704. When the switches 2734, 2736 are operated in place of the switches 2728, 2730 the output of the cell 2704 is provided across the capacitor 2764. Besides, when the switch 2722 is operated in place of the switch 2726 the input port of the cell 2704 becomes connected to the output port of the cell 2702 and when the switch 2730 is operated in place of the switch 2732 the ground port of the cell 2704 becomes connected to the output port 2770. When the switches 2746, 2750 are operated in place of the switches 2738, 2754, respectively, the input port of the cells 2706, 2708 becomes connected to the output port of the cell 2704. Thus, the cells 2702, 2704 are connected in cascade and the cascade is stacked on top of the cells 2706, 2708 in parallel, hence the circuit 2700 may provide a 5:1 voltage conversion ratio.

Therefore, various subsets of the cells 2702, 2704, 2706, 2708 are connected in cascade and/or are stacked to provide additional overall voltage conversion ratios of the circuit 2700.

It should be noted that the circuit 2700 may follow a recursive implementation as the circuit 1000 (FIG. 10).

When the switches 2774, 2776, 2734, 2736 are disabled (gated) the cells 2702, 2704 and the cells 2706, 2708 may be operated in parallel as the circuit 2600 to provide the ratios 1, 1/2, 2/3, 1/3, 3/4, and 1/4. Thus, the overall voltage conversion ratio provided depends on the number of stacked cells (and/or the number of cascaded cells) the mode each cell is operated at and the placement of load It should be noted that FIG. 27 illustrates an embodiment. There might be various ways to connect the cells 2702, 2704, 2706, 2708 as a stack/cascade in the circuit 2700 by utilizing a plurality of switches.

The flying capacitance of the cells 2702, 2704, 2706, 2708 might be weighted of the circuit 2700 total flying capacitance in order to provide optimal relative sizing of the flying capacitances, in various modes, and hence higher efficiency can be achieved for certain total flying capacitance C of the circuit 2700.

The switched capacitor cells 2702, 2704, 2706, 2708 of the circuit 2700 may be replaced with the circuit 2600 (5-ratio SC Cell) to provide additional voltage conversion ratios of the circuit 2700. Also, the reconfiguration switches of the circuit 2522 (FIG. 25B) may be embedded within the comprising cells as illustrated in the circuit 2700.

Figure 28:
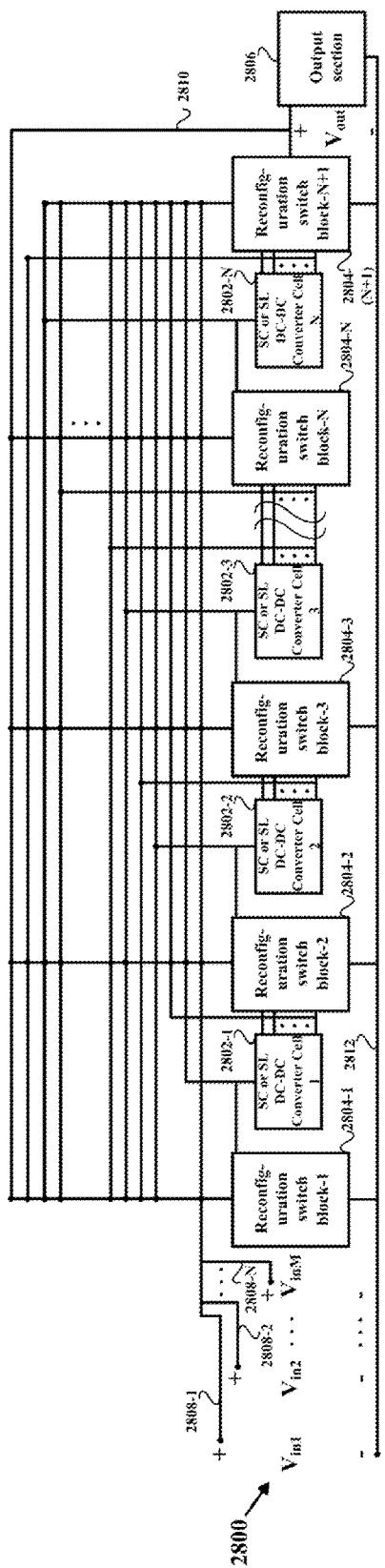
FIG. 28 illustrates an example configuration of a DC-DC converter circuit 2800 that may be utilized to provide several voltage conversion ratios.

FIG. 28 illustrates an example configuration of a DC-DC converter circuit 2800 that may be utilized to provide several voltage conversion ratios. The configuration 2800 may include a plurality of DC-DC converter (e.g., switched-capacitor (SC) or switched inductor (SL)) cells 2802 (2802-1, 2802-2 . . . 2802-N), a plurality of reconfiguration switch blocks 2804 (2804-1, 2804-2 . . . 2804-N+1), an output section 2806, a plurality of input ports 2808 (2808-1, 2808-2 . . . 2808-M), a plurality of output ports 2810, and a ground port 2812. The single lines connecting the various components of the configuration 2800 are buses (e.g. plurality of wires), except for the ground port 2812. As illustrated, the blocks 410-1 and 410-2 have one capacitor overlap.

Each cell 2802 takes a plurality of inputs (e.g. the input port and the output port of the circuit 200) from the reconfiguration switch block 2804 and produces a plurality of outputs (e.g. output port of the circuit 200), dependent on the individual cell 2802 voltage conversion ratio (e.g., $(V_{inHigh}+V_{inLow})/2$ if the cell is of 2:1 transformation ratio, as 200). Each input of a cell 2802 may be connected through the reconfiguration switches within the reconfiguration switch block 2804 to: the plurality of input ports 2808 or the ground port 2812 of the whole DC-DC converter circuit 2800, the plurality of outputs of another cell 2802, or the plurality of inputs to another cell 2802. The voltage conversion ratio (mode) of each cell 2802 may be larger or smaller than one and may be selected separate from the other cells 2802 to provide additional voltage conversion ratios (e.g., the mode for each cell of the cells need not be the same).

It should be noted that a subset of the cells 2802 may follow a recursive implementation as 1000 (FIG. 10).

It should be noted that the reconfiguration switch block 2804 may include a short circuit (no switch) that directly connects one of the inputs of the cell 2802. For instances, the circuits 2300 (FIG. 23A) and 2400 (FIG. 24) may not include reconfiguration switches and hence the reconfiguration switch blocks 2804 may include short circuits. Besides, the reconfiguration switches may be embedded within the cell 2802 (e.g. the circuit 700). Some circuits (e.g., 1300) may use capacitors for charge balance. Such capacitors are considered to be included within the cells 2802, for ease of illustration.

Each cell 2802 may follow one of the switched capacitor topologies in prior art (e.g., Ladder topology, Dickson charge pump, Fibonacci topology, Series-Parallel topology, Doubler topology, etc.), one of the switched inductor topologies in prior art (e.g. buck topologies, boost topologies, transformer bridge topologies, etc.), or one of the embodiments. The overall voltage conversion ratio provided by the circuit 2800 may be larger or smaller than one and depends on the number of cells the connection of the cells 2802 (e.g., stacked and/or cascaded) the mode each cell is operated at and the placement of load.

Figure 29A:
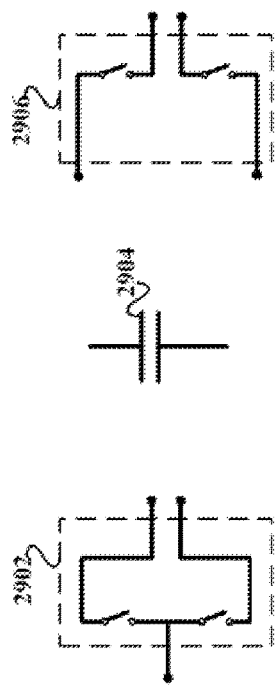
FIG. 29A illustrates one possible SC standard cells that are capable of implementing an SC DC-DC converter.

Most of the embodiments provided are amenable for automatic synthesis. In one aspect, the circuit 1000 (FIG. 10) may be easily synthesized using an algorithm on a computer. FIG. 29A illustrates one possible SC standard cells 2902, 2904, 2906 that are capable of implementing an SC DC-DC converter; for instance the circuits 600, 800, 900, 2700 can be synthesized through the standard cells in FIG. 29A and may be in a recursive instantiation (as 1000). The proposed standard SC cells are amenable to fit in a row-based standard CMOS layout, where VDD/GND wires are routed within each row. Note that the introduced cells 2902, 2904, 2906 may be used to replace the used decaps in a standard CMOS row to form active decoupling. It should be noted that the switches of the cells 2902, 2904, 2906 may be a plurality of transmission gates (e.g. CMOS switch).

Figure 29B:
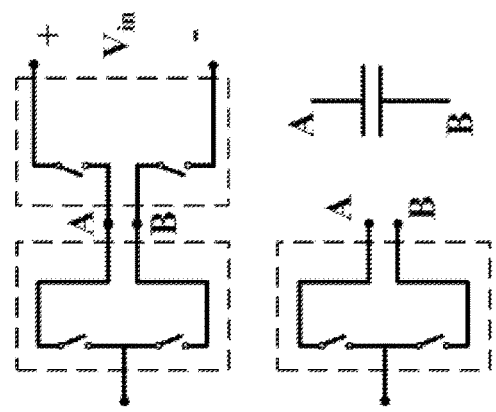
FIG. 29B illustrates the usage of the standard cells to synthesis a 2:1 SC circuit with a reconfiguration twig.
Figure 29B:
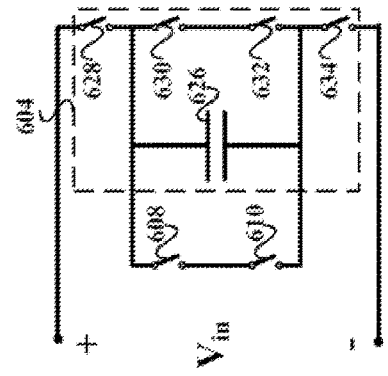

FIG. 29B illustrates the usage of the standard cells 2902, 2904, 2906 to synthesis a 2:1 SC circuit with a reconfiguration twig (e.g. cell 604 in the circuit 600).

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment. The various embodiments are intended to be protected broadly within the spirit and scope of the appended claims.

What is claimed:

1. An apparatus to receive a plurality of input voltages and generate a plurality of output voltages, wherein the apparatus is capable of operating at one of a plurality of voltage conversion ratios and selection of said one of a plurality of voltage conversion ratios is based on an input voltage received, the apparatus comprising:
   an input port,
   a ground port,
   a plurality of switched cells, each switched cell having two inputs and an output and being configured to produce an output voltage having an individual cell voltage conversion ratio with respect to a voltage applied between the inputs,
   a plurality of reconfiguration switches electrically connected between the switched cells, and
   a controller configured to, for each of the switched cells, reconfigure at least one of the reconfiguration switches to form a connection between each of the inputs of the corresponding switched cell to one of: an output port of another switched cell, the input port, and the ground port.

2. The apparatus of claim 1, wherein the controller is further configured to operate said plurality of reconfiguration switches to select said one of a plurality of voltage conversion ratios.

3. The apparatus of claim 1, wherein the controller is further configured to select the individual cell voltage conversion ratio for each of the switched cells based on said one of a plurality of voltage conversion ratios.

4. The apparatus of claim 1, wherein placement of load is used to select said one of a plurality of voltage conversion ratios.

5. The apparatus of claim 1, wherein the controller is further configured to reduce the number of said switched cells by disconnecting at least one of said plurality of switched cells to select said one of a plurality of voltage conversion ratios.

6. The apparatus of claim 1, wherein the controller is further configured to reduce the number of said switched cells by connecting at least two of said plurality of switched cells in parallel to select said one of a plurality of voltage conversion ratios, whereby no switched cell is disconnected.

7. The apparatus of claim 1, wherein the controller is further configured to change at least one subset of said switched cells connected in cascade to a second arrangement in stack, or vice versa, to select said one of a plurality of voltage conversion ratios.

8. The apparatus of claim 1, wherein during operation of the apparatus, said one of a plurality of voltage conversion ratios varies to a second ratio of said plurality of voltage conversion ratios and in response the operation of said plurality of switches is changed based on said second ratio.

9. The apparatus of claim 8, wherein said second ratio of said plurality of voltage conversion ratios is adjusted to desired output voltage using a resistive mechanism to dissipate excess power.

10. The apparatus of claim 1, wherein at least two subsets of said plurality of switched cells utilize at least one another subset of said plurality of switched cells in common to provide a plurality of independent output ports from said at least two subsets.

11. The apparatus of claim 1, wherein the controller is further configured to control operation of cell switches included in said switched cells by dithering in time between at least two ratios of said plurality of voltage conversion ratios.

12. The apparatus of claim 1, wherein operation of said switched cells provides charge balance.

13. The apparatus of claim 1, wherein said switched cells are operated respectively at a plurality of switching frequencies.

14. A direct-current to direct-current (DC-DC) converter adapted for converting a plurality of input voltages to a plurality of output voltages, comprising:
   a. a plurality of input ports to receive the plurality of input voltages,
   b. a plurality of output ports to produce the plurality of output voltages,
   c. a ground port to provide a common level for the plurality of input voltages and the plurality of output voltages,
   d. a plurality of reconfiguration switches,
   e. a plurality of DC-DC converter cells reconfigurable via the reconfiguration switches, wherein each cell has at least two inputs and produces at least one output at one of a plurality of individual cell voltage conversion ratios, and
   f. a controller configured to, for each of the DC-DC converter cells, reconfigure at least one of the reconfiguration switches to form a connection between each of the at least two inputs of each DC-DC converter cell to at least two of:
      said plurality of input ports,
      said plurality of output ports,
      said ground port, and
      the at least one output and the at least two inputs of at least one another DC-DC converter cell;
      wherein the controller is further configured to reconfigured the at least one of the reconfiguration switches based on a target voltage conversion ratio of the input voltage to the output voltage of the DC-DC converter.

15. The DC-DC converter of claim 14, wherein during operation of the switched capacitor DC-DC converter, said target voltage conversion ratio varies to a second target voltage conversion ratio and in response said reconfiguration switches are reconfigured based on said second target voltage conversion ratio.

16. The DC-DC converter of claim 14, further comprising a plurality of DC-DC converter switches embedded within said plurality of DC-DC converter cells and operation of the plurality of embedded switches is based on said target voltage conversion ratio of the input voltage to the output voltage of the DC-DC converter.

17. The DC-DC converter of claim 14, wherein the number of DC-DC converter cells is reduced by segmenting said plurality of DC-DC converter cells into at least two subsets of DC-DC converter cells based on a target voltage conversion ratio of the input voltage to the output voltage of the DC-DC converter, whereby no DC-DC converter cell is disconnected.

18. The DC-DC converter of claim 14, further including means for charge balance disposed between said DC-DC converter cells.

19. The apparatus of claim 1, wherein a desired input to output voltage conversion ratio with minimum power loss is realized by connecting said input port of each said reconfigurable switched cell to either the output port of the immediate previous reconfigurable switched cell or said apparatus input port through said connection matrix and said ground port of each said reconfigurable switched cell to the output port of the immediate previous reconfigurable switched cell or said apparatus ground port through said connection matrix.

20. The apparatus of claim 1, wherein one of the switches of said connection matrix is embedded within said three-port reconfigurable switched-cells.

* * * * *